United States Patent
Namiki

(10) Patent No.: US 7,385,693 B2
(45) Date of Patent: Jun. 10, 2008

(54) MICROSCOPE APPARATUS

(75) Inventor: Mitsuru Namiki, Hanno (JP)

(73) Assignee: Olympus Corporation, Tokyo (JP)

( * ) Notice: Subject to any disclaimer, the term of this patent is extended or adjusted under 35 U.S.C. 154(b) by 374 days.

(21) Appl. No.: 11/153,361

(22) Filed: Jun. 16, 2005

(65) Prior Publication Data

US 2007/0046946 A1 Mar. 1, 2007

(30) Foreign Application Priority Data

Jun. 21, 2004 (JP) ............... 2004-182923
Jul. 22, 2004 (JP) ............... 2004-214699
Jul. 26, 2004 (JP) ............... 2004-217543
Jul. 27, 2004 (JP) ............... 2004-218950

(51) Int. Cl.
*G01J 3/28* (2006.01)

(52) U.S. Cl. .................................. 356/328

(58) Field of Classification Search .............. None
See application file for complete search history.

(56) References Cited

U.S. PATENT DOCUMENTS

| | | | |
|---|---|---|---|
| 6,429,936 B1 * | 8/2002 | Scaduto .............. | 356/417 |
| 6,967,720 B2 | 11/2005 | Nagase et al. | |
| 6,977,379 B2 * | 12/2005 | Zhang et al. .......... | 250/341.1 |
| 2004/0246493 A1 * | 12/2004 | Kim et al. ............ | 356/504 |

FOREIGN PATENT DOCUMENTS

| | | |
|---|---|---|
| JP | 5-72480 | 3/1993 |
| JP | 5-72480 A | 3/1993 |
| JP | 3-018173 B1 | 1/2000 |
| JP | 2000-088657 | 3/2000 |
| JP | 2000-088657 A | 3/2000 |
| JP | 3018173 | 3/2000 |
| JP | 2002-271657 | 9/2002 |
| JP | 2003-004530 | 1/2003 |
| JP | 2003-279480 | 10/2003 |

* cited by examiner

Primary Examiner—Tu T Nguyen
(74) Attorney, Agent, or Firm—Kenyon & Kenyon LLP

(57) ABSTRACT

A microscope apparatus includes a microscope, and a time-resolved spectroscopy unit, a first light-guiding unit for guiding light from the spectroscopy unit into the microscope, a second light-guiding unit for guiding the light from the microscope into the spectroscopy unit. The microscope includes an illuminating optical system and an observing optical system. The time-resolved spectroscopy unit includes an ultrashort optical pulse source, a beam splitter for splitting the ultrashort optical pulse into a reference beam and another beam, an optical system for generating a pump beam and a probe beam from the beam other than the reference beam, and an imaging device for time-resolved spectroscopy for capturing an interference pattern formed by the light guided by the second light-guiding unit and the reference beam. A two-dimensional lightwave conversion optical system is interposed between the second light-guiding unit and the imaging device.

13 Claims, 34 Drawing Sheets

TIME ←

MICROSCOPE APPARATUS

BACKGROUND OF THE INVENTION

1. Field of the Invention

The present invention relates to a microscope apparatus capable of carrying out time-resolved spectroscopy in a minute region under microscope observation.

This application is based on patent application Nos. 2004-182923, 2004-214699, 2004-217543, and 2004-218950 filed in Japan, the content of which is incorporated herein by reference.

2. Description of Related Art

An example of a known technology for carrying out time-resolved spectroscopy using a microscope is described below.

According to such a known technology, pulsed laser beams are focused on a subject and fluorescence emission produced at a minute area in the vicinity of the focal point is detected. Then, the energy transfer is measured based on the characteristics of how the fluorescence emission changes over time.

According to this technology, the environment of a fluorescent molecule included in a specimen can be analyzed based on the fact that the fluorescence lifetime of the molecule changes depending on the distance between the fluorescent molecule and other fluorescent molecules.

Recently, in the technical fields of optical communication and physical measurement, optical signals that change within an extremely short period of time on the order of picoseconds (1 ps=$10^{-12}$ s) to femtoseconds (1 fs=$10^{-15}$ s) are often used. The change of an optical signal within such an extremely short time period can be observed by a measuring device with excellent time resolution, for example, a time-resolved spectroscopy apparatus such as a time/2D-space conversion optical system.

The time/2D-space conversion optical system includes a diffraction grating, a one-dimensional Fourier transformation optical system, a time-to-frequency conversion filter, and a one-dimensional inverse Fourier transformation optical system.

Observation of an optical signal using such a time/2D-space conversion optical system is carried out as described below.

First, a signal beam having a plane wavefront is incident at an angle on the diffraction grating to obtain a diffracted beam whose propagation direction and spatial phase distribution intersect at an angle equal to the incident angle of the signal beam to the diffraction grating.

Next, Fourier transformation is performed on the horizontal component of the diffracted beam by the one-dimensional Fourier transformation optical system to obtain the spectral distribution of the signal beam as a spatial distribution.

The spectral distribution obtained in such a manner is filtered using the time-to-frequency conversion filter, which is disposed at a position where the spectral distribution is projected, so that the frequency of the extracted frequency components increases sequentially in the vertical direction.

Inverse Fourier transformation is performed on the horizontal components of the filtered lightwave by the one-dimensional inverse Fourier transformation optical system to obtain a lightwave distribution representing time delay in the horizontal direction and the distribution of the extracted spectral components in the vertical direction. A quasi-two-dimensional spectrogram is formed on the plane intersecting with the horizontal direction representing different degrees of time delay in the lightwave distribution.

By emitting a reference transform-limited (TL) pulse wavefront on the plane intersecting with the horizontal direction representing different degrees of time delay in the lightwave distribution so that the plane matches the wave surface of the emitted plane wavefront, an interference pattern caused by the lightwave distribution and the reference TL pulse wavefront is generated on the plane.

The interference pattern generated in such a manner corresponds to the change in intensity of the lightwave distribution over time. Therefore, by analyzing this interference pattern, information on the amplitude and phase of the signal beam to be measured can be obtained.

BRIEF SUMMARY OF THE INVENTION

A microscope apparatus according to an embodiment of the present invention includes an optical microscope, a time-resolved spectroscopy unit, a first light-guiding unit interposed between the time-resolved spectroscopy unit and the optical microscope, and a second light-guiding unit interposed between the time-resolved spectroscopy unit and the optical microscope at a position difference from the position of the first light-guiding unit. The time-resolved spectroscopy unit includes a light source for generating an ultrashort optical pulse, an imaging device, a light-splitting member interposed between the light source and the first light-guiding unit, a light-combining member interposed between the second light-guiding unit and the imaging device, and a two-dimensional lightwave conversion optical system interposed between the second light-guiding unit and the light-combining member.

It is preferable that the microscope apparatus having the above-described structure further include a relay optical system, and the two-dimensional lightwave conversion optical system of the microscope apparatus having the above-described structure include a beam expander, a first diffraction grating, a first lens having a positive refractive power, an optical filter, a second lens having a positive refractive power, and a second diffraction grating, wherein the first diffraction grating is disposed at a front focal point of the first lens, wherein the optical filter is disposed at a rear focal point of the first lens and a front focal point of the second lens, and wherein the second diffraction grating is disposed at a rear focal point of the second lens. The relay optical system is interposed between the second diffraction grating and the imaging device.

It is preferable that the relay optical system be a unit-magnification optical system.

It is preferable that the imaging device in the above-described microscope apparatus be disposed so that an image plane of the imaging device is orthogonal to an optical axis of the relay optical system.

It is preferable that the relay optical system included in the above-described microscope apparatus be a reducing optical system.

In the above-described microscope apparatus including a relay optical system, it is preferable that an imaging device be disposed so that an image plane of the imaging device disposed at an angle with respect to an optical axis of the relay optical system.

In the structure described in the first paragraph of this section, the two-dimensional lightwave conversion optical system includes in the above-described microscope apparatus may include a beam expander, a half mirror, a first diffraction grating, a lens having a positive refractive power, a reflective optical filter, and a relay optical system. The half mirror is disposed on the light-emission side of the beam expander. The first diffraction grating, the lens having a positive refractive power, and the optical filter are disposed on the light-reflection side of the beam expander. The first grating is disposed at a front focal point of the lens having a positive refractive power. The optical filter is disposed at a rear focal point of the lens having a positive refractive power. The relay optical system is interposed between the half mirror and the imaging device.

In the structure described in the first paragraph of this section, the two-dimensional lightwave conversion optical system includes in the above-described microscope apparatus includes a beam expander, a diffraction grating, a first lens having a positive refractive power, an optical filter, a second lens having a positive refractive power, and a relay optical system. The diffraction grating is disposed at a front focal point of the first lens. The optical filter is disposed at a rear focal point of the first lens and a front focal point of the second lens. The imaging device is disposed at a rear focal point of the second lens.

DETAILED DESCRIPTION OF THE INVENTION

There is a measuring technology employing the high-level time resolution of ultrashort pulses. By using this technology, various high-speed phenomena in the picosecond to femtosecond region can be observed, such as chemical reactions.

In view of this time-resolved measurement technique the microscope apparatus according to an embodiment of the present invention is configured.

The time-resolved measurement technique is described with reference to FIG. 13.

Figure 13:
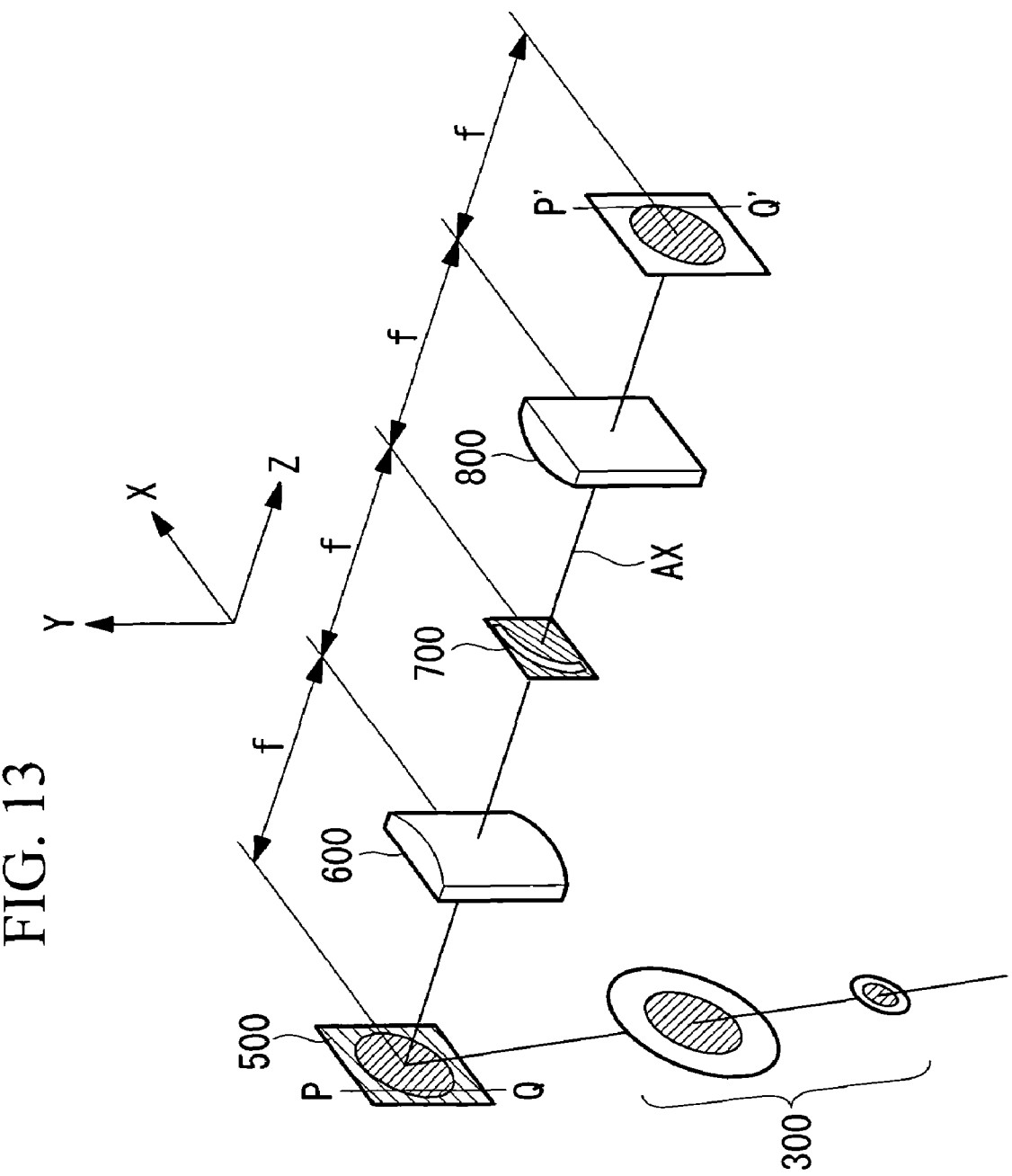
FIG. 13 is a perspective view of the overall structure of a two-dimensional lightwave conversion optical system according to a waveform measurement technology using ultrashort optical pulse.

FIG. 13 is a perspective view illustrating the overall structure of a two-dimensional space conversion optical system (two-dimensional lightwave conversion optical system) according to a technique for measuring the waveform of an ultrashort pulse.

The two-dimensional space conversion optical system includes a beam expander 300, a diffraction grating 500, a first cylindrical lens 600, an optical filter 700, and a second cylindrical lens 800. The diffraction grating 500 is a transmissive diffractive optical element. The diffraction grating 500 is disposed at the front focal plane (front focal position) of the first cylindrical lens 600. The optical filter 700 is disposed at the rear focal plane (rear focal position) of the first cylindrical lens 600. The position of the optical filter 700 matches the rear focal plane of the second cylindrical lens 800. The rear focal plane of the second cylindrical lens 800 and the front focal plane of the first cylindrical lens 600 are conjugate to each other.

Now, the time-resolved measurement method using the structure illustrated in FIG. 13 will be described.

An incident light flux is expanded at the beam expander 300 and is transmitted to the diffraction grating 500 at an angle. The traveling path of each ray of the light flux will be described below. In this case, the individual light rays entering the diffraction grating 500 at an angle do not reach the incident plane of the diffraction grating 500 simultaneously. More specifically, when the diffraction grating 500 is viewed from the X direction, one end of the diffraction grating 500 will be disposed closer to the beam expander 300 and the other end will be disposed away from the beam expander 300. Therefore, there will be a time difference between a light ray reaching one end of the diffraction grating 500 and another light ray reaching the other end of the diffraction grating 500. In other words, light rays reach predetermined positions on the diffraction grating 500 in the X direction at different moments. With this in mind, the time-resolved spectrum of the light rays that reach the line P-Q in the drawing will be described below.

The diffraction grating 500 has a grating that diffracts incident light in the X direction according to each wavelength. Each wavelength component included in the light that reaches line P-Q is diffracted in the X direction at a different angle and is then focused at the rear focal plane of the first cylindrical lens 600. Since, at this time, light is focused only in the X direction, streaks of light extending in the Y direction will be aligned in sequence in accordance with the wavelength along the X direction.

Figure 14:
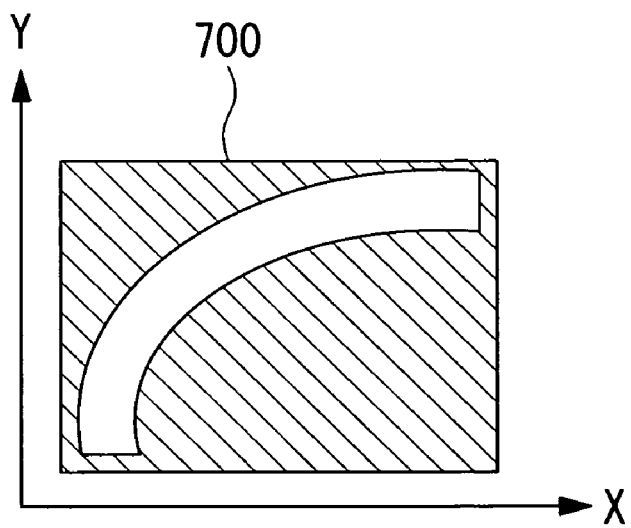
FIG. 14 illustrates an optical filter 700 used in the two-dimensional lightwave conversion optical system illustrated in FIG. 13.

As illustrated in FIG. 14, the optical filter 700 includes a light-blocking region and a light-transmitting region. Here, the light-transmitting region is an opening. When viewed with respect to the X and Y axes of the optical filter 700, the opening is formed on the optical filter 700 so that, as the opening extends in the X direction, it also extends in the Y direction. The area other than the opening of the optical filter 700 is a light-blocking region configured to block light.

Therefore, different wavelength components of the light transmitted through the optical filter 700 will be distributed along the Y direction with a time difference.

Figure 15:
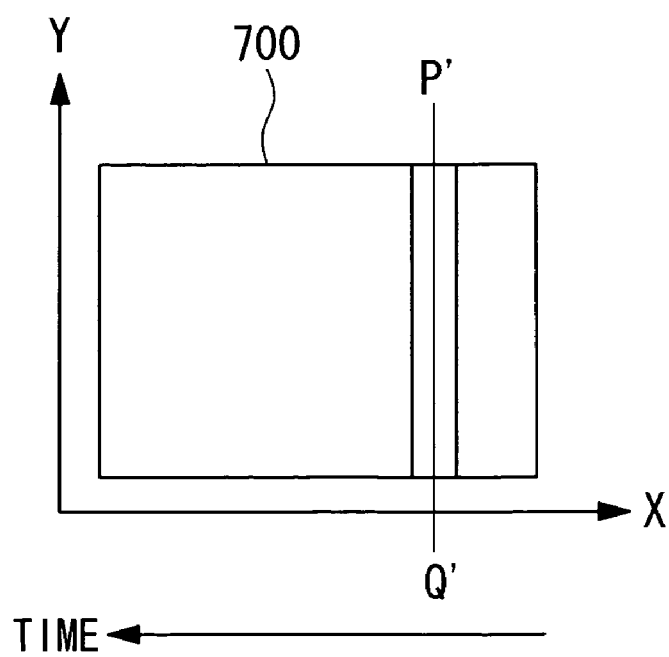
FIG. 15 is a graph of the wavelength distribution converted two-dimensionally by the two-dimensional space conversion optical system illustrated in FIG. 13.

The wavelength distribution in the Y direction maintained at the rear focal plane of the second cylindrical lens 800. Since the rear focal plane of the second cylindrical lens 800 is conjugate to the front focal plane of the first cylindrical lens 600, the position of the line P-Q is conjugate with respect to the position of the line P'-Q'. As a result, light rays having different wavelengths are aligned along the line P'-Q', as illustrated in FIG. 15.

The light rays reach the diffraction grating 500 at different moments depending on the position on the diffraction grating 500. At the rear focal plane of the second cylindrical lens 800, as illustrated in FIG. 15, the different wavelength components are distributed in the Y direction, and time changes in the X direction as indicated by an arrow (leftward in the drawing). In this way, an expanded spectrogram is generated. Hereinafter, this spectrogram is defined as a two-dimensional lightwave.

Since temporal changes in time of light are extremely high speed, a usual imaging device is not capable of capturing these temporal changes.

Accordingly, a reference beam referred to as a 'gate pulse' is simultaneously emitted at the rear focal plane of the second cylindrical lens 800. In this way, the spectrogram can be obtained as an interference pattern.

The above-described two-dimensional space conversion optical system is capable of performing time-resolved spectroscopy of light modulated in some way due to a specimen and, more specifically, of ultrashort pulses.

The above-mentioned two-dimensional space conversion optical system has mainly been used in the fields of optical communication and physical measurement.

The applicant, however, has focused on the fact that the above-mentioned two-dimensional space conversion optical system can be effectively used in observing and measuring minute regions and has conceived the idea of using the above-mentioned two-dimensional space conversion optical system in a microscope apparatus. By using the microscope apparatus according to embodiments of the present invention, observation and time-resolved spectroscopy of an extremely small region can be carried out simultaneously.

Figure 1:
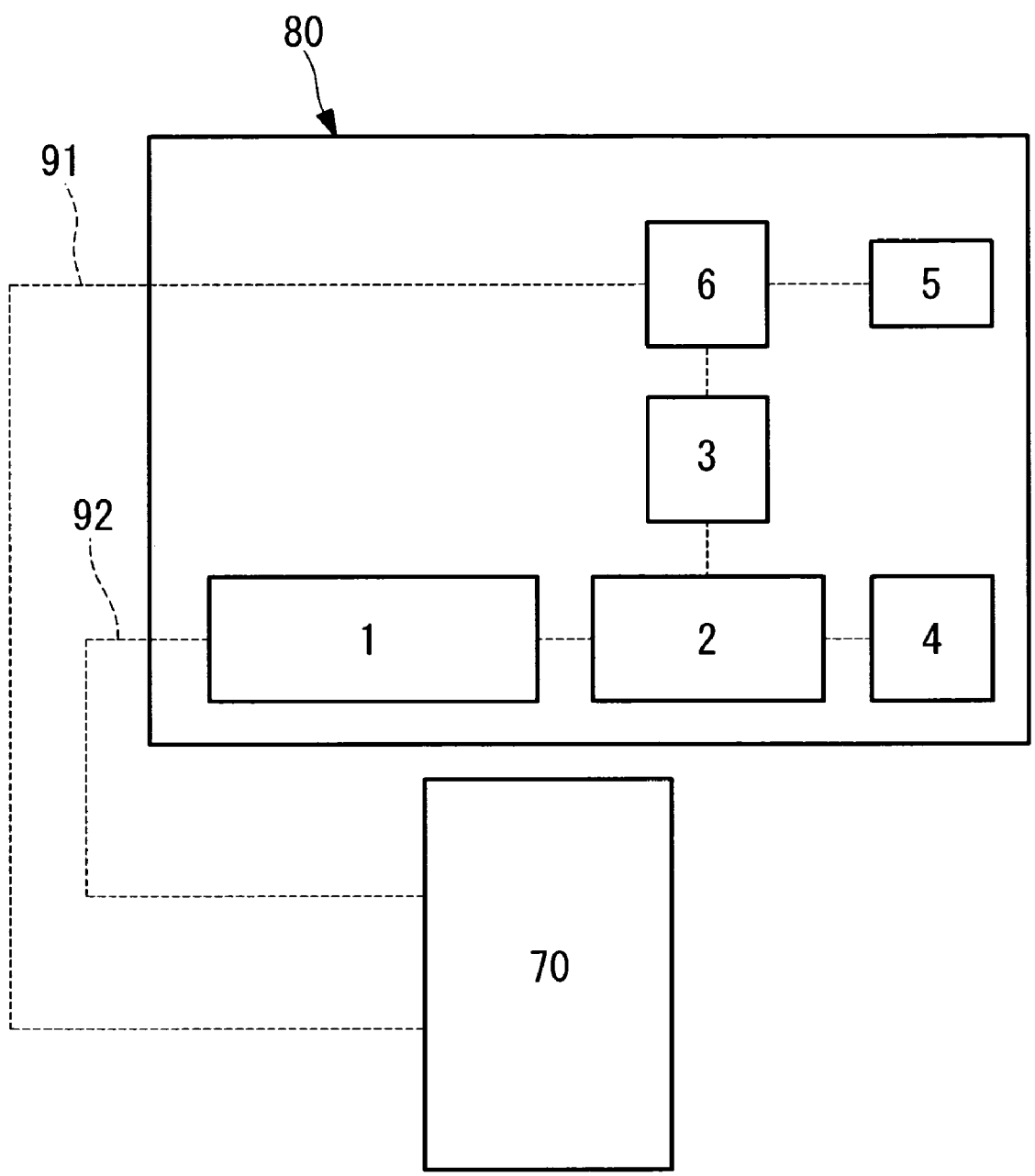
FIG. 1 is a block diagram illustrating a structure common to microscope apparatuses according to embodiments of the present invention.
Figure 2:
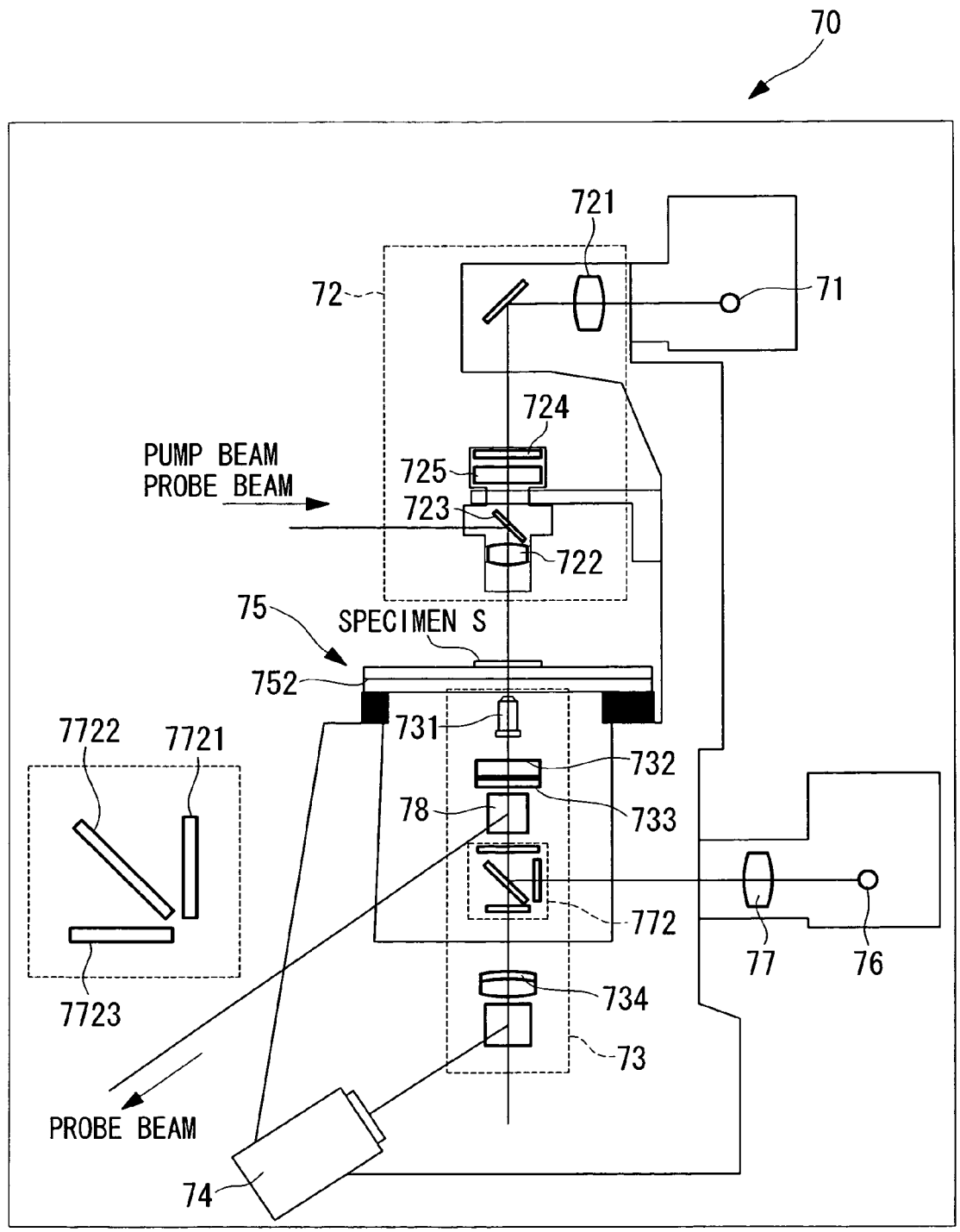
FIG. 2 is an overview of a microscope included in a microscope apparatus as shown in FIG. 1.

FIG. 1 illustrates a structure common to microscope apparatuses according to embodiments of the present invention. FIG. 2 is an overview of a microscope included in the microscope apparatus illustrated in FIG. 1.

As illustrated in FIG. 1, the microscope apparatus according to embodiments of the present invention includes a microscope 70, a time-resolved spectroscopy unit 80, a first light-guiding unit 91, and a second light-guiding unit 92. The first light-guiding unit 91 guides light from the time-resolved spectroscopy unit 80 to inside the microscope 70. The second light-guiding unit 92 guides light from the microscope 70 to the time-resolved spectroscopy unit 80. The microscope apparatus is configured so that a specimen can be observed with the microscope 70 at the same time time-resolved spectroscopy is carried out on the specimen being observed by the time-resolved spectroscopy unit 80.

The time-resolved spectroscopy unit 80 includes an ultrashort optical pulse source 5, a splitter 61, a two-dimensional lightwave conversion optical system 1, a relay lens 2, a multiplexer 3, and a time-resolved-spectroscopy imaging device 4 (hereinafter, referred to as an 'imaging device 4').

The ultrashort optical pulse source 5 is configured to generate ultrashort optical pulses.

The splitter 61 is configured to split an ultrashort optical pulse into a probe beam and a reference beam.

The first light-guiding unit 91 includes, for example, a mirror. The angle of the mirror can be adjusted to reflect the light emitted from the time-resolved spectroscopy unit 80 into the microscope 70.

The second light-guiding unit 92 also includes, for example, a mirror. The angle of the mirror can be adjusted to reflect the light emitted from the microscope 70 to the time-resolved spectroscopy unit 80.

The first and second light-guiding units 91 and 92 may be disposed in either the microscope 70 or the time-resolved spectroscopy unit 80 or may be disposed independently from the microscope 70 and the time-resolved spectroscopy unit 80. The positions of the first and second light-guiding units 91 and 92 are not limited.

The two-dimensional lightwave conversion optical system 1 converts the light guided by the second light-guiding unit 92 into a two-dimensional lightwave.

The relay lens 2 forms an image of the two-dimensional lightwave on the image plane of the imaging device 4 through the multiplexer 3.

The multiplexer 3 reflects the reference beam onto the image plane of the imaging device 4. As a result, an interference pattern is formed on the image plane of the imaging device 4.

Now, the microscope 70 will be described. The microscope 70 may be any type of optical microscope capable of observing a specimen. More specifically, the microscope 70 may be capable of bright-field microscopy, fluorescence microscopy, or differential interference microscopy.

According to the structure illustrated in FIG. 2, the microscope 70 includes a transmission-illumination light source 71, a transmission-illumination optical system 72, an optical system for observation 73, an imaging device for observation 74, a stage 75, a fluorescence-illumination light source 76, a fluorescence-illumination optical system 77, a filter unit 772, a beam splitter 723, and a dichroic mirror 78.

The transmission-illumination optical system 72 includes a collector lens 721, an objective lens 722, and a beam splitter 723. The transmission-illumination optical system 72 radiates light generated at the transmission-illumination light source 71 onto a specimen S. Since the transmission-illumination optical system 72 includes the beam splitter 723, a pump beam and a probe beam can be radiated onto a specimen via the beam splitter 723. According to the structure illustrated in FIG. 2, the transmission-illumination optical system 72 also includes a polarizer 724 and a first differential interference contrast (DIC) filter 725.

The optical system for observation 73 includes an objective lens 731, a second DIC filter 732, an analyzer 733, and an imaging lens 734.

The dichroic mirror 78 and the filter unit 772 are interposed between the analyzer 733 and the imaging lens 734.

The filter unit 772 includes an excitation filter 7721, a dichroic mirror 7722, and an absorption filter 7723. The excitation filter 7721 is used to select the excitation light to be emitted to the specimen S. The dichroic mirror 7722 reflects the excitation light towards the specimen S and transmits fluorescence emitted from the specimen S. The absorption filter 7723 blocks the excitation light reflected at the specimen S and transmits generated fluorescence.

The stage 75 includes an XY stage 752. In this way, the position of the specimen S relative to the objective lenses 722 and 731 can be adjusted freely.

With the microscope apparatus according to an embodiment of the present invention, an extremely small region can be observed and, at the same time, time-resolved spectroscopy can be carried out on a probe beam modulated on the order of picoseconds to femtoseconds.

The main structures of embodiments of the present invention will be described below.

First Embodiment

Figure 3:
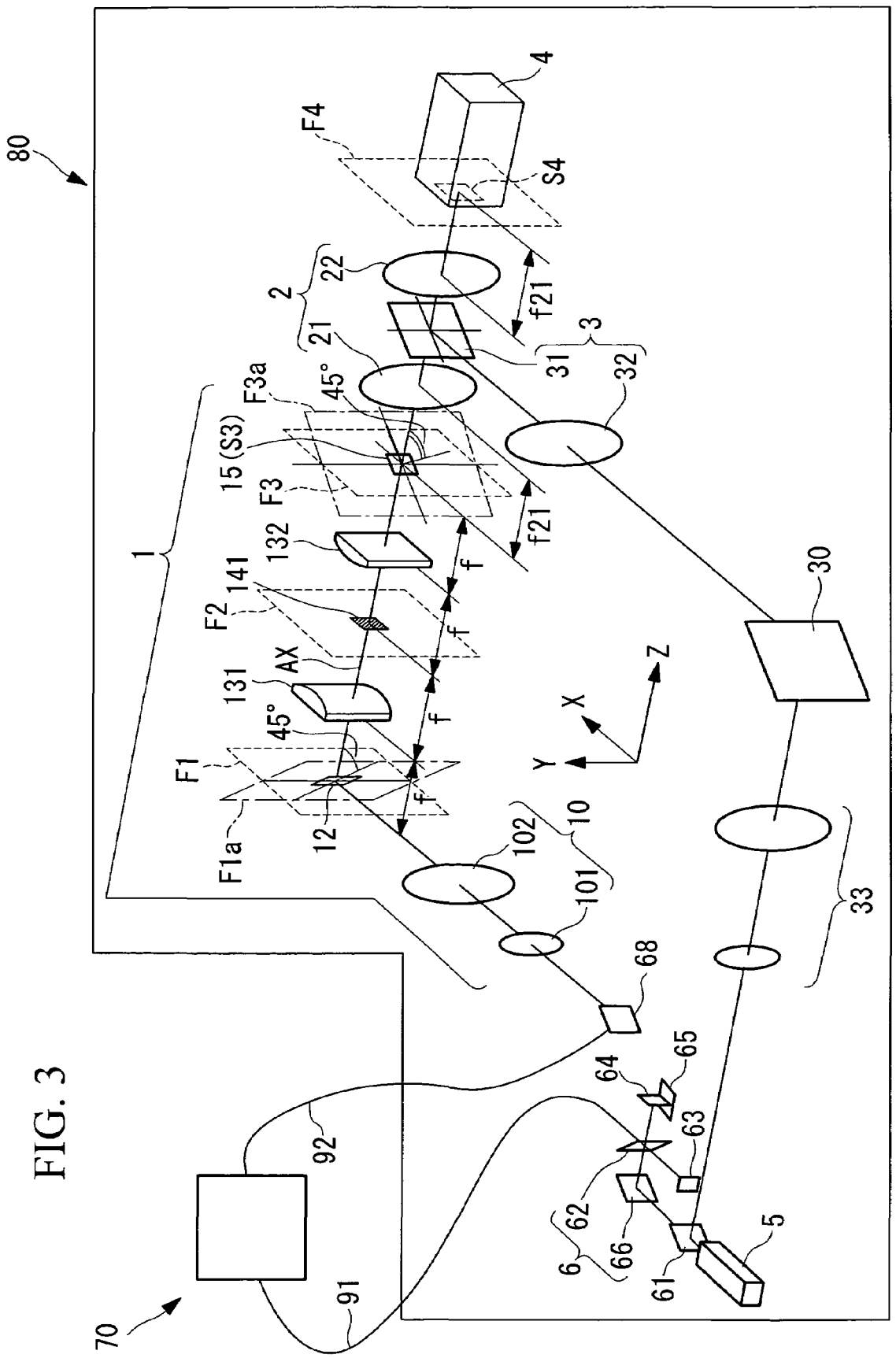
FIG. 3 illustrates the detailed structure of a time-resolved spectroscopy unit of a microscope apparatus 80 according to a first embodiment of the present invention.

FIG. 3 illustrates a microscope apparatus according to a first embodiment and, more specifically, illustrates the detailed structure of a time-resolved spectroscopy unit 80. The basic structure of the microscope apparatus according to the first embodiment is the same as the structure illustrated in FIGS. 1 and 2.

A two-dimensional lightwave conversion optical system 1 of the time-resolved spectroscopy unit 80 according to the first embodiment includes a beam expander 10, a first diffraction grating 12, a first cylindrical lens 131 having a positive refractive power, an optical filter 141, a second cylindrical lens 132 having a positive refractive power, and a second diffraction grating array 15.

A first light-guiding unit 91 includes a beam splitter 723 disposed to the side of the microscope 70. A pair of mirrors may be disposed on the side of the time-resolved spectroscopy unit 80 so that the light flux emitted from the time-resolved spectroscopy unit 80 enters the beam splitter 723. In such a case, one of the mirrors is held so that the X axis is the rotational axis and the other mirror is held so that the Z axis is the rotational axis. In this way, the emission angle of the light flux can be adjusted. The height of the light flux can be adjusted by changing the distance (in the Y direction) between the two mirrors.

A second light-guiding unit 92 includes a dichroic mirror 78 disposed to the side of the microscope 70. According to this embodiment, a mirror 68 is disposed in the two-dimensional lightwave conversion optical system 1. However, the microscope 70 and the time-resolved spectroscopy unit 80 may be disposed, without the mirror 68, in a manner such that a probe beam from the second light-guiding unit 92 is directly guided to the two-dimensional lightwave conversion optical system 1. Instead of providing the mirror 68, a pair of mirrors may be disposed to the side of the time-resolved spectroscopy unit 80, in the same manner as the first light-guiding unit 91.

The relay lens 2 includes lenses 21 and 22.

The splitter 61 is a beam splitter including a half mirror. An ultrashort optical pulse generated by the ultrashort optical pulse source 5 is split into two beams at the splitter 61. The beam reflected at the splitter 61 is the reference beam. The beam that passes through the splitter 61 enters a delaying optical system 6, where a probe beam and a pump beam are generated. The delaying optical system 6 includes a beam splitter 62, mirrors 63, 64, and 66, and a movable stage 65.

The beam that passes through the splitter 61 is reflected at the mirror 66. The reflected beam is split at the beam splitter 62. The beam reflected at the beam splitter 62 is reflected at the mirror 63 and passes through the beam splitter 62. The beam that passes through the beam splitter 62 is reflected at the mirror 64 and is then reflected at the beam splitter 62. At this time, the stage 65 moves along the incident direction of the light. Consequently, a difference occurs in the length of the optical paths of the beam reflected at the mirror 63 and the beam reflected at the mirror 64. By changing the optical path lengths of these reflected beams, one of the beams will have a time delay relative to the other beam. According to this embodiment, the beam not having a time delay is used as a pump beam and the beam having a time delay is used as a beam of probe light. The two types of beams are guided to the microscope 70 through the first light-guiding unit 91.

In the propagating direction of the reference beam, a beam expander 33, a mirror 30, and the multiplexer 3 are disposed. The multiplexer 3 includes a beam splitter 31 and a lens 32. Since the lens 32 functions as a beam expander when combined with the lens 22, the reference beam that is split at the splitter 61 is emitted to the imaging device 4 as a collimated beam. The beam splitter 31 reflects the reference beam that has passed through the lens 32 and, at the same time, transmits the two-dimensional lightwave converted at the two-dimensional lightwave conversion optical system 1. As a result, the two beams are combined in the direction of the imaging device 4.

The structure for guiding the reference beam split at the splitter 61 to the multiplexer 3 may be a structure other than that described above.

The process of carrying out time-resolved spectroscopy using a microscope structured as described above will now be described.

The specimen S is observed through the microscope 70. Different observation methods include bright-field microscopy, fluorescence microscopy, and differential interference microscopy. A minute region of the specimen S is moved to the center of the observation field of view for observation using a predetermined method. The specimen S is moved using an XY stage 752 of a stage 75. The minute region is the region where time-resolved spectroscopy is carried out.

Next, the process of carrying out time-resolved spectroscopy on a minute region in the specimen S will be described.

The ultrashort optical pulse generated at the ultrashort optical pulse source 5 is split into a pump beam, a probe beam, and a reference beam at the splitter 61 and the delaying optical system 6. The pump beam and the probe beam are delayed with respect to each other.

The pump beam and the probe beam are guided to the microscope 70 through the first light-guiding unit 91. More specifically, the pump beam and the probe beam are guided to the beam splitter 723 disposed in the optical path of the transmission-illumination optical system 72. Then, the pump beam and the probe beam are radiated onto the minute region in the specimen S through the beam splitter 723. First, the minute region in the specimen S is excited by the pump beam. Then, the probe beam is radiated onto the same minute region with a time delay.

At this time, the probe beam is modulated by the minute region in the specimen S excited by the pump beam. The modulated probe beam (hereinafter referred to as "modulated probe beam") is guided to the outside of the microscope 70 through an objective lens 731 and the dichroic mirror (second light-guiding unit) 78. The probe beam enters the two-dimensional lightwave conversion optical system 1 of the time-resolved spectroscopy unit 80.

The beam expander 10 expands the diameter of the modulated probe beam and emits this modulated probe beam to the first diffraction grating 12 at an angle. The first diffraction grating 12 is a transmissive diffraction grating. However, the first diffraction grating 12 may be a reflective diffraction grating. The first diffraction grating 12 is disposed at a predetermined angle θ so that it intersects with (i.e. so that it is not parallel to) a front focal plane F1 of the first cylindrical lens 131. According to this embodiment, the surface of the first diffraction grating 12 is disposed at an angle θ with respect to the X axis (a horizontal axis orthogonal to the optical axis (Z axis)). The first diffraction grating 12 is disposed in a manner such that the center of the surface of the first diffraction grating 12 is positioned at the front focal plane F1 (front focal position) or in the vicinity of the front focal plane F1.

Figure 4:
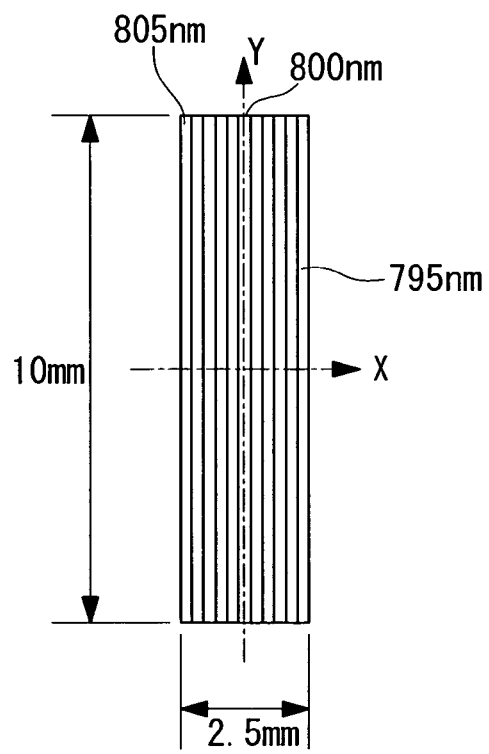
FIG. 4 illustrates a probe beam distribution on an optical filter 141 of the time-resolved spectroscopy unit of the microscope apparatus 80 according to the first embodiment.

The first diffraction grating 12 diffracts in the X direction the sequentially radiated wavelength components of the modulated probe beam. The first cylindrical lens 131 distributes each of the wavelength components of the diffracted modulated probe beam on a rear focal plane F2. The resulting distribution is illustrated in FIG. 4.

Figure 5:
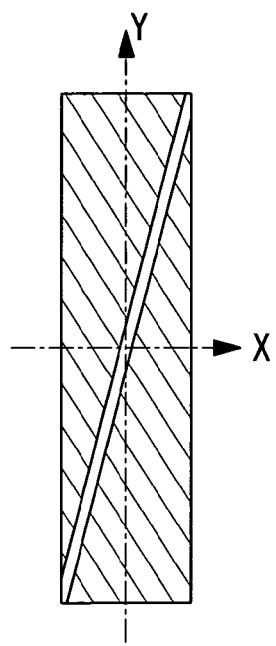
FIG. 5 illustrates a slit formed on the optical filter 141 of the time-resolved spectroscopy unit of the microscope apparatus 80 according to the first embodiment.
Figure 6:
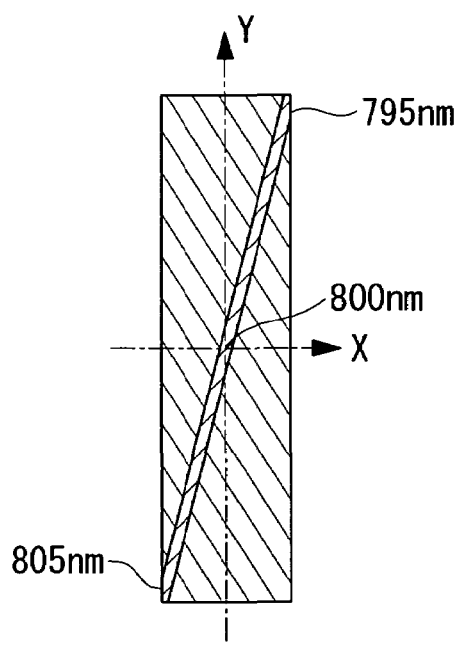
FIG. 6 illustrates a wavelength distribution of a probe beam transmitted through the optical filter 141 of the microscope apparatus according to the first embodiment.

The optical filter 141 is disposed in the vicinity of the rear focal plane F2 of the first cylindrical lens 131. The optical filter 141 has a slit, as illustrated in FIG. 5. This slit is formed from the lower left corner to the upper right corner of the optical filter 141. By emitting a modulated probe beam to the first diffraction grating 12 at an angle, a modulated probe beam emitted with a delay depending on the incident positions along the X direction is obtained. Such a modulated probe beam is composed of a plurality of wavelength components. By using the optical filter 141, each wavelength component is extracted in accordance with the position relative to the Y axis (vertical axis orthogonal to the optical axis (Z axis)). As a result, as illustrated in FIG. 6, the modulated probe beam is filtered so that different wavelengths are distributed along the Y axis. The modulated probe beam that has passed through the slit of the optical filter 141 enters the second cylindrical lens 132. At this time, the wavelength components of the modulated probe beam are parallel to the X-Z plane and are aligned in the Y direction.

Figure 7:
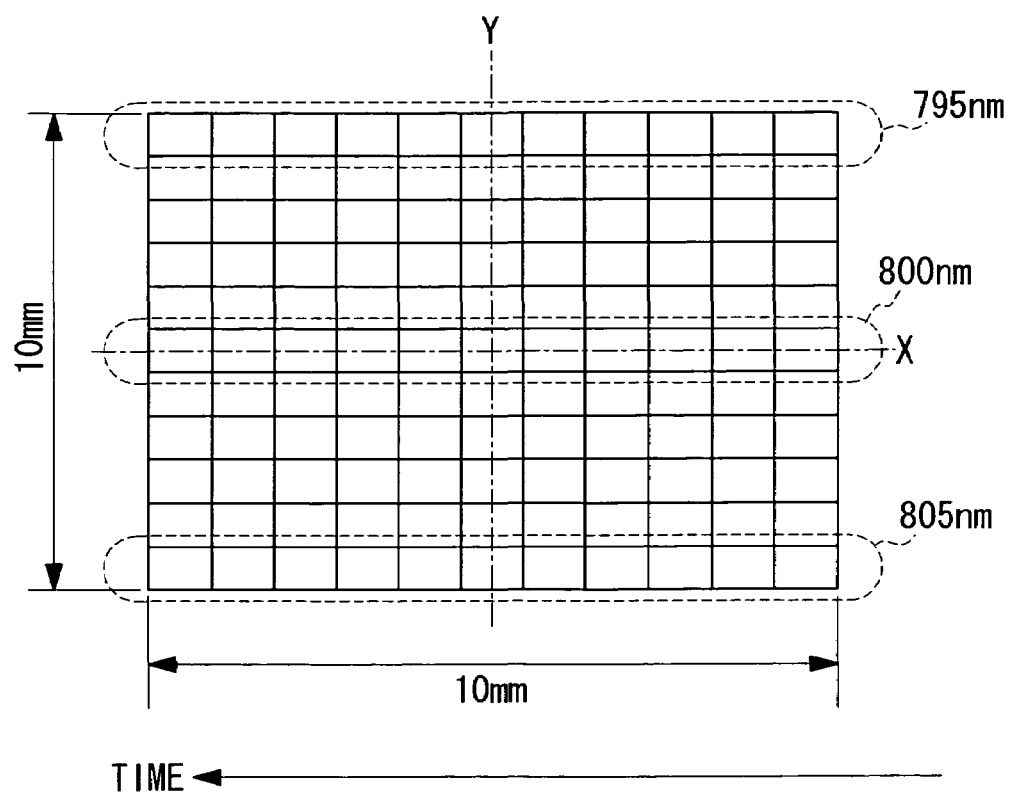
FIG. 7 illustrates a two-dimensional lightwave distribution generated by a two-dimensional lightwave conversion optical system 1 of the microscope apparatus according to an embodiment of the present invention.

The beams of each wavelength (i.e., modulated probe beams) that have entered the second cylindrical lens 132 form an image on a plane F3a in the vicinity of the rear focal plane F3 of the second cylindrical lens 132. The position of the rear focal plane F3 is conjugate to the position of the first diffraction grating 12. As a result, as illustrated in FIG. 7, the different wavelength components are converted in a manner such that time is represented by the X axis and the wavelength is represented by the Y axis. More specifically, the modulated probe beam satisfies the following conditions: 1) the beams aligned along the X axis are sequentially delayed; and 2) the beams aligned along the Y axis are the wavelength components of the modulated probe beam that has been resolved. A two-dimensional lightwave is a modulated probe beam satisfying the conditions 1) and 2).

Figure 8:
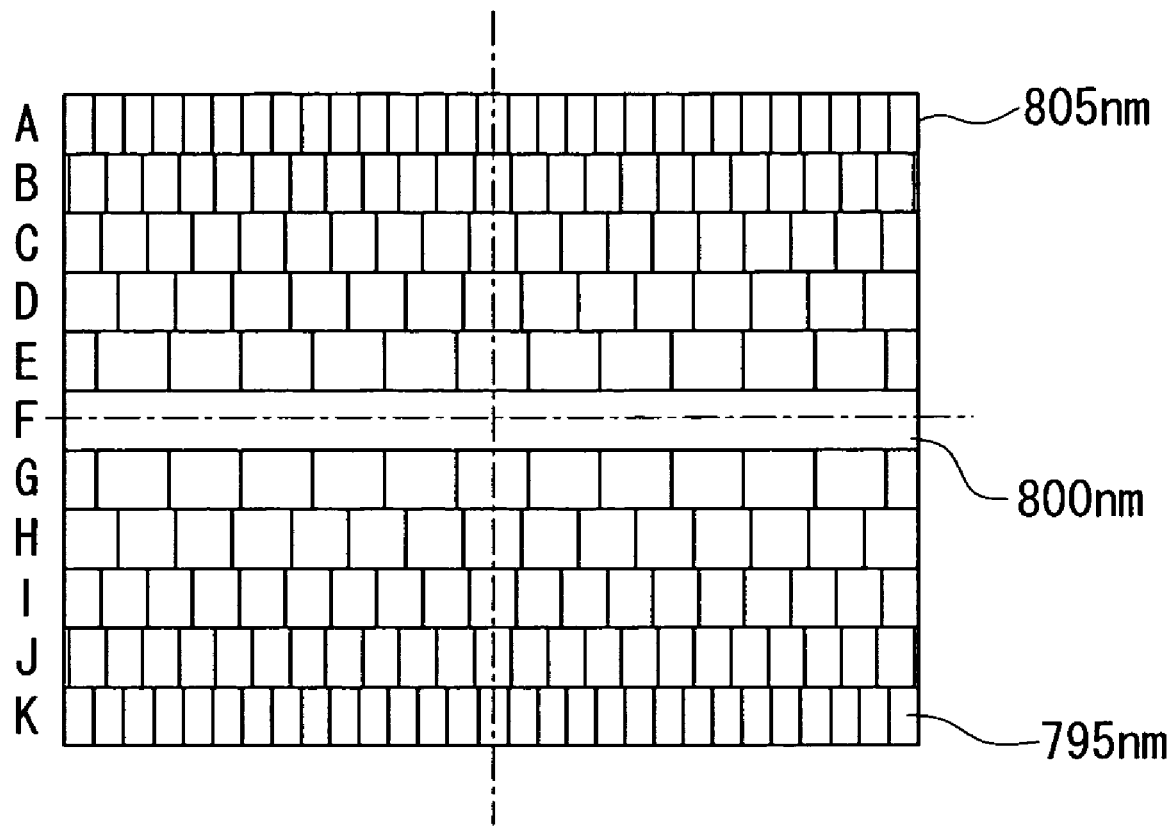
FIG. 8 illustrates a second diffraction grating array 15 used for the two-dimensional lightwave conversion optical system 1 of the microscope apparatus according to an embodiment of the present invention.

The second diffraction grating array 15 is disposed on the plane F3a. As illustrated in FIG. 8, diffraction gratings 15A to 15K having different grating constants (period) for each wavelength are aligned in the Y direction. As illustrated in FIG. 7, the different wavelength components of the two-dimensional lightwaves on the plane F3a are spatially separated along the Y direction. Therefore, the direction of diffraction of the wavelength components of the modulated probe beam can be matched by using the second diffraction grating array 15. According to this embodiment, the propagating directions of the beams having different wavelengths each have an angular distribution (i.e., the directions vary) in the X direction. The second diffraction grating array 15 can reduce the angular distribution in the X direction. In this embodiment, the angular distribution of the beam emitted from the plane F3a is reduced to substantially zero by the second diffraction grating array 15.

The relay lens 2 forms a two-dimensional lightwave image S4 on an image plane F4 of the imaging device 4.

At the same time, the reference beam is emitted on the image plane F4 through the multiplexer 3. Accordingly, interference between the two-dimensional lightwave image S4 and the reference beam occurs on the image plane F4. Consequently, a spectrogram of the modulated probe beam is generated as an interference pattern. This interference pattern enables the change of the wavelength components included in the modulated probe beam over time to be measured.

Second Embodiment

Now, a microscope apparatus according to a second embodiment will be described.

Figure 9:
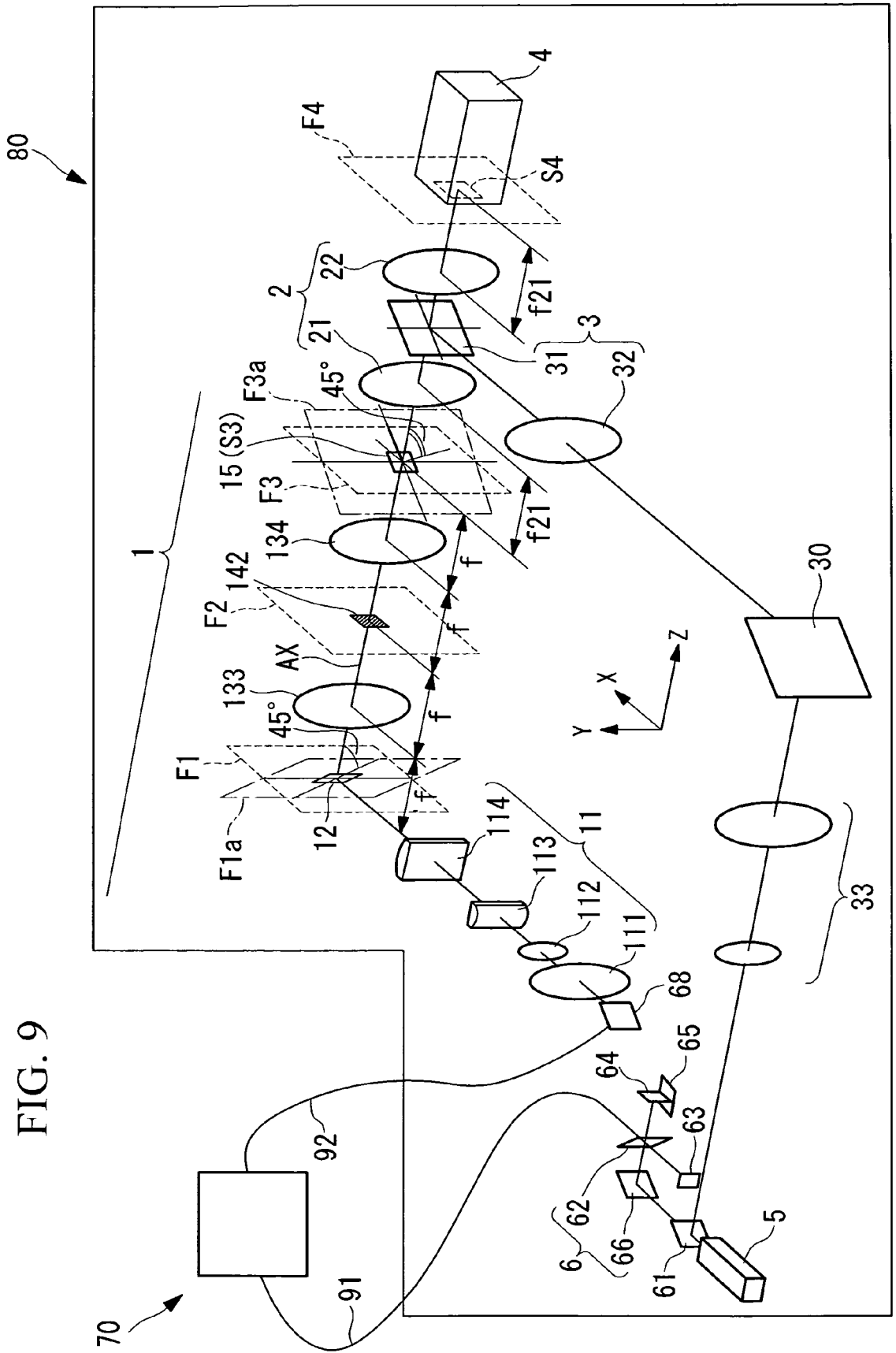
FIG. 9 illustrates the detailed structure of a time-resolved spectroscopy unit of microscope apparatus 80 according to a second embodiment of the present invention.

FIG. 9 illustrates a microscope apparatus according to a second embodiment and, more specifically, illustrates the detailed structure of a time-resolved spectroscopy unit 80.

The structure of the microscope apparatus according to the second embodiment is the same as that of the microscope apparatus according to the first embodiment except that the two-dimensional lightwave conversion optical system 1 included in the time-resolved spectroscopy unit 80 differs.

The two-dimensional lightwave conversion optical system 1 according to the second embodiment includes a cylindrical beam expander 11, a first diffraction grating 12, a first lens 133 having a positive refractive power, a first diffraction grating array 142, a second lens 134 having a positive refractive power, and a second diffraction grating array 15.

The cylindrical beam expander 11 expands the diameter of the modulated probe beam and emits this modulated probe beam to the first diffraction grating 12 at an angle. In this embodiment also, the first diffraction grating 12 is a transmissive diffraction grating. However, the first diffraction grating 12 may instead be a reflective diffraction grating. The first diffraction grating 12 is disposed at a predetermined angle θ with respect to the X axis so that it intersects with (i.e., so that it is not parallel to) a front focal plane F1 of the first lens 133. The center of the first diffraction grating 12 is disposed so as to be disposed at the front focal plane F1 (i.e., front focal point) or in the vicinity of the front focal plane F1.

Figure 10:
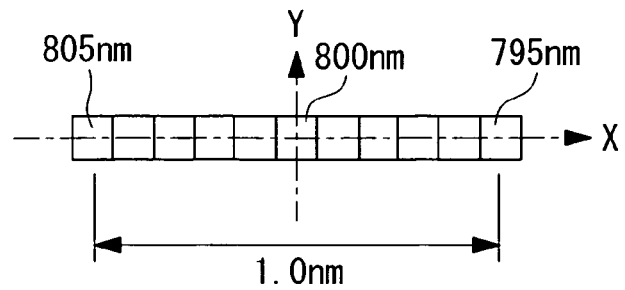
FIG. 10 illustrates a distribution of a probe beam on the first diffraction grating array 142 of the time-resolved spectroscopy unit of the microscope apparatus 80 according to the second embodiment.

The first diffraction grating 12 diffracts the sequentially radiated wavelength components of the modulated probe beam in the X direction. The first lens 133 distributes the diffracted wavelength components of the modulated probe beam on a rear focal plane F2 of the first lens 133. The distribution is illustrated in FIG. 10.

Figure 11:
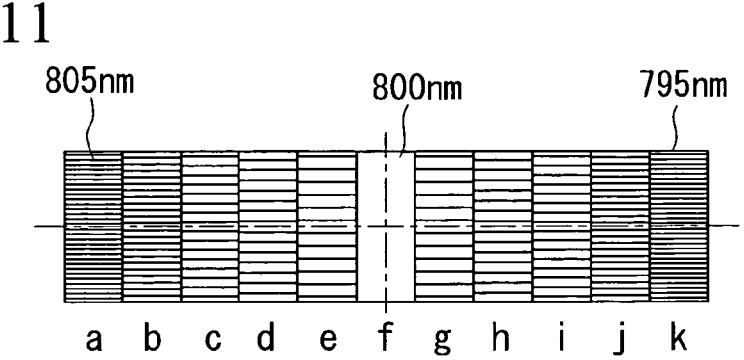
FIG. 11 illustrates the first diffraction grating array 142 of the time-resolved spectroscopy unit of the two-dimensional lightwave conversion optical system 1 of the microscope apparatus according to the second embodiment.
Figure 12:
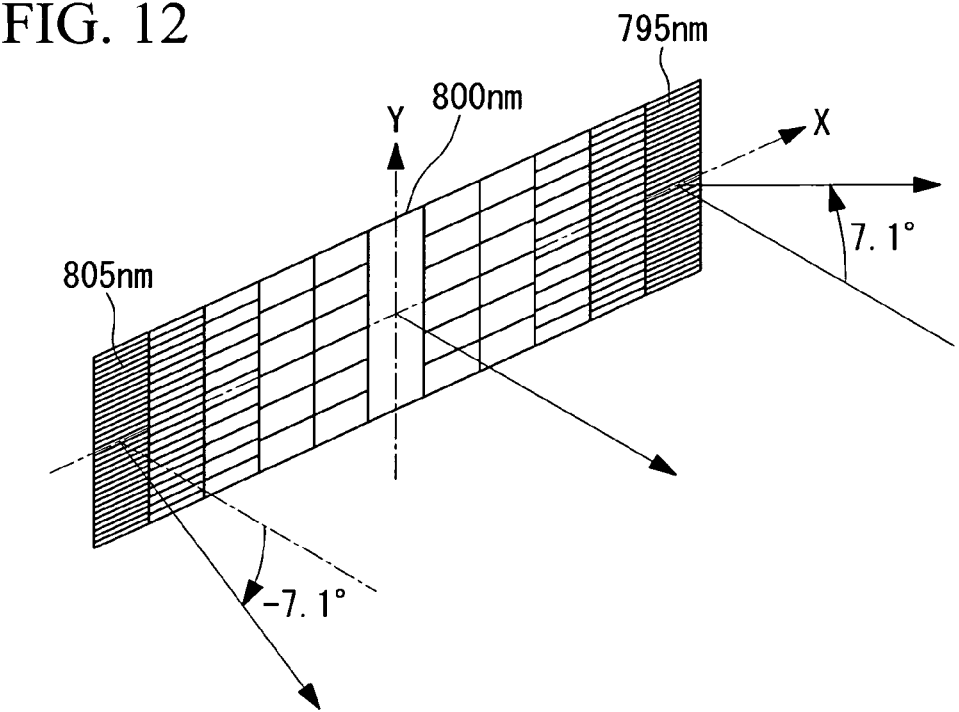
FIG. 12 illustrates a probe beam diffracted by the first diffraction array 142 of the second embodiment.

The first diffraction grating array 142 is an optical filter disposed in the vicinity of the rear focal plane F2 of the first lens 133. As illustrated in FIG. 11, diffraction gratings 142a to 142k having different grating constants (periods) are aligned along the X axis. As illustrated in FIG. 12, the different wavelength components of the modulated probe beam are diffracted at different angles along the Y axis at the diffraction gratings 142a to 142k. The wavelength components diffracted at the first diffraction grating array 142 are incident on the second lens 134.

The wavelength components incident on the second lens 134 form an image on a plane F3a in the vicinity of a rear focal plane F3 of the second lens 134. The position of the rear focal plane F3 and the position of the first diffraction grating 12 are conjugate to each other. As a result, as illustrated in FIG. 7, the wavelength components are converted into two-dimensional lightwaves, wherein time changes in the X direction and the wavelength components are distributed in the Y direction.

The subsequent steps are the same as those according to the first embodiment. In other words, a pump beam and a probe beam are radiated onto a minute region of a specimen S under microscope observation. The probe beam modulated at the minute region excited by the pump beam is converted into a spectrogram representing time and wavelength. In this way, time-resolved spectroscopy can be carried out at the minute region.

FIRST EXAMPLE

Now, detailed examples of the second embodiment will be described.

A microscope apparatus according to a first example more specifically exemplifies a structure of the microscope apparatus according to the first embodiment.

The drawings to be referred to are the same as those referred to in the first embodiment.

In the same manner as the microscope apparatus according to the first embodiment, the microscope apparatus according to the first example is constructed so that a specimen S is observed through a microscope 70 and time-resolved spectroscopy is carried out at a minute region of the specimen S by a time-resolved spectroscopy unit 80. Only those parts that are specified more concretely than those of the microscope apparatus according to the first embodiment will be described below. Other structures and effects are the same as those of the first embodiment.

The beam used for carrying out time-resolved spectroscopy is an ultrashort optical pulse having a central wavelength of 800 nm, a linewidth of ±5 nm, and a pulse width of about 100 femtoseconds. This ultrashort optical pulse is used as a probe beam and is modulated. Time-resolved spectroscopy is carried out by obtaining a spectrogram of the modulated probe beam.

An ultrashort optical pulse source 5 generates an ultrashort optical pulse having a central wavelength of 800 nm, a linewidth of ±5 nm, and a pulse width of 100 femtoseconds.

A two-dimensional lightwave conversion optical system 1 includes a beam expander 10, a first Bragg diffraction grating 12, a first cylindrical lens 131, an optical filter 141, a second cylindrical lens 132, and a second diffraction grating array 15. The beam expander 10 includes a lens 101 having a focal length of 10 mm and a lens 102 having a focal length of 100 mm. The first cylindrical lens 131 has a focal length f=100 mm and a positive refractive power, and the second cylindrical lens 132 has a focal length f=100 mm and a positive refractive power.

The first Bragg diffraction grating 12 is a transmissive diffraction grating. The first Bragg diffraction grating 12 is disposed at a 45° angle with respect to the X axis so that it intersects with (i.e., so that it is not parallel to) a front focal plane F1 of the first cylindrical lens 131. The first Bragg diffraction grating 12 is disposed in a manner such that its surface is aligned with a plane F1a in the vicinity of the front focal plane F1 (i.e., is aligned with the plane obtained by rotating the front focal plane F1 of the first cylindrical lens 131 by substantially 45°). Accordingly, the angle between the normal of the first Bragg diffraction grating 12 and an optical axis AX is substantially 45°. With respect to the first and second cylindrical lenses 131 and 132, the plane F1a is conjugate with the plane F3a. The plane F3a is obtained by rotating a rear focal plane F3 of the second cylindrical lens 132 by 45°. Accordingly, the conjugate plane F3a will also be disposed at substantially 45° to the optical axis AX. The grating constant of the first Bragg diffraction grating 12 is set to 1,767 lines per millimeter so that the diffraction direction of the central wavelength component of the probe beam emitted at an incident angle of 45° substantially aligns with the optical axis AX.

In the first example, the modulated probe beam is expanded substantially ten times at the beam expander 10. The size of the first Bragg diffraction grating 12 is about 14.14×10 mm. The modulated probe beam is incident on this first Bragg diffraction grating 12 at an angle. At this time, the modulated probe beam has a wavelength range of 800±5 nm. Consequently, as illustrated in FIG. 4, the wavelength components included in the modulated probe beam are distributed along the X axis on the rear focal plane F2 of the first cylindrical lens 131. For example, the wavelength components, 805 nm, 800 nm, and 795 nm are distributed at positions −1.26 mm, 0 mm, +1.24 mm, respectively, from the optical axis AX.

The structure of the optical filter 141 is the same as that of the optical filter 141 according to the first embodiment. A two-dimensional lightwave S3 is generated on the plane F3a through the optical filter 141. In this example, the size of the two-dimensional lightwave S3 is 14.14×10 mm.

The second diffraction grating array 15 corrects the angular distribution of each wavelength component in the two-dimensional lightwave S3 incident on the plane F3a. The specification of the second diffraction grating array 15 is shown in Table 1 below. In Table 1, 'Incident Angle' is the angle between a wavelength component incident on the plane F3a and the normal of the second diffraction grating array 15. If diffraction gratings 15A to 15K included in the second diffraction grating array 15 have periodic structures, as shown in Table 1, the diffraction angle for each wavelength component will be 45°. As a result, the angular distribution of the wavelength components emitted from the plane F3a is substantially zero.

TABLE 1

Specification of Second Diffraction Grating Array 15

|   | Central Wavelength (nm) | Grating Constant (lines/mm) | Incident Angle (°) |
|---|---|---|---|
| A | 805 | −11.0 | 45.7 |
| B | 804 | −8.8 | 45.6 |
| C | 803 | −6.6 | 45.4 |
| D | 802 | −4.4 | 45.3 |
| E | 801 | −2.2 | 45.1 |
| F | 800 | 0.0 | 45.0 |
| G | 799 | 2.2 | 44.9 |
| H | 798 | 4.4 | 44.7 |
| I | 797 | 6.6 | 44.6 |
| J | 796 | 8.8 | 44.4 |
| K | 795 | 11.0 | 44.3 |

The relay lens 2 distributes the two-dimensional lightwave image S4 on the image plane F4. The relay lens 2 includes lenses 21 and 22 both having a focal length f21=100 mm.

The multiplexer 3 includes the lens 32 having a focal length of 100 mm and a beam splitter 31.

By emitting a reference beam through the multiplexer 3 at the same time as the two-dimensional lightwave image S4 is distributed on the image plane 4, the two-dimensional lightwave image S4 can be recorded as an interference pattern.

A charge-coupled device (CCD) is used as the imaging device 4 to obtain the interference pattern of the two-dimensional lightwave image S4.

The microscope apparatus according to the first example is capable of simultaneously carrying out microscopy of an extremely small region and time-resolved spectroscopy of a modulated probe beam on the order of picoseconds to femtoseconds.

SECOND EXAMPLE

A microscope apparatus according to a second example more specifically exemplifies a structure of the microscope apparatus according to the second embodiment. The second example differs from the first example only in the two-dimensional lightwave conversion optical system 1.

The microscope apparatus according to the second example will be described with reference to the same drawings referred to in the description of the microscope apparatus according to the second embodiment. The two-dimensional lightwave conversion optical system 1 according to the second example will be described below. The structure and effects of the other components are the same as those according to the first example.

The two-dimensional lightwave conversion optical system 1 includes a cylindrical beam expander 11, a first Bragg diffraction grating 12, a first lens 133 having focal length f=40 mm and positive refractive power, a first diffraction grating array 142, a second lens 134 having a focal length f=40 mm and positive refractive power, and a second diffraction grating array 15. The cylindrical beam expander 11 includes a lens 111 having a focal length of 100 mm, a lens 112 having a focal length of 50 mm, and cylindrical lenses 113 and 114 having ten times (10×) magnification.

The first Bragg diffraction grating 12 is a transmissive diffraction grating. The first Bragg diffraction grating 12 is disposed at a 45° angle with respect to the X axis so that it intersects with (i.e., so that it is not parallel to) a front focal plane f1 of the first lens 133. The first Bragg diffraction grating 12 is disposed in a manner such that its surface is aligned with a plane F1a in the vicinity of the front focal plane F1 (i.e., is aligned with the plane obtained by rotating the front focal plane F1 of the first cylindrical lens 133 by substantially 45°). Accordingly, the angle between the normal of the first Bragg diffraction grating 12 and an optical axis AX is substantially 45°. With respect to the first and second cylindrical lenses 133 and 134, the plane F1a is conjugate with the plane F3a. The conjugate plane F3a is obtained by rotating a rear focal plane F3 of the second cylindrical lens 134 by 45°. Accordingly, the conjugate plane F3a will also be disposed at substantially 45° to the optical axis AX. The grating constant of the first Bragg diffraction grating 12 is 1,767 lines per millimeter so that the diffraction direction of the central wavelength component of the probe beam emitted at an incident angle of 45° substantially aligns with the optical axis AX.

In the second example, the modulated probe beam is expanded substantially ten times at the beam expander 11. The size of the first Bragg diffraction grating 12 is about 14.14×1 mm. The modulated probe beam is incident on the first Bragg diffraction grating 12 at an angle. At this time, the modulated probe beam has a wavelength range of 800±5 nm. Consequently, as illustrated in FIG. 10, the wavelength components included in the modulated probe beam are distributed along the X axis on the rear focal plane F2 of the first cylindrical lens 133. For example, the wavelength components, 805 nm, 800 nm, and 795 nm are distributed at positions −0.5 mm, 0 mm, and +0.5 mm, respectively, from the optical axis AX.

The first diffraction grating array 142 functions as an optical filter. The structure of the first diffraction grating array 142 is the same as that according to the second embodiment. The specification of the first diffraction grating array 142 is shown in Table 2 below. In Table 2, the grating constant is positive when a beam is diffracted in the positive direction along the Y axis on the plane F2 and is negative when a beam is diffracted in the negative direction along the Y axis on the plane F2. The Y coordinate represents the height of each wavelength component in the Y direction emitted from the second lens 134.

TABLE 2

Specification of First Diffraction Grating Array 142

|   | Central Wavelength (nm) | Grating Constant (lines/mm) | Diffraction Angle (°) | Y Coordinate (mm) |
|---|---|---|---|---|
| a | 805 | −154.1 | −7.1 | −5 |
| b | 804 | −123.8 | −5.7 | −4 |
| c | 803 | −93.1 | −4.3 | −3 |
| d | 802 | −62.3 | −2.9 | −2 |
| e | 801 | −31.2 | −1.4 | −1 |
| f | 800 | 0 | 0.0 | 0 |
| g | 799 | +31.3 | +1.4 | +1 |
| h | 798 | +62.6 | +2.9 | +2 |
| i | 797 | +93.8 | +4.3 | +3 |
| j | 796 | +125.0 | +5.7 | +4 |
| k | 795 | +156.0 | +7.1 | +5 |

The wavelength components diffracted at the first diffraction grating array 142 pass through the second lens 134 and are incident on the conjugate plane F3a as a beam parallel to the XZ plane. At this time, the wavelength components of the probe beam are distributed along the Y axis on the conjugate plane F3a. As probe beams are sequentially radiated onto the first Bragg diffraction grating 12 at the plane F1a, the wavelength distribution moves along the X axis on the conjugate plane F3a. As a result, a two-dimensional lightwave S3 is generated, as illustrated in FIG. 7, where time is represented by the X axis and the wavelength is represented by the Y axis. The size of the two-dimensional lightwave S3 at the conjugate plane F3a is 14.14×10 mm.

The second diffraction grating array 15 corrects the angular distribution of each wavelength component of the two-dimensional lightwave S3 incident on the conjugate plane F3a. The specification of the second diffraction grating array 15 is shown in Table 3 below. In Table 3, 'Incident Angle' is the angle of the wavelength component to the normal of the second diffraction grating array 15 when the beam is incident on the conjugate plane F3a. If the diffraction gratings 15A to 15K constituting the second diffraction grating array 15 have a periodic structure as shown in Table 3, the diffraction angle for each wavelength component will be 45°. As a result, the angular distribution of each wavelength component emitted from the conjugate plane F3a is substantially zero.

TABLE 3

Specification of Second Diffraction Grating Array 15

|   | Central Wavelength (nm) | Grating Constant (lines/mm) | Incident Angle (°) |
|---|---|---|---|
| A | 805 | −11.0 | 45.7 |
| B | 804 | −8.8 | 45.6 |
| C | 803 | −6.6 | 45.4 |
| D | 802 | −4.4 | 45.3 |
| E | 801 | −2.2 | 45.1 |
| F | 800 | 0.0 | 45.0 |
| G | 799 | 2.2 | 44.9 |
| H | 798 | 4.4 | 44.7 |
| I | 797 | 6.6 | 44.6 |
| J | 796 | 8.8 | 44.4 |
| K | 795 | 11.0 | 44.3 |

The microscope apparatus according to the second example is capable of simultaneously carrying out microscopy of an extremely small region and time-resolved spectroscopy of a probe beam modulated on the order of picoseconds to femtoseconds.

Third Embodiment

Now, a microscope apparatus according to a third embodiment will be described below with reference to FIGS. 16 to 22.

In a microscope apparatus according to the third embodiment, a time-resolved spectroscopy unit (time-resolved spectroscopy device) 80a is used. The components that are the same as those included in the microscope apparatuses according to the above-described embodiments are represented by the same reference numerals and their descriptions are omitted.

The time-resolved spectroscopy unit 80a is capable of observing the behavior of a specimen within an ultrashort time period on the order of picoseconds to femtoseconds by analyzing a light signal (probe beam) that has been modulated by the specimen.

A reducing optical system is used as a relay optical system according to this embodiment. This relay optical system will be described below.

To carry out satisfactory time-resolved spectroscopy, the diffraction efficiency of a diffraction grating must be increased. Therefore, when actually operating a two-dimensional lightwave conversion optical system, the diffraction grating is disposed at an angle so that the normal of the diffraction grating is about 45° to the optical axis of the two-dimensional lightwave conversion optical system.

By disposing the diffraction grating at an angle with respect to the optical axis of the two-dimensional lightwave conversion optical system, a surface of an optical system constituted of a first cylindrical lens, which is a one-dimensional Fourier transformation optical system, and a second cylindrical lens, which is a one-dimensional Fourier inverse-transformation optical system, that is conjugate with the diffraction grating will also be tilted with respect to the optical axis of the two-dimensional lightwave conversion optical system. Therefore, the image plane where an interference pattern is captured must also be disposed at an angle so that the image plane will be conjugate with the surface conjugate with the diffraction grating.

However, a usual imaging device, such as a CCD camera, is often not capable of handling beams incident on the image plane at an angle because shading occurs due to the structure of the imaging device. When the image plane is disposed at an angle with respect to the optical axis, the accuracy of the interference pattern captured by the imaging device is low. Therefore, it is difficult to carry out highly accurate time-resolved spectroscopy.

This is why a reducing optical system is used as the relay optical system according to this embodiment.

According to this configuration, a quasi-two-dimensional spectrogram formed by the two-dimensional lightwave conversion optical system on the surface conjugate with the diffraction grating is projected on the image plane of the imaging device through the relay optical system.

To project the quasi-two-dimensional spectrogram on the surface conjugate with the diffraction grating, the relay optical system and the image plane are positioned as described below.

A condenser lens included in the relay optical system is disposed so that its front focal point is disposed at the surface conjugate with the diffraction grating. A collimating lens included in the relay optical system is disposed so that its front focal point is aligned with the rear focal point of the condenser lens and is disposed at the image plane.

Since, in this configuration, too, the diffraction grating is disposed at an angle with respect to the optical axis, the surface conjugate with the diffraction grating is also disposed at an angle with respect to the optical axis. As a result, the image plane is disposed at a position where the line of intersection of an imaginary plane including the image plane and an imaginary plane including the surface conjugate with the diffraction grating is disposed on a reference plane orthogonal to the optical axis and passing through the rear focal point of the condenser lens. In other words, the image plane is disposed at an imaginary plane that: passes through the line of intersection of the imaginary plane including the surface conjugate with the diffraction grating and the reference plane; and passes through the imaginary plane passing through the rear focal point of the collimating lens.

Based on this, the angle of the normal of the image plane with respect to the optical axis depends not only on the angle of the diffraction grating but also on the position of the rear focal point of the collimating lens. The closer the rear focal point of the collimating lens is to the rear focal point of the condenser lens, the smaller the angle of the normal of the image plane to the optical axis will be.

In other words, the shorter the focal length of the collimating lens is, the smaller the angle of the normal of the image plane to the optical axis will be.

In the above-described relay optical system having a reducing power, the ratio of the focal length of the collimating lens to the focal length of the condenser lens is small compared to a unit-magnification relay optical system. In other words, in the time-resolved spectroscopy unit according to this embodiment, the length from the rear focal point of the condenser lens to the rear focal point of the relay optical system is shorter and the image plane is closer to the rear focal point of the condenser lens compared to the unit-magnification relay optical system.

In this way, with the above-described structure, the angle of the normal of the image plane to the optical axis can be reduced without reducing the angle of inclination of the diffraction grating. Accordingly, a light flux passing through the relay optical system can be radiated onto the image plane at a small incident angle with respect to the normal of the image plane without reducing the diffraction efficiency of the diffraction grating.

Figure 16:
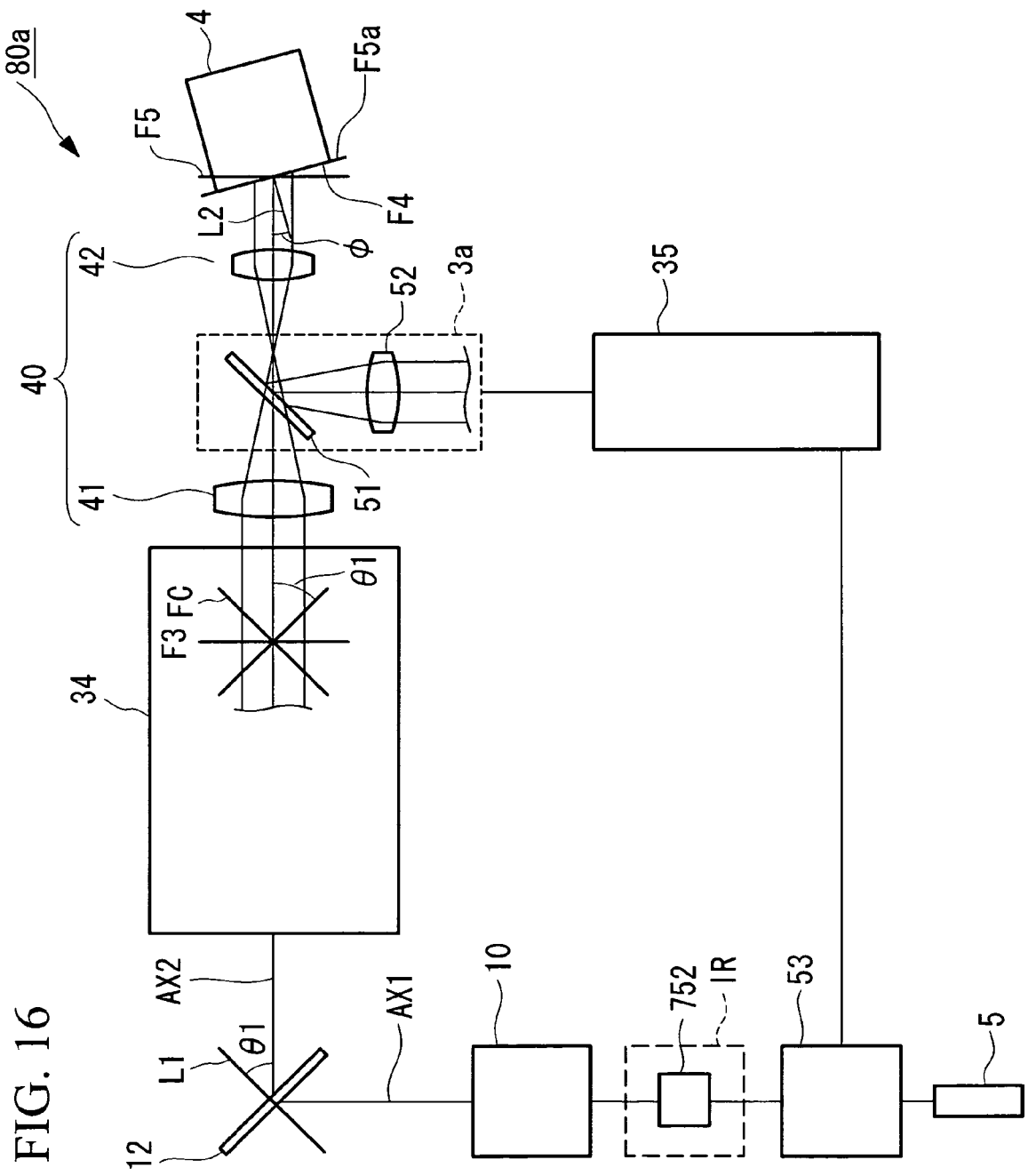
FIG. 16 is a block diagram illustrating the overall structure of a time-resolved spectroscopy unit according to a third embodiment of the present invention.
Figure 17:
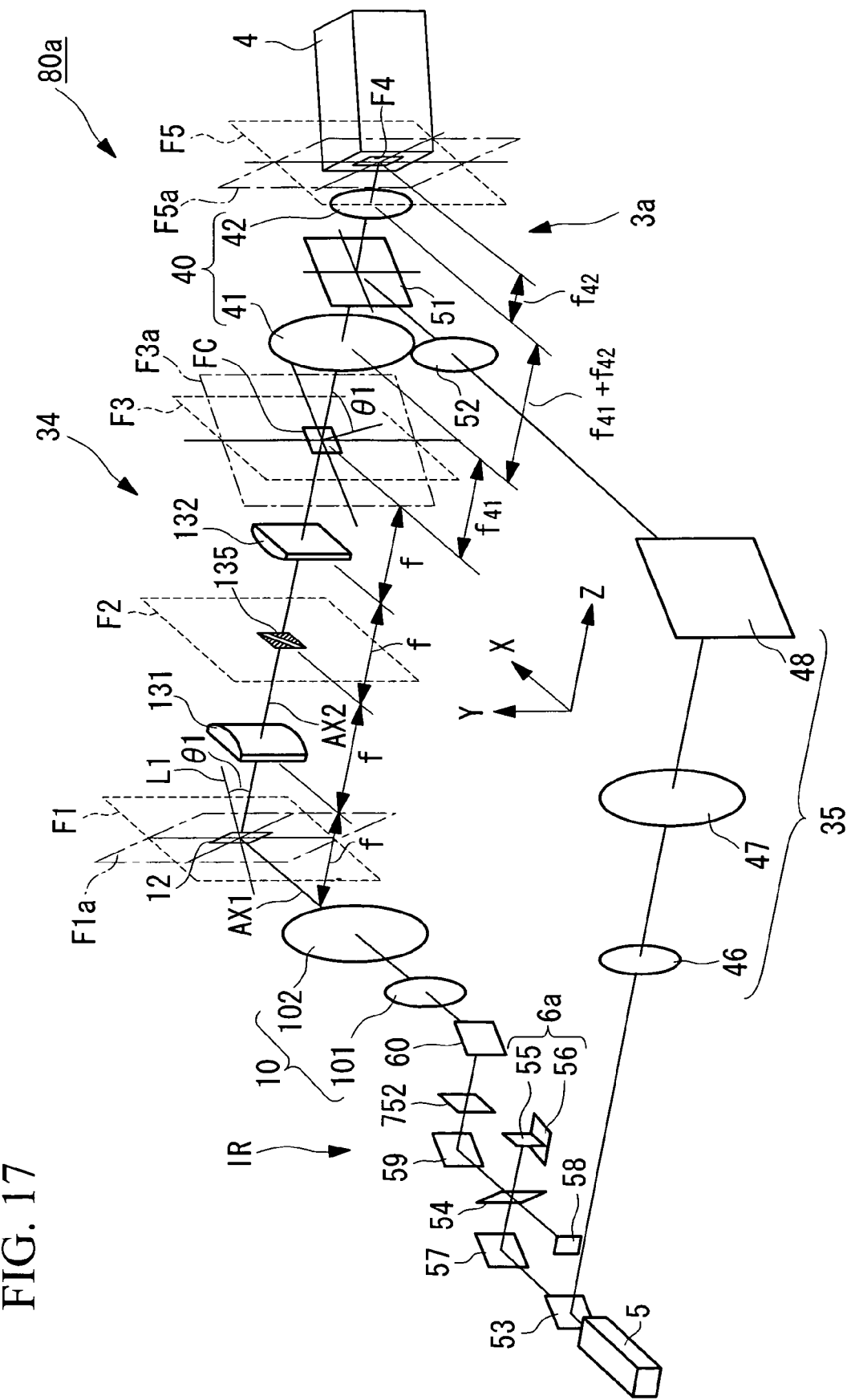
FIG. 17 is a perspective view of the overall structure of a time-resolved spectroscopy unit according to a third embodiment of the present invention.

More specifically, as illustrated in FIGS. 16 and 17, a time-resolved spectroscopy unit 80a includes an ultrashort optical pulse source 5, an irradiating optical system IR, and a beam expander (first beam-shaping optical system) 10. The ultrashort optical pulse source 5 generates an ultrashort optical pulse having a pulse width on the order of picoseconds to femtoseconds. The irradiating optical system IR guides the ultrashort optical pulse generated by the ultrashort optical pulse source 5 to an XY stage 752 used for holding a specimen. The beam expander (first beam-shaping optical system) 10 shapes the ultrashort optical pulse (probe beam) that is emitted from the irradiating optical system IR, radiated onto the specimen on the XY stage 752, and modulated by the specimen.

After the beam expander 10, a first diffraction grating 12, a two-dimensional lightwave conversion optical system 34, and an imaging device 4 are disposed. The first diffraction grating 12 diffracts the probe beam collimated by the beam expander 10. The two-dimensional lightwave conversion optical system 34 converts these first-order diffracted beams diffracted by the first diffraction grating 12 so as to generate a spectral distribution in a direction intersecting with the direction in which the spectral distribution was originally generated to form a quasi-two-dimensional spectrogram of the probe beam on a conjugate plane FC conjugate with the first diffraction grating 12. The imaging device 4 is disposed so that an image plane F4 and the conjugate plane FC are conjugate with each other.

A relay optical system 40 having an optical axis aligned with the optical axis of the two-dimensional lightwave conversion optical system 34 is interposed between the two-dimensional lightwave conversion optical system 34 and the imaging device 4. In this way, the quasi-two-dimensional spectrogram formed on the conjugate plane FC is projected on the image plane F4.

A beam splitter 53 for splitting the ultrashort optical pulse generated at the ultrashort optical pulse source 5 so as to obtain a reference beam is interposed between the ultrashort optical pulse source 5 and the irradiating optical system IR.

After the beam splitter 53, a beam expander 35 for shaping the reference beam is disposed. After the beam expander 35, a multiplexer 3a for combining the shaped reference beam and the probe beam emitted from the two-dimensional lightwave conversion optical system 34 is disposed.

Detailed structures of these components are described below.

For example, an ultrashort optical pulse laser oscillator is used as the ultrashort optical pulse source 5. In this embodiment, the signal beam generated by the ultrashort optical pulse source 5 is an ultrashort optical pulse having a central wavelength of 800 nm, a linewidth of ±5 nm, and a pulse width of 100 femtoseconds.

The irradiating optical system IR includes a beam splitter 54 and a delaying optical system (delay generating unit) 6a. The beam splitter 54 splits the ultrashort optical pulse from the ultrashort optical pulse source 5 into a pump beam and a probe beam. The delaying optical system 6a delays the probe beam for a predetermined amount of time relative to the pump beam between the beam splitter 54 and the XY stage 752. The beam splitter 54 may be a half mirror.

Since the delaying optical system 6a in the irradiating optical system IR delays the probe beam relative to the pump beam, the probe beam is radiated onto the specimen after the pump beam is radiated onto the specimen, causing the specimen to be excited. As a result, the probe beam is modulated by the excited specimen.

In this embodiment, the delaying optical system 6a includes a mirror 55 for reflecting the probe beam and a stage (mirror-driving unit) 56 for moving the mirror 55. The amount of time the probe beam is delayed relative to the pump beam can be adjusted by changing the length of the optical path of the probe beam by moving the mirror 55 using the stage 56.

The irradiating optical system IR includes mirrors 57, 58, 59, and 60. The mirrors 57, 58, and 59 guide the ultrashort optical pulse, the pump beam, and the probe beam with predetermined optical paths corresponding to the positions of various components included in the irradiating optical system IR. The mirror 60 relays the pump beam and probe beam from the irradiating optical system IR to the beam expander 10.

The beam expander 10 is, for example, constituted of lenses 101 and 102. In this embodiment, the lens 101 has a focal length of 10 mm and the lens 102 has a focal length of 100 mm. In other words, the beam expander 10 magnifies ten times and collimates and emits the magnified probe beam.

The first diffraction grating 12 is a flat transmissive Bragg diffraction grating. The first diffraction grating 12 is disposed so that the angle between its normal L1 and an optical axis AX2 is θ1 on a plane parallel to an optical axis AX1 of the irradiating optical system IR and an optical axis AX2 of the two-dimensional lightwave conversion optical system 34. In second diffraction grating 12, the grating grooves, which are orthogonal to the inclination direction, are formed with a uniform spacing therebetween in a direction parallel to the inclination direction.

In this embodiment, the optical axis AX1 of the irradiating optical system IR and the optical axis AX2 of the two-dimensional lightwave conversion optical system 34 are orthogonal to each other. In the description below, an imaginary plane F1 is defined as a plane that includes the intersecting point of the optical axes AX1 and AX2 and that is orthogonal to the optical axis AX2. The X axis of the imaginary plane F1 extends in a direction parallel to the optical axis AX1, the Y axis extends in a direction orthogonal to the X axis, and the Z axis extends in a direction parallel to the optical axis AX2. The intersecting point of the optical axes AX1 and AX2 is set as the origin, and the propagating directions of the probe beam along the X and Z axes are defined as the positive X and Z directions.

In this embodiment, the first diffraction grating 12 is disposed on an imaginary plane F1a, which is obtained by rotating the imaginary plane F1 around the Y axis by 45°. In other words, the above-mentioned angle θ1 is 45°. The length of the first diffraction grating 12 in the X direction along the imaginary plane F1a is about 14.14 mm and the length in the Y direction is about 10 mm. The grating constant is set to 1,767 lines per millimeter so that the diffraction direction of the central wavelength component of the probe beam emitted to the normal L1 from the irradiating optical system IR at an incident angle of 45° substantially aligns with the optical axis AX2. In this way, a probe beam from the beam expander 10 is incident on the first diffraction grating 12 at a 45° angle and is diffracted highly efficiently toward the two-dimensional lightwave conversion optical system 34 (i.e., in the positive Z direction) on a plane parallel to the ZX plane.

The probe beam (signal beam) is converted into a group of first-order diffracted beams. The first-order diffracted beams, depending on their incident positions on the first diffraction grating 12, are incident at different positions in the direction of spectral distribution (in the X direction) and are delayed by different amounts of time. In other words, the probe beam is converted into diffracted beams in which the propagation directions of the lightwave components and the spatial phase distribution intersect at an angle.

The two-dimensional lightwave conversion optical system 34 includes a first cylindrical lens (Fourier transformation optical system) 131 having a positive power in the X direction and having a front focal plane at the imaginary plane F1, an optical filter (time/frequency conversion filter) 135 disposed at the rear focal plane F2 of the first cylindrical lens 131, and a second cylindrical lens (Fourier inverse-transformation optical system) 132 having a positive power in the X direction and having a front focal plane at the optical filter 135.

In this embodiment, the first and second cylindrical lenses 131 and 132 each have a focal length of f=100 mm.

Figure 18:
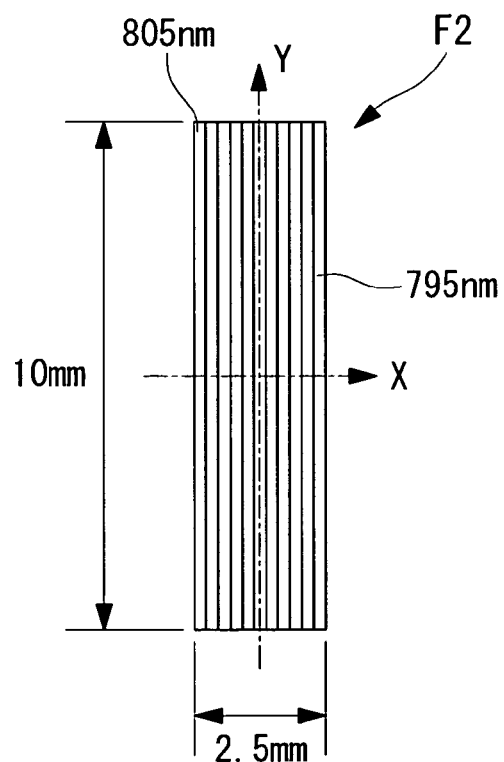
FIG. 18 illustrates the distribution of light diffracted at the rear focal plane of a first cylindrical lens of the time-resolved spectroscopy unit according to a third embodiment of the present invention.

The first cylindrical lens 131 collimates the first-order diffracted beams, which are diffracted by the first diffraction grating 12 onto a plane parallel to the X axis, onto a plane parallel to the ZX plane and emits the first-order diffracted beams onto the optical filter 135 at the rear focal plane F2. In this embodiment, the first cylindrical lens 131 emits wavelength components in the wavelength bands of, for example, 805 nm, 800 nm, and 795 nm included in the first-order diffracted beams so that the wavelength components are incident at positions on the rear focal plane F2 where X equals −1.25 mm, 0 mm, and +1.24 mm, respectively, as illustrated in FIG. 18.

Figure 19:
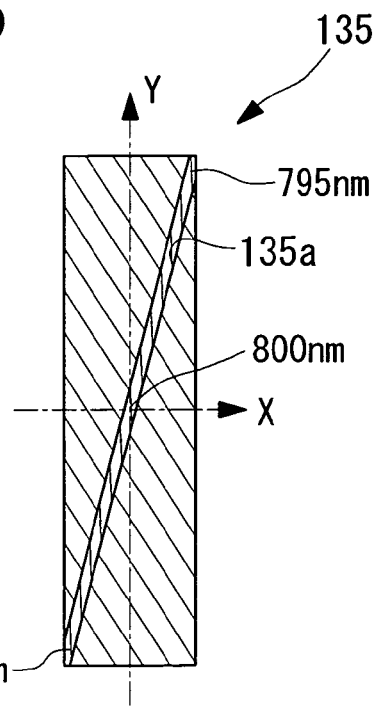
FIG. 19 illustrates the shape of a filter of the time-resolved spectroscopy unit according to the third embodiment of the present invention.

As illustrated in FIG. 19, the optical filter 135 includes a slit 135a extending diagonally with respect to the X and Y axes. The slit 135a cuts out light flux from the first-order diffracted beams in a strip-shaped region extending in a diagonal direction with respect to the X and Y axes. This light flux includes wavelength components sequentially distributed along the Y axis.

The second cylindrical lens 132 focuses the light flux cut out by the optical filter 135 in the X direction so that the light flux is converted into a beam having a linear cross-section extending in the Y direction and projects this beam onto the conjugate plane FC conjugate with the imaginary plane F1a in the two-dimensional lightwave conversion optical system 34.

As illustrated in FIG. 17, the conjugate plane FC is obtained by rotating the rear focal plane F3 of the second cylindrical lens 132 around the Y axis by an angle θ1 in a direction opposite to the rotational direction of the imaginary plane F1a with respect to the imaginary plane F1. In this embodiment, the rotational angle θ1 of the conjugate plane FC is 45°.

Figure 20:
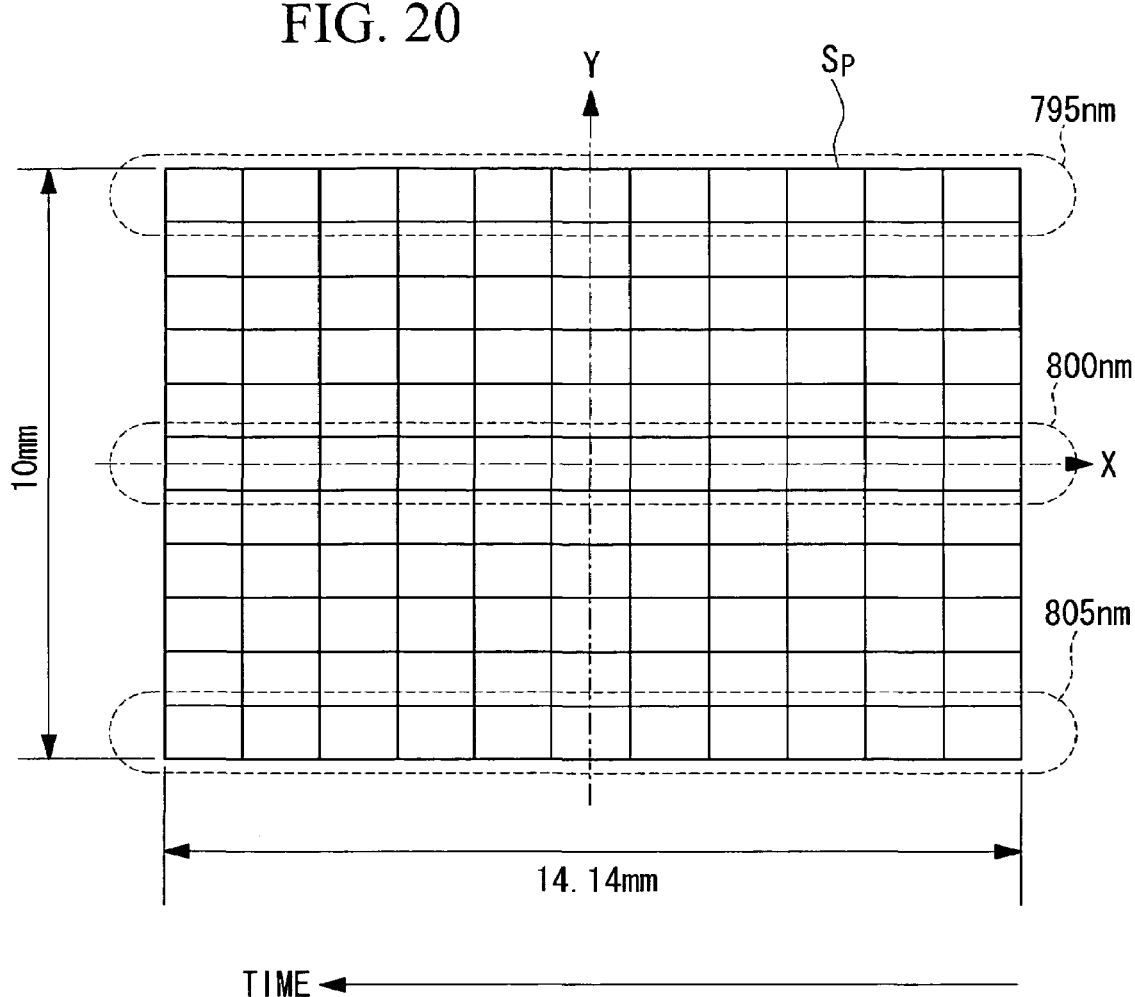
FIG. 20 illustrates a quasi-two-dimensional spectral image obtained by the time-resolved spectroscopy unit according to the third embodiment of the present invention.

Since first-order diffracted beams are emitted from the first diffraction grating 12 with time delays in accordance with their incident positions along the X axis, each first-order diffracted beam is incident on the conjugate plane FC at a different position along the X axis at a different instant. In this way, as illustrated in FIG. 20, a quasi-two-dimensional spectrogram Sp wherein time is distributed in the X direction and wavelength is distributed in the Y direction is formed on the conjugate plane FC.

The relay optical system 40 is a reduction optical system including a condenser lens 41 having a front focal point at the rear focal plane F3 and a collimating lens 42 having a front focal point at the same point as the rear focal point R1 of the condenser lens 41.

In this embodiment, the condenser lens 41 is a spherical lens having a focal length of $f_{41}$=100 mm and the collimating lens 42 is a spherical lens having a focal length of $f_{42}$=40 mm. The magnifying power M of the relay optical system 40 is 0.4.

The imaging device 4, for example, is a CCD camera including a matrix of photoreceptors arranged on a plane and having the image plane F4. The imaging device 4 is disposed so that the image plane F4 is disposed at an imaginary plane F5a conjugate with the conjugate plane FC. Here, the imaginary plane F5a is obtained by rotating the imaginary plane F5, which is orthogonal to the optical axis AX2, around the Y axis by an angle φ in a direction opposite to the direction in which the conjugate plane FC is rotated with respect to the optical axis AX2. In other words, the angle φ is equal to the angle of the normal L2 of the imaginary plane F5a to the optical axis AX2 on the ZX plane.

The beam splitter 53 is constituted of, for example, a half mirror.

The beam expander 35, for example, is constituted of lenses 46 and 47. The beam splitter 53 also includes a mirror 48 for relaying a reference beam emitted from the lens 47 to the multiplexer 3a.

In this embodiment, the focal lengths of the lenses 46 and 47 are 10 mm and 100 mm, respectively. In other words, the beam expander 35, similar to the beam expander 10, magnifies the incident probe beam about ten times and then collimates and emits the magnified probe beam.

The multiplexer 3a includes a half mirror 51 interposed between the two-dimensional lightwave conversion optical system 34 and the imaging device 4. The half mirror 51 is disposed in the optical path of the probe beam at an angle relative to the optical path.

The reference beam from the beam expander 35 is incident on the half mirror 51 at an angle with respect to the optical path of the probe beam. More specifically, the half mirror 51 allows the probe beam to pass through and reflects the reference beam in a direction parallel to the probe beam, i.e., in the positive direction along Z axis at the imaging device 4.

In this embodiment, the half mirror 51 is interposed between the condenser lens 41 and the collimating lens 42 of relay optical system 40. A collimating lens 52 constituting the reducing optical system together with the collimating lens 42 is interposed between the half mirror 51 and the beam expander 35. The reference beam is reduced by the same amount as the probe beam and is incident on the imaginary plane F4.

Figure 21:
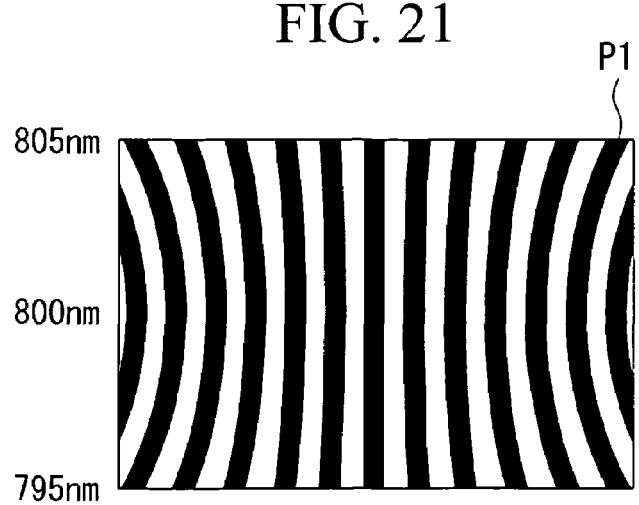
FIG. 21 illustrates the interference pattern between the quasi-two-dimensional spectral image obtained by the time-resolved spectroscopy unit according to the third embodiment of the present invention and a reference beam.

In this way, the quasi-two-dimensional spectrogram Sp is projected at the imaginary plane F4 and, as a result, an interference pattern P1 of the quasi-two-dimensional spectrogram Sp and the reference beam is generated on the imaginary plane F4 (refer to FIG. 21). Accordingly, time-resolved spectroscopy of the probe beam can be carried out based on the region where the stripes constituting the interference pattern P1 are present and the period of these bands (i.e., the distance between the bands).

In the time-resolved spectroscopy unit 80a, the relay optical system 40 and the image plane F4 are disposed as described below so as to project the quasi-two-dimensional spectrogram Sp formed at the conjugate plane FC at the image plane F4.

Figure 22:
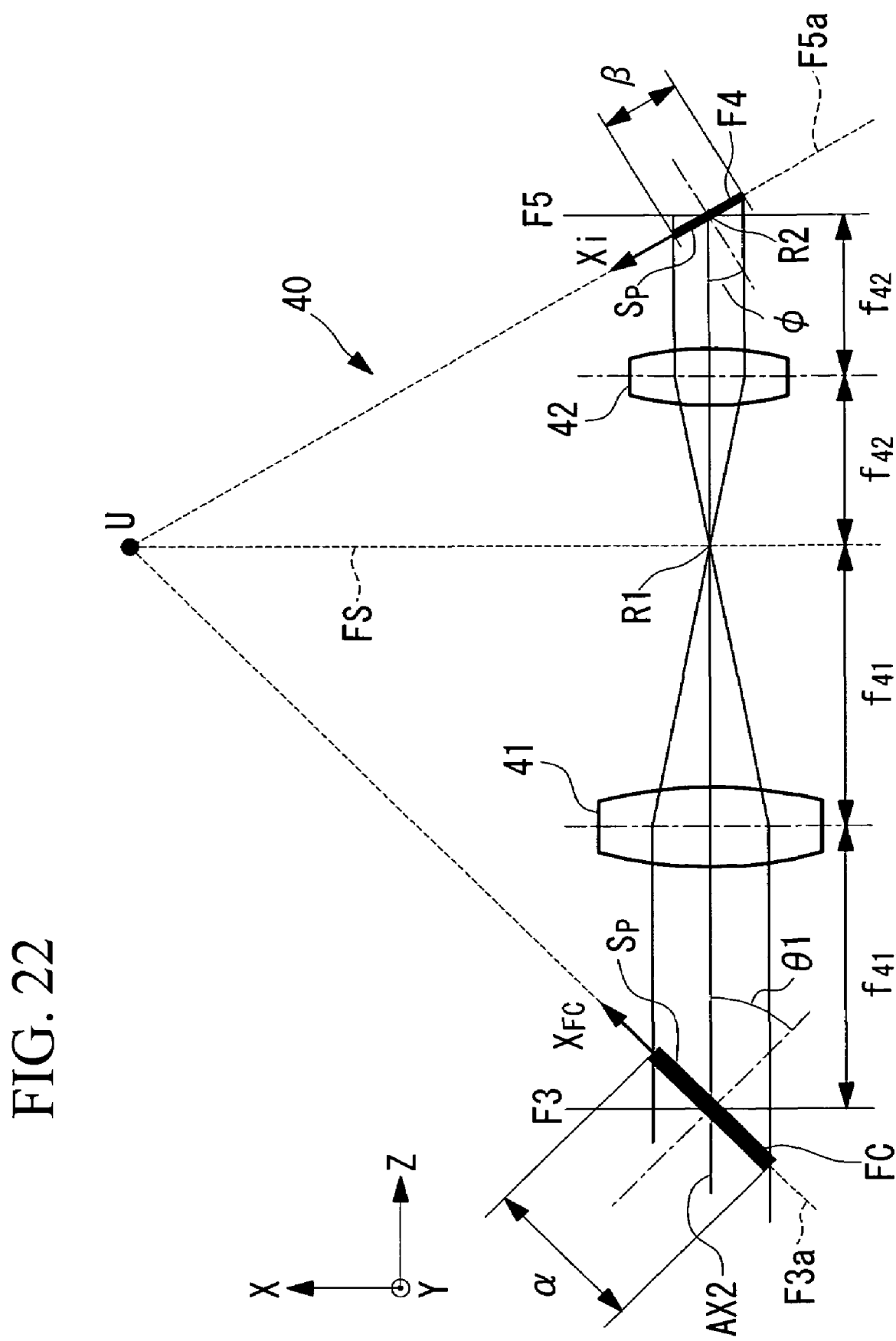
FIG. 22 is a plan view of the structure of a relay optical system of the time-resolved spectroscopy unit according to the third embodiment of the present invention.

As illustrated in FIG. 22, the condenser lens 41 is disposed so that its front focal point is located at the conjugate plane FC, and the collimating lens 42 is disposed so that its front focal point is at the same point as the rear focal point R1 of the condenser lens 41 and its rear focal point is located at the image plane F4.

Also in the time-resolved spectroscopy unit 80a, the first diffraction grating 12 and the conjugate plane FC are disposed at an angle with respect to the optical axis AX2. Therefore, the image plane F4, which is in an image-forming relationship with the conjugate plane FC, is disposed so that the line of intersection U of the imaginary plane F5a including the image plane F4 and the imaging plane F3a including the conjugate plane FC is disposed on a reference plane FS. The reference plane FS is a plane that is orthogonal to the optical axis AX2 and passes through the rear focal point R1 of the condenser lens 41. In other words, the image plane F4 is disposed at the imaginary plane F5a that passes through the line of intersection U of the imaginary plane F3a including the conjugate plane FC and the reference plane FS and that also passes through the rear focal point R2 of the collimating lens 42.

Consequently, the angle φ of the normal L2 of the image plane F4 to the optical axis AX2 depends not only on the angle θ1 of the first diffraction grating 12 but also on the position of the rear focal point R2 of the collimating lens 42. The closer the rear focal point R2 of the collimating lens 42 is to the rear focal point R1 of the condenser lens 41, the smaller the angle φ of the normal L2 of the image plane F4 to the optical axis AX2 will be.

In other words, the smaller the magnifying power of the relay optical system 40 is, the smaller the angle φ of the normal L2 of the image plane F4 to the optical axis AX2 will be.

Next, the relationship between the angle φ of the normal L2 of the image plane F4 to the optical axis AX2 and the magnifying power of the relay optical system 40 is described mathematically.

Since the conjugate plane FC and the image plane F4 are in an image-forming relationship with respect to the relay optical system 40, the line of intersection U of the imaginary plane F3a including the conjugate plane FC and the imaginary plane F5a including the image plane F4 is disposed on the ZX plane on a half line UR1 connecting the reference plane FS and the rear focal point R1 of the condenser lens 41.

Accordingly, a relationship represented by the following Formula (1) is established:

$$2f_{41} \tan(\pi/2 - \theta 1) = 2f_{42} \tan(\pi/2 - \phi) \qquad (1)$$

In Formula (1), $f_{41}$ represents the focal length of the condenser lens 41, and $f_{42}$ represents the focal length of the collimating lens 42.

From Formula (1), the following Formula (2) is derived:

$$\tan \phi = f_{42}/f_{41} \tan \theta 1 \qquad (2)$$

Formula (2) can be transformed into the following Formula (3) based on the definition of the relay optical system 40 having a magnifying power M ($M = f_{42}/f_{41}$)

$$\tan \phi = M \tan \theta 1 \qquad (3)$$

Formula (3) indicates that the relationship between the magnitudes of the angle θ1 of the conjugate plane FC and the angle φ of the image plane F4 are determined based on the magnifying power M of the relay optical system 40. More specifically, when M is greater than one (M>1), φ is greater than θ1 (φ>θ1), and when M is smaller than one (M<1), φ is smaller than θ1 (φ<θ1).

Accordingly, when the relay optical system 40 has a reducing power, the angle φ of the image plane F4 is small compared to the angle θ1 of the conjugate plane FC.

In this embodiment, the magnifying power of the relay optical system 40 is 0.4 and the angle θ of the first diffraction grating 12 is 45°. Thus, the angle φ of the image plane F4 is 21.8°.

Now, the magnifying power between the conjugate plane FC of the relay optical system 40 and the image plane F4 will be described. As illustrated in FIG. 22, the coordinate axis XFC is defined as an axis on the conjugate plane FC parallel to the ZX plane. The coordinate axis $X_i$ is defined as an axis on the image plane F4 parallel to the ZX plane.

The magnifying power of the relay optical system 40 in the Y direction is equal to the magnifying power M of the relay optical system 40 whereas the magnifying power between the $X_{FC}$ axis and the $X_i$ axis is defined as M cos θ1/cos φ. Consequently, the length α in the XFC direction and the length in the Y direction (not shown in the drawing) of the quasi-two-dimensional spectrogram Sp formed on the conjugate plane FC are 14.14 mm and 10 mm, respectively. The length β in the $X_i$ direction and the length in the Y direction (not shown in the drawing) of the quasi-two-dimensional spectrogram Sp projected on the image plane F4 of the imaging device 4 are 4.31 mm and 4.0 mm, respectively.

As described above, in the time-resolved spectroscopy unit 80a, the angle φ of the image plane F4 may be set smaller than the angle θ1 of the conjugate plane FC. More specifically, the time-resolved spectroscopy unit 80a can maintain high diffraction efficiency without decreasing the angle of the first diffraction grating 12 to the optical axis AX2 and is capable of emitting the light flux that has passed through the relay optical system 40 at the image plane F4 at a small angle with respect to the normal L2 of the image plane F4 by reducing the angle φ of the normal L2 of the image plane F4 to the optical axis AX2.

When using a standard CCD camera, degradations, such as shading, can be sufficiently prevented by maintaining the incident angle of a beam at 25° or less. In this embodiment, as described above, although the angle θ1 of the first diffraction grating 12 is 45°, the angle φ of the image plane F4 is 21.8°, which is smaller than 25°. Hence, degradation, such as shading, of the imaging device 4 can be sufficiently prevented.

As described above, the time-resolved spectroscopy unit 80a can satisfactorily capture the interference pattern using the imaging device 4 and can carry out highly accurate time-resolved spectroscopy.

Fourth Embodiment

A microscope apparatus according to a fourth embodiment of the present invention will be described below with reference to FIGS. 23 and 24.

Figure 23:
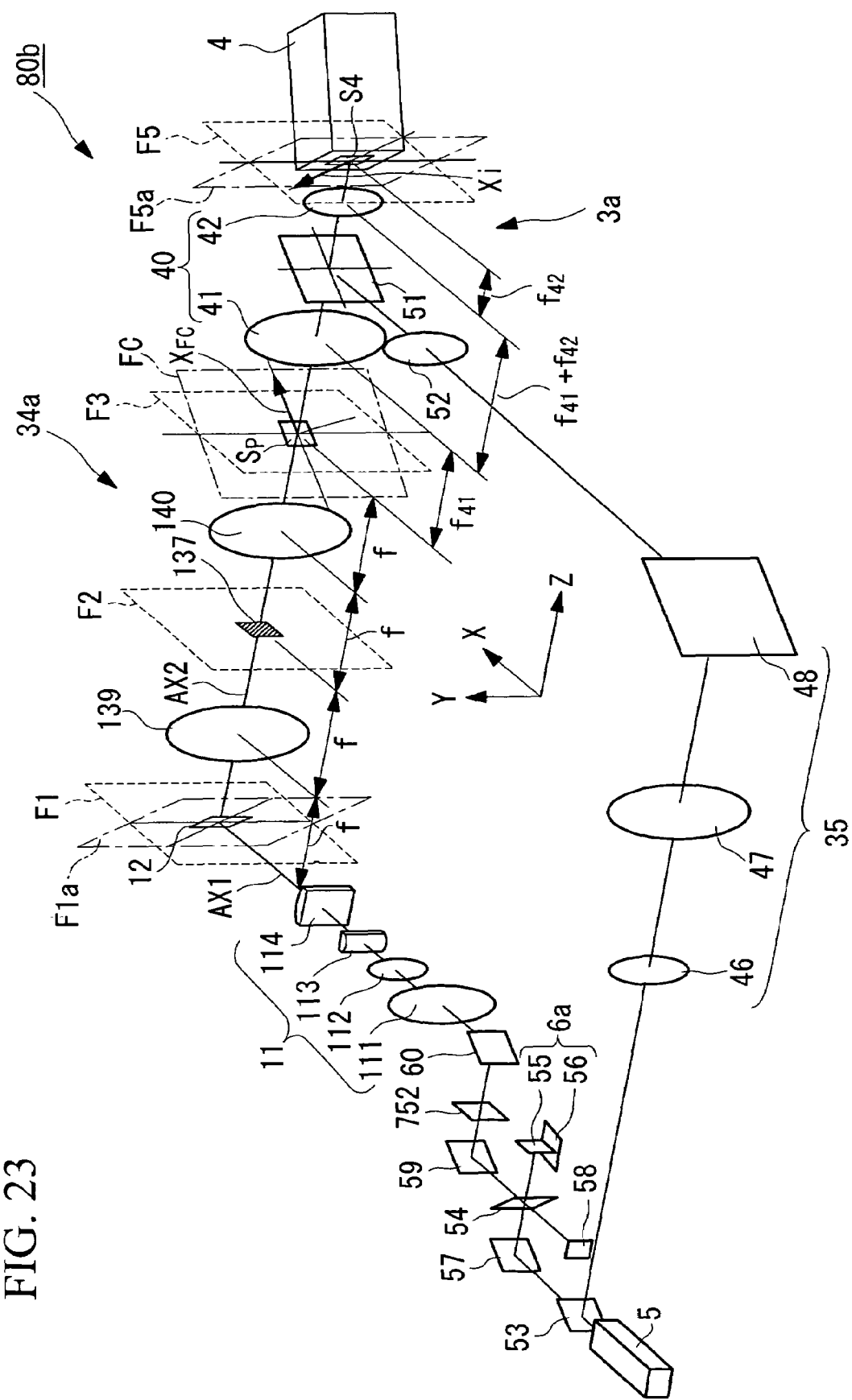
FIG. 23 is perspective view of the overall structure of a time-resolved spectroscopy unit according to a fourth embodiment of the present invention.

As illustrated in FIG. 23, the structure of a time-resolved spectroscopy unit 80b is the same as that of the time-resolved spectroscopy unit 80a according to the third embodiment except that a beam expander 11 according to the second embodiment and a two-dimensional lightwave conversion optical system 34a are provided instead of the beam expander 10 and the two-dimensional lightwave conversion optical system 34. The components that are the same as those included in the microscope apparatuses according to the second and third embodiments are represented by the same reference numerals and their descriptions are omitted.

The cylindrical beam expander 11 shapes a probe beam emitted from an irradiating optical system IR into a beam having a linear cross-section extending along the inclination direction (Z direction) of a first diffraction grating 12.

In this embodiment, the cylindrical beam expander 11 includes a reducing optical system having a magnifying power of 0.5. The reducing optical system includes a lens 111 (spherical lens) having a focal length of 100 mm and a lens 112 (spherical lens) having a focal length of 50 mm. A cylindrical lens 113 having a positive power in the Z direction and a cylindrical lens 114 having its front focal plane disposed at the rear focal plane of the cylindrical lens 113 are interposed between the reducing optical system and the first diffraction grating 12. The cylindrical lenses 113 and 114 constitute a magnifying optical system having a ten-fold magnification and magnify the width (length in the Z direction) of a probe beam ten times in the Y direction.

More specifically, the cylindrical beam expander 11 magnifies the probe beam, which has been reduced by the lenses 111 and 112, in only the direction of inclination of the first diffraction grating 12 (i.e., the Z direction) by the cylindrical lenses 113 and 114. Therefore, the length of the probe beam in the Z direction is magnified to be longer than that when the probe beam entered cylindrical beam expander 11 and the length of the probe beam in the Y direction is reduced to be smaller than that when the probe beam entered the cylindrical beam expander 11.

In this way, the probe beam shaped into a beam having a linear cross-section extending in the direction of inclination of the first diffraction grating 12 is diffracted by the first diffraction grating 12. The group of first-order diffracted beams forms a beam having a linear cross-section extending in the direction the spectral distribution (i.e., the X direction).

The two-dimensional lightwave conversion optical system 34a is the same as the two-dimensional lightwave conversion optical system 34 according to the third embodiment except that a spherical lens 139 is included instead of the first cylindrical lens 131, a first diffraction grating array 137 is included instead of the optical filter 135, and a spherical lens 140 is included instead of the second cylindrical lens 132.

The spherical lens 139 collimates the first-order diffracted beams diffracted by the first diffraction grating 12 on a plane parallel to the X axis and emits these collimated beams to the first diffraction grating array 137 at a rear focal plane F2.

The first diffraction grating array 137 diffracts each lightwave component included in each first-order diffracted beam in a different direction on the YZ plane depending on the wavelength.

Figure 24:
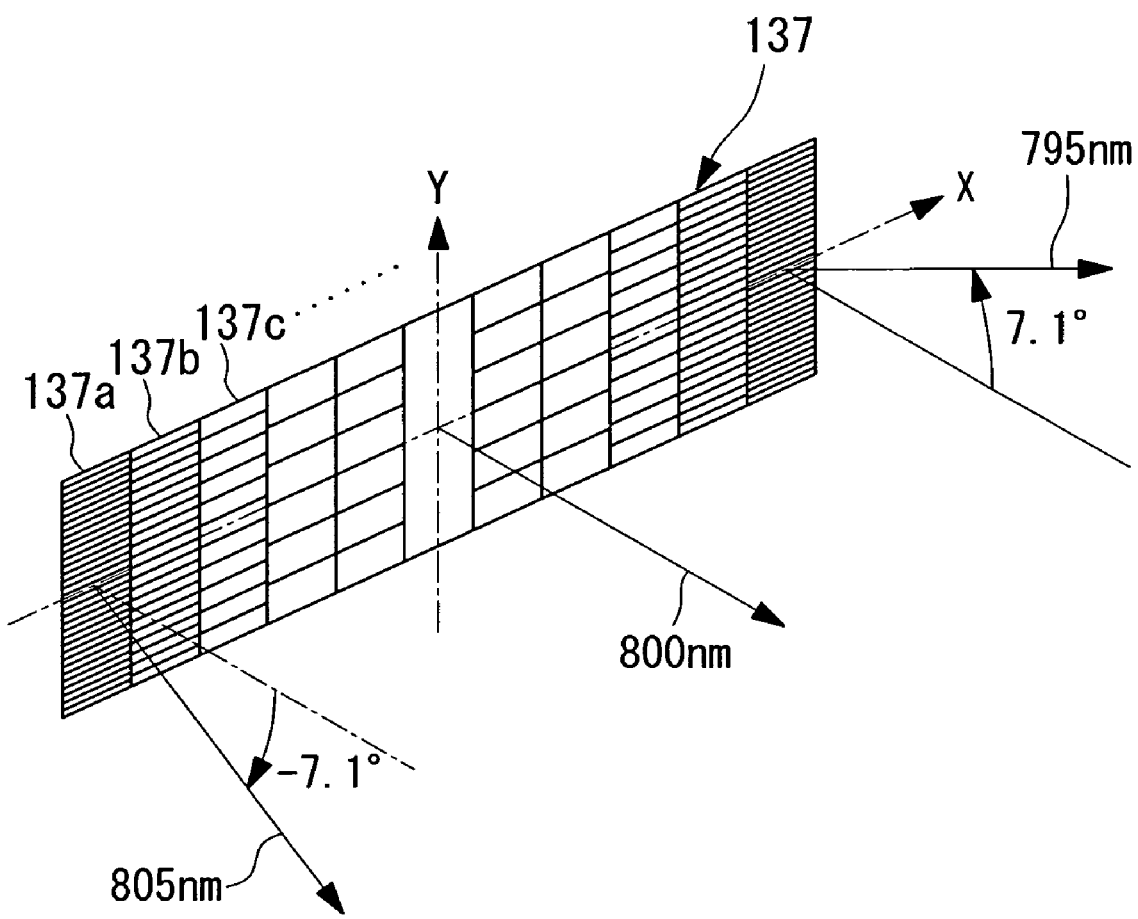
FIG. 24 is a perspective view of the structure of a first diffraction grating array of the time-resolved spectroscopy unit according to the fourth embodiment of the present invention.

More specifically, as illustrated in FIG. 24, the first diffraction grating array 137 includes a plurality of diffraction gratings 137a, 137b, 137c, . . . having a plurality of grating grooves formed along the Y direction and having different grating constants. The diffraction gratings 137a, 137b, 137c, . . . are disposed in the order of the magnitude of the grating constants along the X direction. In this way, each first-order diffracted beam that has been spectrally distributed along the X axis by the first diffraction grating 12 is incident on one of the diffraction gratings having different grating constants based on wavelength and is diffracted on the YZ plane in a direction different from the diffraction direction of the other first-order diffracted beams.

For example, a first-order diffracted beam having a central wavelength of 805 nm is diffracted on the YZ plane at an angle of −7.1° in the Z direction. The smaller the wavelength is, the further away the diffraction angle is set in the positive direction on YZ plane. The first-order diffracted beam having a central wavelength of 800 nm is diffracted at an angle of 0° (i.e., propagates straight through) on the YZ plane. The first-order diffracted beam having a central wavelength of 795 nm is diffracted at an angle of +7.1° in the Z direction on the YZ plane.

The wavelength resolving power of the first diffraction grating array 137 can be improved by increasing the number of diffraction gratings. Since, in this embodiment, the wavelength range of the first-order diffracted beams is from 795 to 805 nm, the first diffraction grating array 137 includes ten diffraction gratings each corresponding to different wavelength bands at 1-nm intervals.

The spherical lens 140 focuses the beam diffracted by the first diffraction grating array 137 while maintaining it cross-sectional shape and projects this beam on a conjugate plane FC conjugate with an imaginary plane F1a in the two-dimensional lightwave conversion optical system 34a. In this way, a quasi-two-dimensional spectrogram Sp of the probe beam is formed on the conjugate plane FC.

In this embodiment, the spherical lenses 139 and 79 each have a focal length of f=40 mm. The length of the quasi-two-dimensional spectrogram Sp formed on the conjugate plane FC in the Y direction is 14.14 mm and the length in the direction parallel to the ZX plane is 10 mm.

Since the time-resolved spectroscopy unit 80b having the above-described structure does not eliminate any portion of the probe beam with a filter, it is capable of forming a quasi-two-dimensional spectrogram Sp using the entire probe beam without eliminating any portion of the probe beams with a filter. Hence, the probe beam is used efficiently and a clear interference pattern can be obtained even when the probe beam is weak.

In the relay optical system 40 according to this embodiment, the focal length $f_{41}$ of the condenser lens 41 is 100 mm and the focal length $f_{42}$ of the collimating lens 42 is 25 mm. In other words, the magnifying power of the relay optical system 40 is 0.25. Therefore, even when the angle θ1 of the first diffraction grating 12 is 45°, the angle φ of the image plane F4 of the imaging device 4 will be 14.0° based on the above-described Formula (3). Accordingly, the angle φ of the normal L2 of the image plane F4 to the optical axis AX2 can be decreased while maintaining high diffraction efficiency without decreasing the angle of inclination θ1 of the first diffraction grating 12, and the beam that has passed through the relay optical system 40 can be emitted on the image plane F4 at a small angle with respect to the normal of the image plane F4.

In this embodiment, the length of the quasi-two-dimensional spectrogram Sp projected on the image plane F4 of the imaging device 4 in the $X_{FC}$ direction and the Y direction are 2.58 mm and 2.5 mm, respectively.

Fifth Embodiment

Now, a microscope apparatus according to a fifth embodiment of the present invention will be described with reference to FIGS. 25 to 28.

Figure 25:
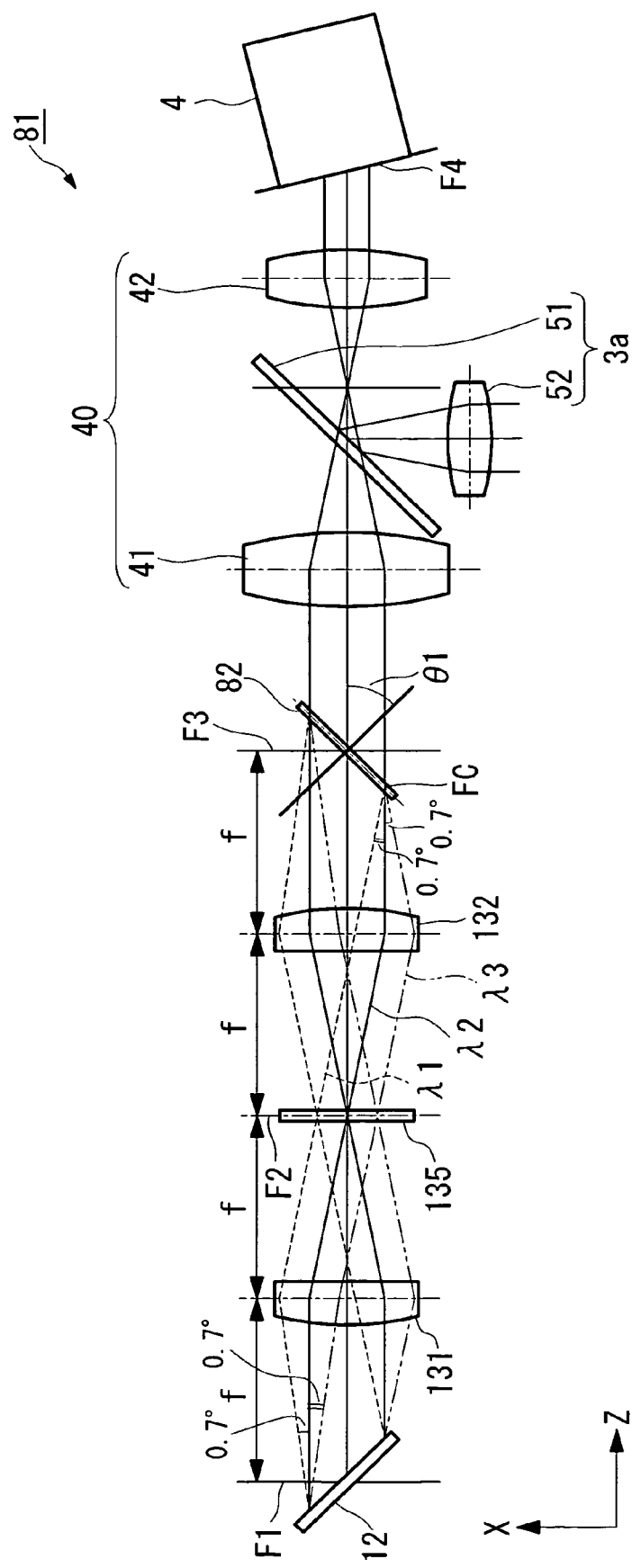
FIG. 25 is a plan view of the overall structure of a time-resolved spectroscopy unit according to a fifth embodiment of the present invention.

As illustrated in FIG. 25, the structure of a time-resolved spectroscopy unit 81 according to this embodiment is the same as that of the time-resolved spectroscopy unit 80a according to the third embodiment except that a second diffraction grating array 82 is provided on a conjugate plane FC conjugate with a first diffraction grating 12. The components that are the same as those included in the time-resolved spectroscopy unit 80a according to the third embodiment are represented by the same reference numerals and their descriptions are omitted.

The second diffraction grating array 82 is large enough to entirely cover a conjugate plane FC conjugate with a first diffraction grating 12 and diffracts wavelength components included in a probe beam (first-order diffracted beams) incident on the conjugate plane FC so that the difference in the incident angles on the image plane F4 of the wavelength components is decreased.

Figure 26:
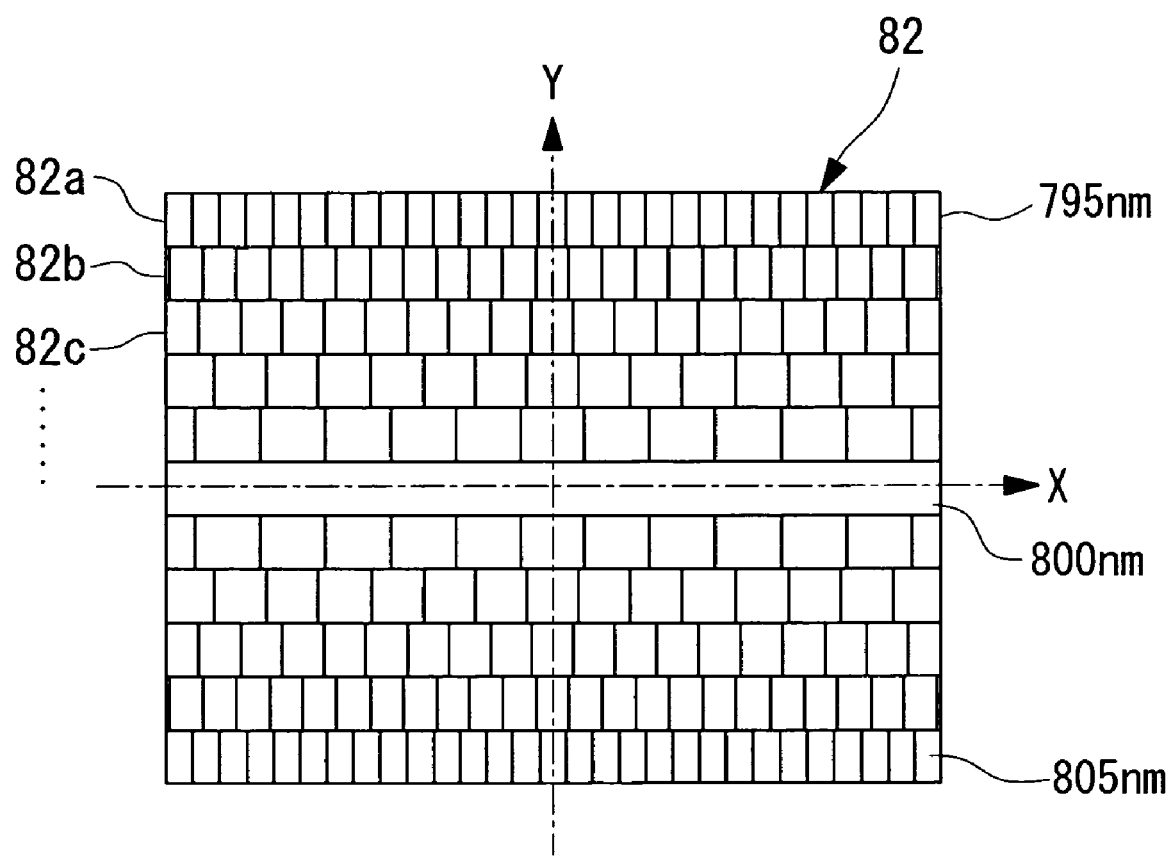
FIG. 26 is a front view of the structure of a second diffraction grating array of the time-resolved spectroscopy unit according to the fifth embodiment of the present invention.

More specifically, as illustrated in FIG. 26, the second diffraction grating array 82 includes a plurality of diffraction gratings 82a, 82b, 82c, . . . having a plurality of grating grooves formed along the X direction and having different grating constants. The diffraction gratings 82a, 82b, 82c, . . . are disposed in the order of the magnitude of the grating constants along the Y direction. In this way, the wavelength components of the first-order diffracted beams emitted from the two-dimensional lightwave conversion optical system 34 at the second diffraction grating array 82 on the conjugate plane FC are converted into collimated beams substantially parallel to the Z axis. Then, the wavelength components are incident on the image plane F4 at substantially the same angles.

Now, the behavior of the probe beam in the time-resolved spectroscopy unit 81 will be described in detail below.

As illustrated in FIG. 25, the probe beam incident on the first diffraction grating 12 is diffracted at a predetermined range of angles with respect to the Z axis on the ZX plane by the first diffraction grating 12, wherein a central wavelength component is diffracted in a central angle of the predetermined range of angles. In FIG. 25, a wavelength component λ1 having the shortest wavelength in the probe beam is represented by a dotted line, and the central wavelength component λ2 is represented by a solid line, and a wavelength component λ3 having the longest wavelength is represented by a chain line.

In this embodiment, the wavelengths of the wavelength components λ1, λ2, and λ3 are 795 nm, 800 nm, and 805 nm, respectively. The wavelength components λ1 and λ3 are emitted at a 0.7° angle with respect to the wavelength component λ2.

The wavelength components λ1 and λ3 are incident on the conjugate plane FC at the same position as the wavelength component λ2. However, the angle formed between the wavelength components λ1 and the wavelength component λ2 and the angle formed between the wavelength components λ3 and the wavelength component λ2 are both 0.7°, which is the same angle as that when the wavelength components are emitted from the first diffraction grating 12.

Figure 27:
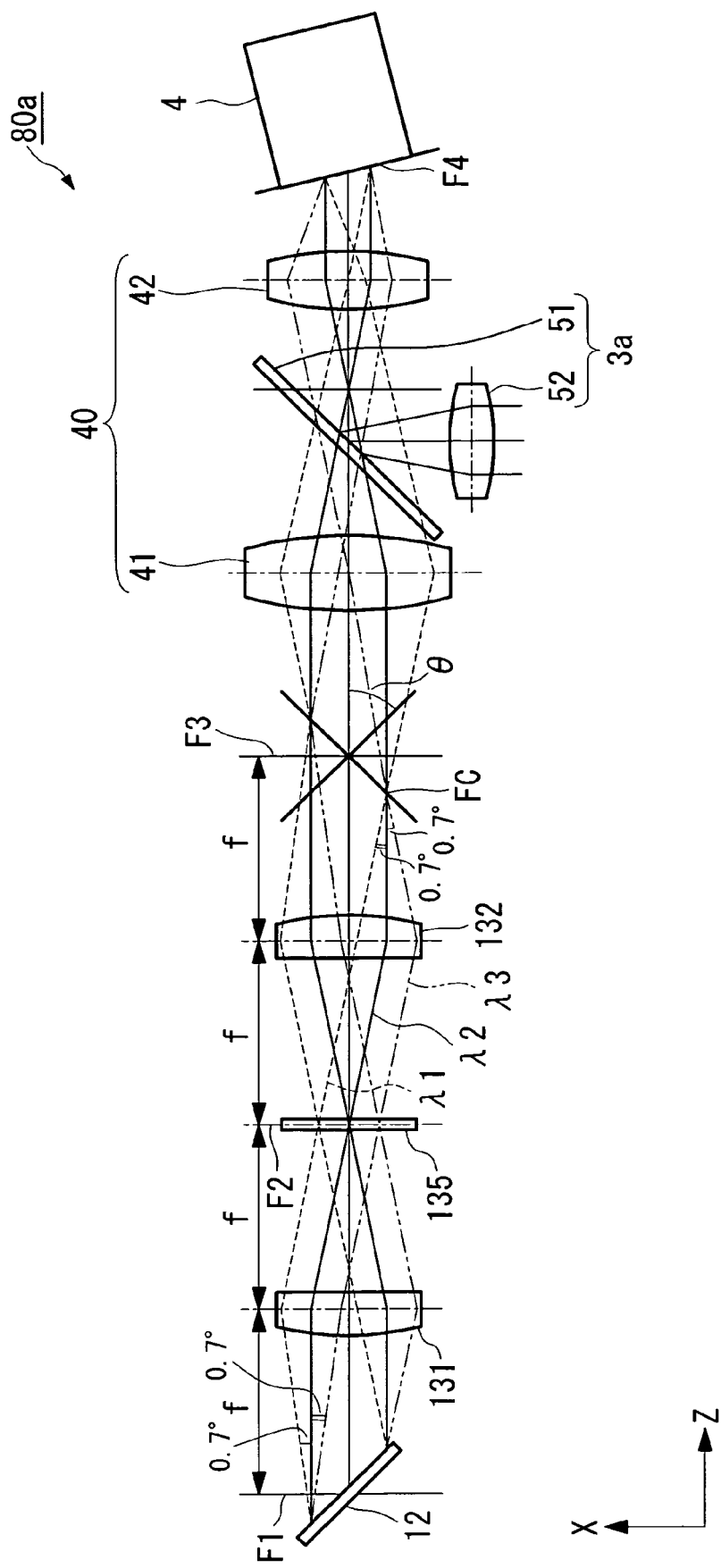
FIG. 27 is a plan view of the overall structure of a time-resolved spectroscopy unit according to the third embodiment of the present invention.

In the above-described time-resolved spectroscopy unit 80a according to the third embodiment, as illustrated in FIG. 27, after the wavelength components λ1, λ2 and λ3 obtained by diffracting the probe beam at the first diffraction grating 12 are incident on the conjugate plane FC, they are directly projected onto the image plane F4 of the imaging device 4 by the relay optical system 40.

Since the lateral magnification of the relay optical system 40 is 0.4, the angular magnification between the conjugate plane FC and the image plane F4 is 2.5. Accordingly, the angular distribution of the wavelength components of the probe beam on the image plane F4 is about ±2°, which is wider than the angular distribution of the when the wavelength components are diffracted by the first diffraction grating 12 or when the wavelength components are incident on the conjugate plane FC. The angular distribution increases even more as the magnifying power of the relay optical system 40 is set smaller.

As described above, since the wavelength components of the probe beam are incident on the image plane F4 at different angles in the time-resolved spectroscopy unit 80a, the wave components in an interference pattern P1 of the probe beam and a reference beam, as illustrated in FIG. 21, will have different patterns having different periods.

On the contrary, in the time-resolved spectroscopy unit 81 according to this embodiment illustrated in FIG. 25, the wavelength components λ1, λ2 and λ3 incident on the conjugate plane FC are diffracted in a direction substantially parallel to the Z axis by the second diffraction grating array 82 disposed at the conjugate plane FC.

Figure 28:
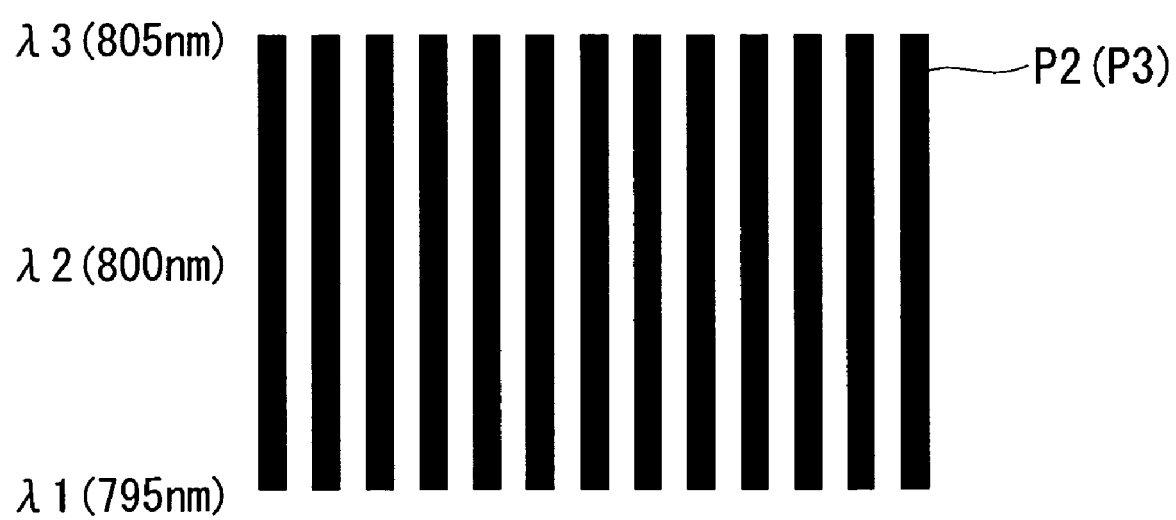
FIG. 28 illustrates an interference pattern of the quasi-two-dimensional spectral image obtained by the time-resolved spectroscopy unit according to the fifth embodiment of the present invention and a reference beam.

In this way, in the time-resolved spectroscopy unit 81, the first-order diffracted beams emitted from the two-dimensional lightwave conversion optical system 34 at the conjugate plane FC are converted into collimated beams substantially parallel to the Z axis. Then, the wavelength components are incident on the image plane F4 at substantially the same angles. Therefore, as illustrated in FIG. 28, the wave components in an interference pattern P2 will have a pattern with similar periods.

Consequently, by using the time-resolved spectroscopy unit 81 according to this embodiment, analysis of an interference pattern is simplified, and highly accurate time-resolved spectroscopy can be carried out.

In the above-described embodiments, the relay optical system 40 is a reducing optical system. The structure, however, is not limited, and, instead, the cylindrical lenses 131 and 132 constituting the two-dimensional lightwave conversion optical system 34 may be configured as a reducing optical system to achieve the same effects as the above-described embodiment.

Sixth Embodiment

Now, a microscope apparatus according to a sixth embodiment will be described below with reference to FIGS. 29 to 31.

The structure of the microscope apparatus according to this embodiment is the same as that of the microscope apparatus according to the third embodiment except that a time-resolved spectroscopy unit 83 is provided instead of the time-resolved spectroscopy unit 80a. The components that are the same as those included in the microscope apparatus according to the third embodiment are represented by the same reference numerals and their descriptions are omitted.

In this embodiment, an image plane is disposed at an angle with respect to the optical axis of a relay optical system. This configuration will be described below.

In a two-dimensional lightwave conversion optical system, the differences in the diffraction angles of wavelength components of each first-order diffracted beam incident on a second diffraction grating are canceled out by being diffracted at the first diffraction grating. Then, the wavelength components are converted into collimated beams propagating substantially parallel to each other.

Since the first diffraction grating is disposed at an angle with respect to the optical axis, a plane conjugate with the first diffraction grating is also disposed at an angle with respect to the optical axis. More specifically, since the second diffraction grating disposed at the plane conjugate with the first diffraction grating is disposed at an angle opposite to the first diffraction grating with respect to the optical axis, the first-order diffracted beams incident on the second diffraction grating are delayed in accordance with the incident positions on the second diffraction grating.

As described above, since the second diffraction grating is disposed on the optical axis at an angle opposite to the angle of the first diffraction grating with respect to the optical axis, the delays generated in the first-order diffracted beams are canceled out by being diffracted at the first diffraction grating.

The group of collimated beams that are not delayed with respect to each other form a quasi-two-dimensional spectrogram on a cross-sectional plane (hereinafter referred to as a 'reference cross-sectional plane') disposed at an angle the same as or opposite to the angle of the second diffraction grating.

Consequently, in order to capture the quasi-two-dimensional spectrogram with an imaging device, each of the collimated beams must have a different optical path between the second diffraction grating and the image plane of the imaging device. In other words, the imaging device must be disposed so that the image plane is conjugate with the reference cross-sectional plane.

Since in the above-described configuration, the image plane of the imaging device is disposed at an angle to the optical axis of the relay optical system, the image plane is disposed at an angle to the optical axis of the group of collimated beams. Consequently, the collimated beams have different optical paths (i.e., the image plane is conjugate with the reference cross-sectional plane) and a quasi-two-dimensional spectrogram is projected on the image plane.

According to this configuration, the propagation direction of part of the probe beam emitted from a beam expander is changed by being reflected at a half mirror. This reflected probe beam is incident on the first diffraction grating.

The probe beam that is incident on the first diffraction grating is converted into first-order diffracted beams by the first diffraction grating and is incident on a reflective optical filter after being shaped by a lens.

The first-order diffracted beams incident on the reflective optical filter are converted by the reflective optical filter so that a spectral distribution is generated in a direction intersecting with the direction in which a spectral distribution is generated on an imaginary plane intersecting with the optical axis of the lens. Then, the reflective optical filter reflects the first-order diffracted beams towards the lens, where the first-order diffracted beams are re-shaped by the lens.

The first-order diffracted beams re-shaped by the lens are diffracted again at the first diffraction grating and then are emitted to the half mirror. The first-order diffracted beams that pass through the half mirror and reach the relay optical system form a quasi-two-dimensional spectrogram.

According to the above-described configuration, the two-dimensional lightwave conversion optical system uses a reflective filter to diffract the first-order diffracted beam. Therefore, the number of lenses required is half of that required when a transmissive two-dimensional conversion device is used. Consequently, the production costs are reduced.

Furthermore, since the optical path of the first-order diffracted beam is reversed within the two-dimensional lightwave conversion optical system, the length of the optical path is about half the length when a transmissive two-dimensional conversion device is used. Consequently, the overall length of the two-dimensional lightwave conversion optical system can be reduced, and thus, the size of the time-resolved spectroscope including the two-dimensional lightwave conversion optical system can be reduced.

Since the first diffraction grating also functions as the second diffraction grating, the production costs are low compared to when the first diffraction grating and the second diffraction grating are provided separately.

Figure 29:
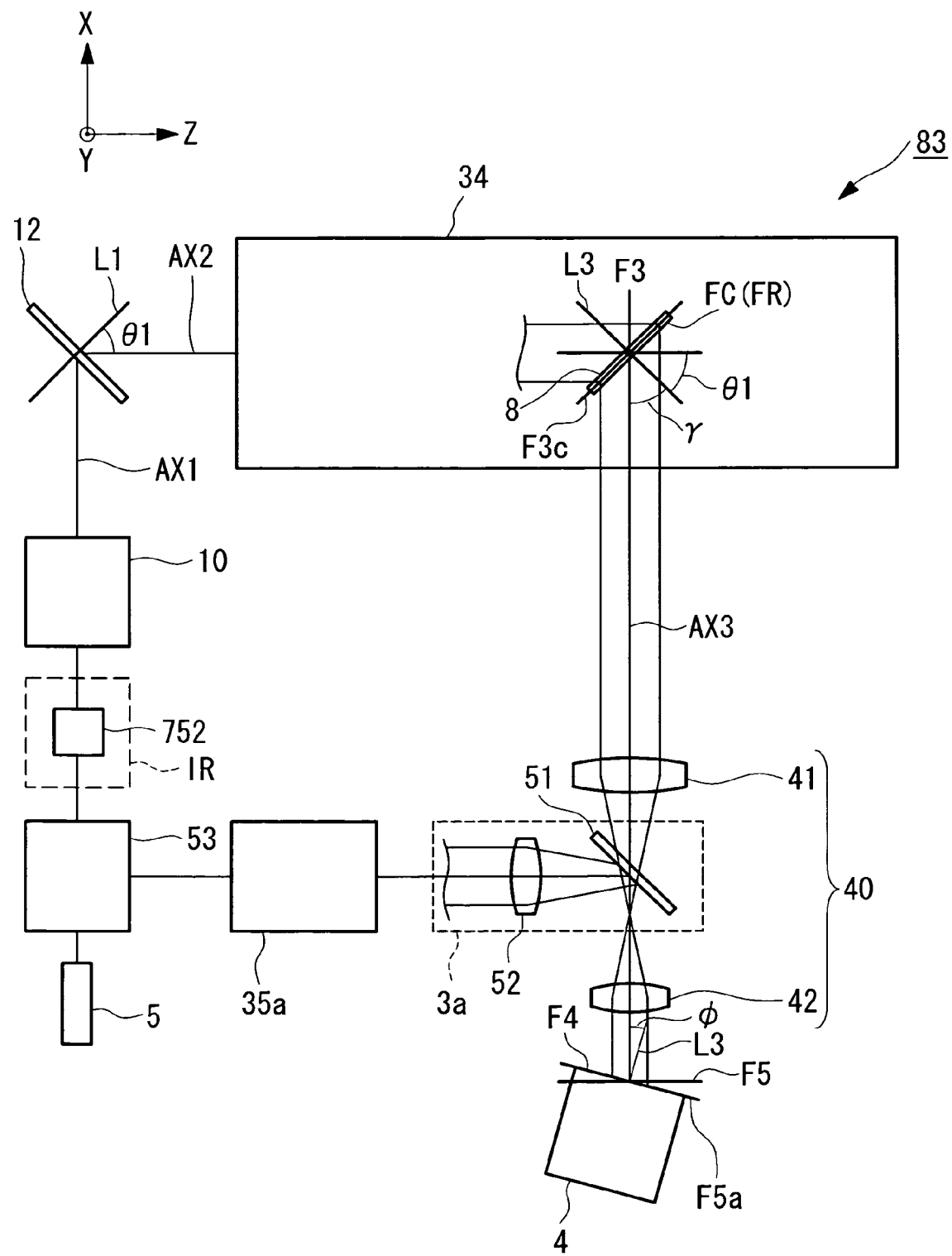
FIG. 29 is a block diagram of the overall structure of a time-resolved spectroscopy unit according to a sixth embodiment of the present.
Figure 30:
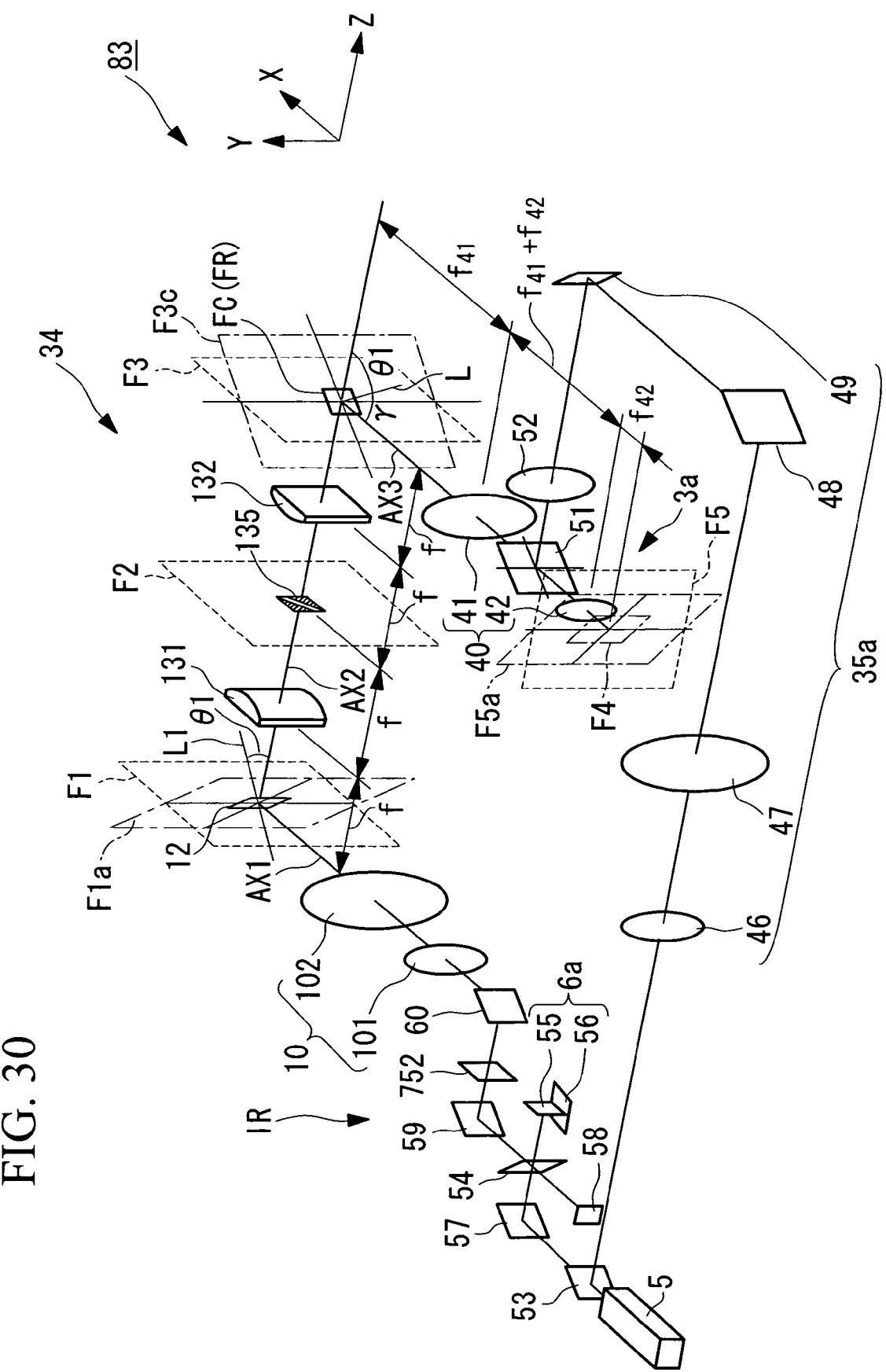
FIG. 30 is a perspective view of the overall structure of the time-resolved spectroscopy unit according to the sixth embodiment of the present.

As illustrated in FIGS. 29 and 30, the time-resolved spectroscopy unit 83 includes an ultrashort optical pulse source 5, an irradiating optical system IR, and a beam expander 10.

After the beam expander 10, a first diffraction grating 12, a two-dimensional lightwave conversion optical system 34, and an imaging device 4 for capturing a quasi-two-dimensional spectrogram formed on a conjugate plane FC conjugate with the first diffraction grating 12 are disposed.

A second diffraction grating 8 having the same grating constant as the first diffraction grating 12 is disposed at the conjugate plane FC. More specifically, the second diffraction grating 8 is disposed at an angle with respect to the two-dimensional lightwave conversion optical system 34 so that first-order diffracted beams are diffracted in a direction intersecting with the optical axis of the two-dimensional lightwave conversion optical system 34.

The imaging device 4 is disposed so that its image plane F4 is disposed at an angle in the same direction as or opposite to the angle of the second diffraction grating 8 with respect to the optical axis of the first-order diffracted beams diffracted by the second diffraction grating 8. In this embodiment, the image plane F4 of the imaging device 4 is disposed so that it is disposed at an angle opposite to the angle of the second diffraction grating 8.

A relay optical system 40 is interposed between the second diffraction grating 8 and the imaging device 4 so that its optical axis is aligned with the optical axis of the first-order diffracted beams diffracted by the second diffraction grating 8.

A beam splitter 53 for splitting the ultrashort optical pulse generated by the ultrashort optical pulse source 5 so as to obtain a reference beam is interposed between the ultrashort optical pulse source 5 and the irradiating optical system IR.

After the beam splitter 53, a beam expander 35a for shaping the reference beam is disposed. After the beam expander 35a, a multiplexer 3a for combining the shaped reference beam and a probe beam emitted from the two-dimensional lightwave conversion optical system 34 is provided.

The second diffraction grating 8 is a flat transmissive Bragg diffraction grating having the same grating constant as the first diffraction grating 12 and is disposed at the conjugate plane FC. More specifically, in the same manner as the conjugate plane FC, the normal L3 of the second diffraction grating 8 is rotated by an angle θ1 around the Y axis with respect to the optical axis AX2 of the two-dimensional lightwave conversion optical system 34, but is rotated in an opposite direction to the first diffraction grating 12. In second diffraction grating 8, the grating grooves, which are orthogonal to the inclination direction, are formed with a uniform spacing therebetween in a direction parallel to the inclination direction.

In this embodiment, since the angle θ1 of the second diffraction grating 8 is 45°, the first-order diffracted beams emitted from the two-dimensional lightwave conversion optical system 34 are incident on the second diffraction grating 8 at a 45° angle. The first-order diffracted beams are diffracted in a direction orthogonal to the optical axis AX2 (i.e., the negative direction along the X axis) on a plane parallel to the ZX plane.

Since the second diffraction grating 8 has the same grating constant as the first diffraction grating 12, the differences in the diffraction angles of wavelength components of each first-order diffracted beam incident on the second diffraction grating 8 are canceled out by being diffracted at the first diffraction grating 12. Then, the wavelength components are converted into collimated beams propagating substantially parallel to each other. Hereinafter, the optical axis of the collimated beams is referred to as the optical axis AX3. In this embodiment, as described above, the optical axis AX2 of the two-dimensional lightwave conversion optical system 34 and the optical axis AX3 of the collimated beams are orthogonal to each other.

Since the first diffraction grating 12 is disposed at an angle with respect to the optical axis AX2, the conjugate plane FC is also disposed at an angle with respect to the optical axis AX2. More specifically, the second diffraction grating 8 disposed at the conjugate plane FC is disposed at an angle opposite to the first diffraction grating 12 with respect to the optical axis AX2. Therefore, the first-order diffracted beams incident on the second diffraction grating 8 are delayed in accordance with the incident positions on the second diffraction grating 8.

As described above, since the second diffraction grating 8 is disposed on the optical axis at an angle opposite to the angle of the first diffraction grating 12 with respect to the optical axis AX2, the delays generated in the first-order diffracted beams are canceled out by being diffracted at the first diffraction grating 12.

The group of collimated beams that are not delayed with respect to each other form a quasi-two-dimensional spectrogram Sp on a cross-sectional plane (hereinafter referred to as a 'reference cross-sectional plane FR') disposed at an angle in the same direction as or opposite to the angle of the second diffraction grating 8. In this embodiment, the reference cross-sectional plane FR is a cross-sectional plane at the conjugate plane FC. More specifically, when the angle of the normal of the reference cross-sectional plane FR (which is identical to the normal L3 of the second diffraction grating 8) to the optical axis AX3 is represented as γ, the angle γ is defined as $(\pi/2-\theta 1)$, which is the same as the angle of the conjugate plane FC.

A relay optical system 40 is a reducing optical system including a condenser lens 41 and a collimating lens 42. The condenser lens 41 is disposed so that its optical axis is aligned with the optical axis AX3 of the collimated beams and has its front focal point at an imaginary plane F3c. The collimating lens 42 has its front focal point at the same point as a rear focal point R1 of the condenser lens 41.

As described above, the group of collimated beams emitted from the second diffraction grating 8 forms the quasi-two-dimensional spectrogram Sp on the reference cross-sectional plane FR disposed at an angle to the optical axis AX3. Consequently, the image plane F4 of the imaging device 4 is disposed at an angle to the optical axis AX3 so that the quasi-two-dimensional spectrogram Sp is formed on the image plane F4 by generating a difference in the optical path of each collimated beam between the second diffraction grating 8 and the image plane F4. In other words, the image plane F4 of the imaging device 4 is disposed at the imaginary plane F5a conjugate with the reference cross-sectional plane FR. In this embodiment, since the reference cross-sectional plane FR is a cross-sectional plane at the conjugate plane FC, the imaginary plane F5a is obtained by rotating the conjugate plane FC around the Y axis by an angle φ in a direction opposite to the conjugate plane FC with respect to the imaginary plane F5, which is orthogonal to the optical axis AX3. In other words, the angle of the normal L4 of the imaginary plane F5a to the optical axis AX2 on the ZX plane is φ.

The beam expander 35a, for example, is constituted of lenses 46 and 47. The beam expander 35a includes mirrors 48 and 49 for relaying the reference beam emitted from the lens 47 to a multiplexer 3a.

In this embodiment, the focal lengths of the lenses 46 and 47 are 10 mm and 100 mm, respectively. In other words, the beam expander 35a, similar to the beam expander 10, magnifies the incident probe beam about ten times and then collimates and emits the magnified probe beam.

The multiplexer 3a includes a half mirror 51 interposed between the two-dimensional lightwave conversion optical system 34 and the imaging device 4. The half mirror 51 is disposed in the optical path of the probe beam at an angle relative to the optical path.

The reference beam from the beam expander 35a is incident on the half mirror 51 at an angle with respect to the optical path of the probe beam. More specifically, the half mirror 51 allows the probe beam to pass through and reflects the reference beam in a direction parallel to the probe beam, i.e., in the positive direction along Z axis at the imaging device 4.

In this embodiment, the half mirror 51 is interposed between the condenser lens 41 and the collimating lens 42 of the relay optical system 40. A collimating lens 52 constituting the reducing optical system together with the collimating lens 42 is interposed between the half mirror 51 and the beam expander 35a. The reference beam is reduced by the same reduction power as the probe beam and is incident on the imaginary plane F4.

In this way, the quasi-two-dimensional spectrogram Sp is projected at the imaginary plane F4 and, as a result, an interference pattern P3 of the quasi-two-dimensional spectrogram Sp and the reference beam is generated on the imaginary plane F4 (refer to FIG. 28). Accordingly, time-resolved spectroscopy of the probe beam can be carried out based on the region where the stripes constituting the interference pattern P3 are present and the period of these bands (i.e., the distance between the bands).

In the time-resolved spectroscopy unit 83, the relay optical system 40 and the image plane F4 are disposed as described below so as to project the quasi-two-dimensional spectrogram Sp formed at the reference cross-sectional plane FR at the image plane F4.

Figure 31:
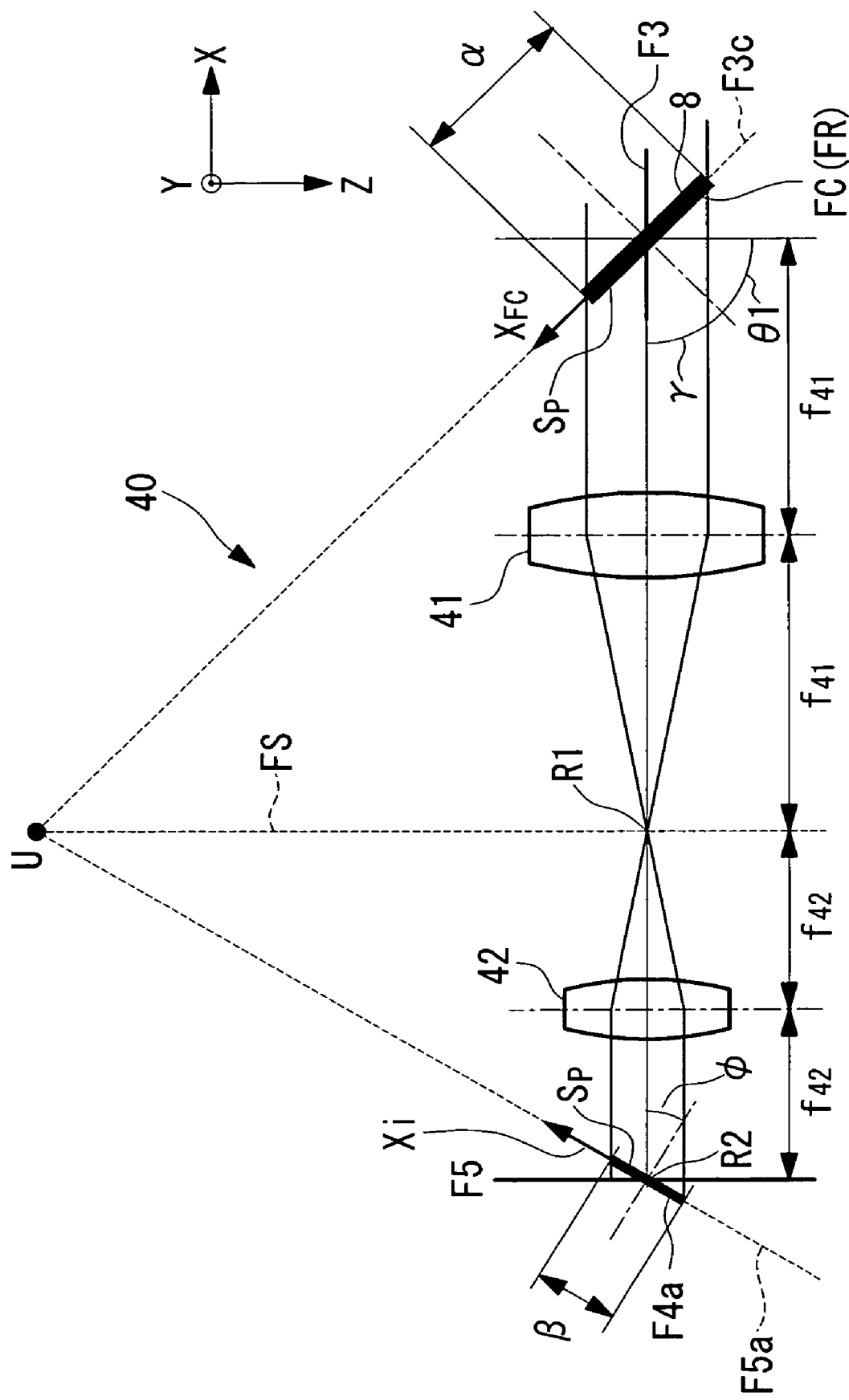
FIG. 31 is plan view of the structure of a relay optical system of the time-resolved spectroscopy unit according to the sixth embodiment of the present.

As illustrated in FIG. 31, the condenser lens 41 is disposed so that its front focal point is located at the imaginary plane F3c, and the collimating lens 42 is disposed so that its front focal point is at the same point as the rear focal point R1 of the condenser lens 41 and its rear focal point is located at the imaginary plane F5.

Also in the time-resolved spectroscopy unit 83, the reference cross-sectional plane FR is disposed at an angle with respect to the optical axis AX3. Therefore, the image plane F4, which is in an image-forming relationship with the reference cross-sectional plane FR, is disposed so that the line of intersection U of the imaginary plane F5a including the image plane F4 and the imaginary plane F3c including the reference cross-sectional plane FR is disposed on a reference plane FS. The reference plane FS is a plane that is orthogonal to the optical axis AX3 and passes through the rear focal point R1 of the condenser lens 41. In other words, the image plane F4 is disposed at the imaginary plane F5a that passes through the line of intersection U of the imaginary plane F3c including the conjugate plane FC and the reference plane FS and that also passes through a rear focal point R2 of the collimating lens 42.

Consequently, the angle φ of the normal L4 of the image plane F4 to the optical axis AX3 depends not only on the angle γ of reference cross-sectional plane FR but also on the position of the rear focal point R2 of the collimating lens 42. The closer the rear focal point R2 of the collimating lens 42 is to the rear focal point R1 of the condenser lens 41, the smaller the angle φ of the normal L4 of the image plane F4 to the optical axis AX3 will be.

In other words, the smaller the magnifying power of the relay optical system 40 is, the smaller the angle φ of the normal L4 of the image plane F4 to the optical axis AX3 will be.

Next, the relationship between the angle φ of the normal L4 of the image plane F4 to the optical axis AX3 and the magnifying power of the relay optical system 40 is described mathematically.

Since the reference cross-sectional plane FR and the image plane F4 are in an image-forming relationship with respect to the relay optical system 40, the line of intersection U of the imaginary plane F3c including the reference cross-sectional plane FR and the imaginary plane F5a including the image plane F4 is disposed on the ZX plane on a half line UR1 connecting the reference plane FS and the rear focal point R1 of the condenser lens 41.

Accordingly, a relationship represented by the following Formula (4) is established:

$$2f_{41} \tan(\pi/2-\gamma) = 2f_{42} \tan(\pi/2-\phi) \quad (4)$$

In Formula (4), $f_{41}$ represents the focal length of the condenser lens 41, and $f_{42}$ represents the focal length of the collimating lens 42.

From Formula (4), the following Formula (5) is derived:

$$\tan \phi = f_{42}/f_{41} \tan \gamma \quad (5)$$

Formula (5) can be transformed into the following Formula (6) based on the definition of the relay optical system 40 having a magnifying power M ($M=f_{42}/f_{41}$)

$$\tan \phi = M \tan \gamma \quad (6)$$

Formula (6) indicates that the relationship between the magnitudes of the angle γ of the reference cross-sectional plane FR and the angle φ of the image plane F4 are determined based on the magnifying power M of the relay optical system 40. More specifically, when M is greater than one (M>1), φ is greater than γ (φ>γ), and when M is smaller than one (M<1), φ is smaller than γ (φ<γ).

Accordingly, when the relay optical system 40 has a reducing power, the angle φ of the image plane F4 is small compared to the angle γ of the reference cross-sectional plane FR.

In this embodiment, the magnifying power of the relay optical system 40 is 0.4 and the angle γ of reference cross-sectional plane FR is 45°. Thus, the angle φ of the image plane F4 is 21.8°.

Now, the magnifying power between the reference cross-sectional plane FR of the relay optical system 40 and the image plane F4 will be described. As illustrated in FIG. 31, the coordinate axis $X_{FR}$ is defined as an axis on the reference cross-sectional plane FR parallel to the ZX plane. The coordinate axis $X_i$ is defined as an axis on the image plane F4 parallel to the ZX plane.

The magnifying power of the relay optical system 40 in the Y direction is equal to the magnifying power M of the relay optical system 40, whereas the magnifying power between the $X_{FR}$ axis and the $X_i$ axis is defined as M cos γ/cos φ. Consequently, the length α in the $X_{FR}$ direction and the length in the Y direction (not shown in the drawing) of the quasi-two-dimensional spectrogram Sp formed on the reference cross-sectional plane FR are 14.14 mm and 10 mm, respectively. The length β in the $X_i$ direction and the length in the Y direction (not shown in the drawing) of the quasi-two-dimensional spectrogram Sp projected on the image plane F4 of the imaging device 4 are 4.31 mm and 4.0 mm, respectively.

As described above, in the time-resolved spectroscopy unit 83, the angle φ of the image plane F4 may be set smaller than the angle γ of the reference cross-sectional plane FR. More specifically, the time-resolved spectroscopy unit 83 can maintain high diffraction efficiency without decreasing the angle of the first diffraction grating 12 to the optical axis AX2 and is capable of emitting the light flux that has passed through the relay optical system 40 at the image plane F4 at a small angle with respect to the normal L4 of the image plane F4 by reducing the angle φ of the normal L4 of the image plane F4 to the optical axis AX2.

When using a standard CCD camera, degradations, such as shading, can be sufficiently prevented by maintaining the incident angle of a beam at 25° or less. In this embodiment, as described above, although the angle of inclination θ1 of the first diffraction grating 12 and the angle γ of the reference cross-sectional plane FR are both 45°, the angle φ of the image plane F4 is 21.8°, which is smaller than 25°. Hence, degradation, such as shading, of the imaging device 4 can be sufficiently prevented.

As described above, the time-resolved spectroscopy unit 83 can satisfactorily capture the interference pattern using the imaging device 4 and can carry out highly accurate time-resolved spectroscopy.

In the time-resolved spectroscopy unit 83 according to this embodiment, the first-order diffracted beams are converted into collimated beams in which the wavelength components are made to propagate substantially parallel to each other by the second diffraction grating 8 disposed at the conjugate plane FC, as described above. Therefore, the difference in the incident angles of the wavelength components on the imaging device 4 is decreased and the wave components in an interference pattern P3 will have a pattern with similar periods. Consequently, by using the time-resolved spectroscopy unit 83 according to this embodiment, analysis of an interference pattern is simplified and highly accurate time-resolved spectroscopy can be carried out.

Seventh Embodiment

Now, a microscope apparatus according to a seventh embodiment of the present invention will be described below with reference to FIGS. 32 and 24.

Figure 32:
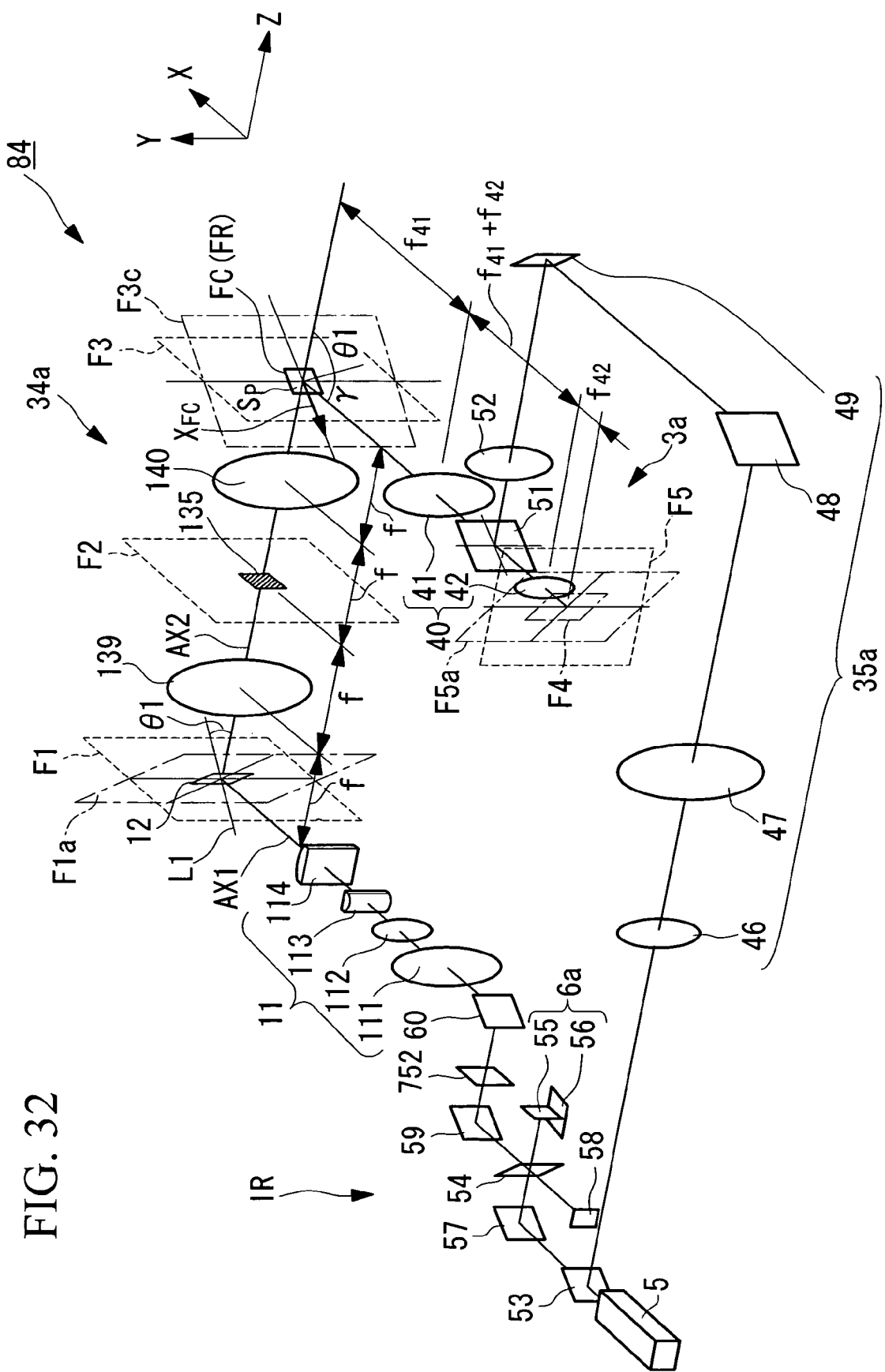
FIG. 32 is a perspective view of the overall structure of a time-resolved spectroscopy unit according to a seventh embodiment of the present.

As illustrated in FIG. 32, the structure of a time-resolved spectroscopy unit 84 is the same as that of the time-resolved spectroscopy unit 83 according the sixth embodiment except that a beam expander 11 and a two-dimensional lightwave conversion optical system 34a are provided instead of the beam expander 10 and the two-dimensional lightwave conversion optical system 34. The components that are the same as those included in the time-resolved spectroscopy unit 83 according to the sixth embodiment are represented by the same reference numerals and their descriptions are omitted.

The beam expander 11 shapes a probe beam emitted from an irradiating optical system IR into a beam having a linear cross-section extending along the inclination direction (Z direction) of a first diffraction grating 12.

In this way, the probe beam shaped into a beam having a linear cross-section extending in the direction of inclination of the first diffraction grating 12 is diffracted by the first diffraction grating 12. The group of first-order diffracted beams forms a beam having a linear cross-section extending in the direction of the spectral distribution (i.e., the X direction).

The two-dimensional lightwave conversion optical system 34a is the same as the two-dimensional lightwave conversion optical system 34 according to the sixth embodiment except that a spherical lens 139 is included instead of the first cylindrical lens 131, an optical filter 135 is provided instead of the filter 37, and a spherical lens 140 is included instead of the second cylindrical lens 38.

The spherical lens 139 collimates the first-order diffracted beams diffracted by the first diffraction grating 12 on a plane parallel to the X axis and emits these collimated beams to the optical filter 135 at a rear focal plane F2.

The optical filter 135 diffracts the wavelength components of the first-order diffracted beams in different direction on the YZ plane in accordance with the wavelengths.

The spherical lens 140 focuses the first-order diffracted beams by the optical filter 135 while maintaining the cross-sectional shape and projects the converged beams on a conjugate plane FC conjugate with an imaginary plane F1a in the two-dimensional lightwave conversion optical system 34a. In this way, a quasi-two-dimensional spectrogram Sp of the probe beam is formed on the conjugate plane FC.

Since the time-resolved spectroscopy unit 84 having the above-described structure does not eliminate any portion of the probe beam with a filter, it is capable of forming a quasi-two-dimensional spectrogram Sp using the entire probe beam. Hence, the probe beam is used efficiently and a clear interference pattern can be obtained even when the probe beam is weak.

In the relay optical system 40 according to this embodiment, the focal length $f_{41}$ of the condenser lens 41 is 100 mm and the focal length $f_{42}$ of the collimating lens 42 is 25 mm. In other words, the magnifying power of the relay optical system 40 is 0.25. Therefore, even when the angle θ1 of the first diffraction grating 12 and the angle γ of a reference cross-sectional plane are both 45°, the angle φ of the image plane F4 of the imaging device 4 will be 14.0° based on the above-described Formula (6). Accordingly, the angle φ of the normal L4 of the image plane F4 to the optical axis AX2 can be decreased while maintaining high diffraction efficiency without decreasing the angle of inclination θ1 of the first diffraction grating 12, and the beam that has passed through the relay optical system 40 can be emitted on the image plane F4 at a small angle with respect to the normal of the image plane F4.

In this embodiment, the length of the quasi-two-dimensional spectrogram Sp projected on the image plane F4 of the imaging device 4 in the $X_{FC}$ direction and the Y direction are 2.58 mm and 2.5 mm, respectively.

Eighth Embodiment

Now, a microscope apparatus according to an eighth embodiment of the present invention will be described below with reference to FIGS. 33 and 34.

Figure 33:
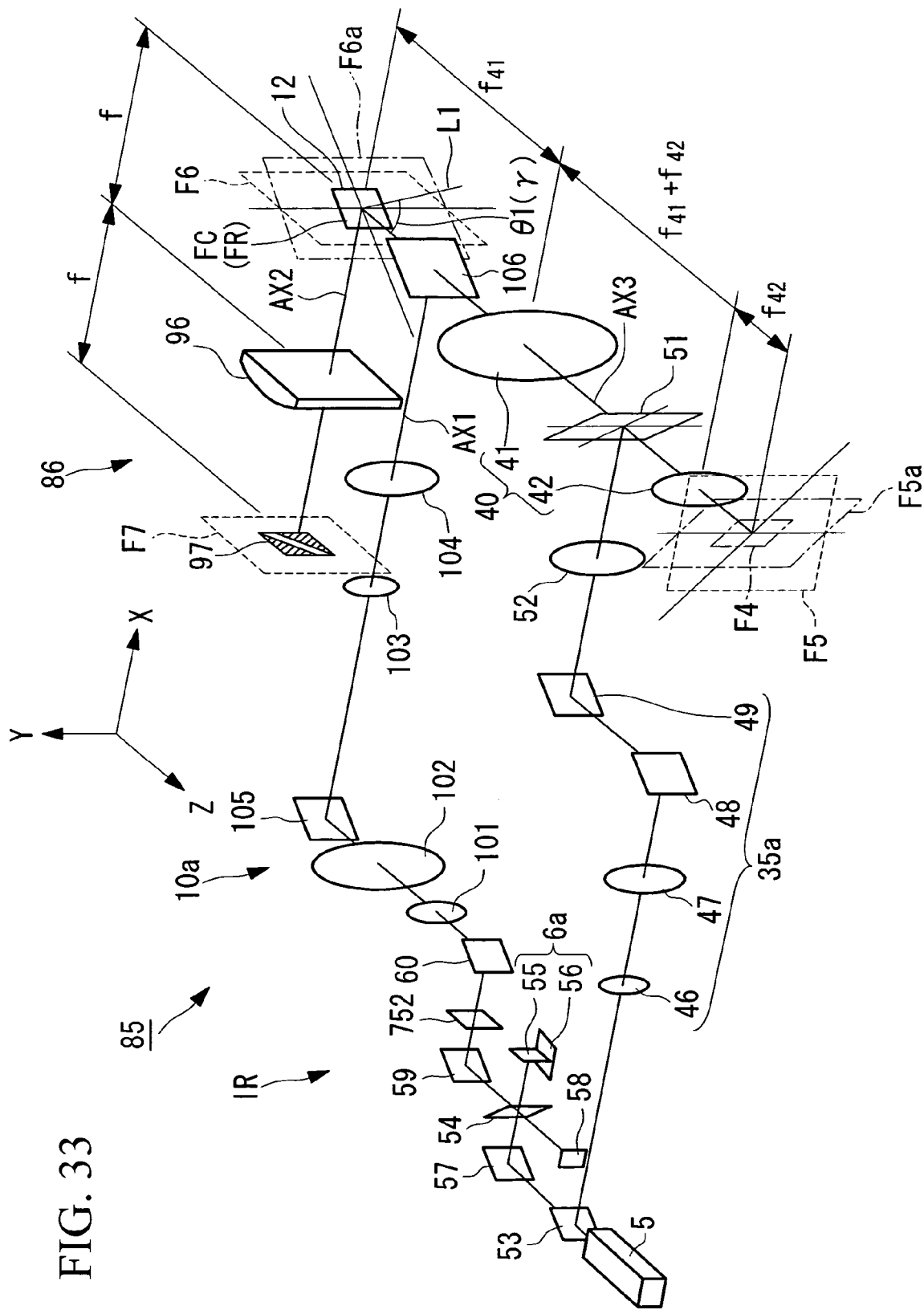
FIG. 33 is a perspective view of the overall structure of a time-resolved spectroscopy unit according to an eighth embodiment of the present.
Figure 34:
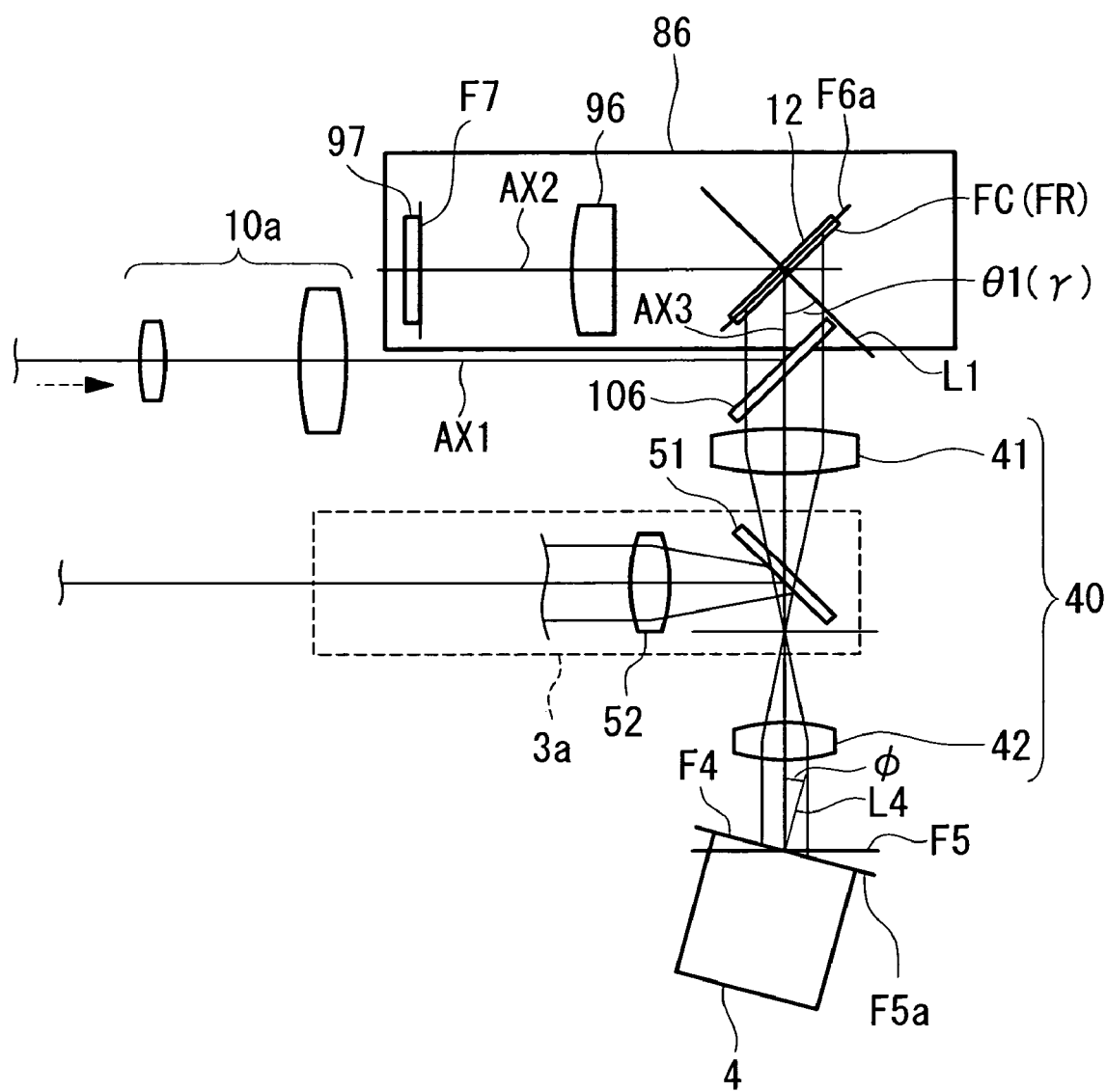
FIG. 34 is a plan view of the overall structure of the time-resolved spectroscopy unit according to the eighth embodiment of the present.

As illustrated in FIG. 33, the structure of a time-resolved spectroscopy unit 85 is the same as that of the time-resolved spectroscopy unit 83 according the sixth embodiment except that a beam expander 10a and a two-dimensional lightwave conversion optical system 86 are provided instead of the beam expander 10 and the two-dimensional lightwave conversion optical system 34. The components that are the same as those included in the time-resolved spectroscopy unit 83 according to the sixth embodiment are represented by the same reference numerals and their descriptions are omitted.

The beam expander 10a has the same structure as the beam expander 10 except that lenses 103 and 104 are disposed after lenses 101 and 102. In this embodiment, the beam expander 10a magnifies the probe beam ten times and collimates it before emitting the probe beam. Furthermore, in this embodiment, a mirror 105 is interposed between the lenses 102 and 103 so as to tilt the optical axis of the lenses 103 and 104 at an angle with respect to the optical axis of the lens 102.

In this embodiment, the optical axis of the lenses 103 and 104 is defined as an optical axis AX1. The X axis extends along the optical axis AX1. The propagation direction of the probe beam is the positive direction of the X axis.

A half mirror 106 is disposed on the optical axis AX1 at an angle with respect to the optical axis AX1. The half mirror 106 reflects the probe beam emitted from the beam expander 10a in a direction that deviates from the optical axis AX1.

In this embodiment, the Z axis extends along the optical axis of the probe beam reflected by the half mirror 106 (hereinafter, this axis is referred to as an optical axis AX3). The direction opposite to the propagating direction of the reflected probe beam is the positive direction of the Z axis. The X and Z axes are orthogonal to each other. The Y axis is orthogonal to both the X and Z axes.

The first diffraction grating 12 is disposed on the optical axis AX3 of the probe beam reflected by the half mirror 106 at an angle θ1 with respect to the optical axis AX3. The first diffraction grating 12 diffracts the probe beam and emits the diffracted probe beam to the two-dimensional lightwave conversion optical system 86.

In this embodiment, the optical axis AX2 of the two-dimensional lightwave conversion optical system 86 is disposed at an angle with respect to the optical axis AX3. In this embodiment, a plane that includes the intersecting point of the optical axis AX2 and the optical axis AX3 and that is orthogonal to the optical axis AX2 is defined as an imaginary plane F6. In this embodiment, the first diffraction grating 12 is disposed at an imaginary plane F6a obtained by rotating the imaginary plane F6 by 45° around the Y axis. In other words, the angle θ1 is 45°.

The two-dimensional lightwave conversion optical system 86 includes a cylindrical lens 96 having a positive power in the Z direction and having a rear focal plane at the imaginary plane F6 and a reflective optical filter 97 (reflective two-dimensional lightwave conversion element) disposed at the rear focal plane F7 of the cylindrical lens 96.

The cylindrical lens 96 constitutes a Fourier transformation optical system for collimating first-order diffracted beams incident on the two-dimensional lightwave conversion optical system 86 on a plane parallel to the ZX plane and emitting the collimated probe beams to the reflective optical filter 97. In this embodiment, the focal length of the cylindrical lens 96 is f=100 mm.

The reflective optical filter 97 includes a reflective region 97a extending diagonally with respect to both the Y and Z axes. The reflective optical filter 97 cuts out a light flux from the first-order diffracted beams in a diagonal direction with respect to the X and Y axes. This light flux includes wavelength components sequentially distributed along the Y axis.

The cylindrical lens 96 constitutes an inverse Fourier transformation optical system for focusing the first-order diffracted beams reflected at the reflective optical filter 97 and emitted at the cylindrical lens 96 for a second time in the Z direction, converting the incident first-order diffracted beams into a light flux having a linear cross-section extending along the Y axis, and projecting the converted first-order diffracted beams on a conjugate plane FC conjugate with the imaginary plane F6a of the two-dimensional lightwave conversion optical system 86.

As illustrated in FIG. 33, the conjugate plane FC is formed on the imaginary plane F6a.

The first diffraction grating 12 also functions as a second diffraction grating for diffracting the first-order diffracted beams from the cylindrical lens 96 and emitting the first-order diffracted beams at the half mirror 106. More specifically, the first diffraction grating 12 collimates the wavelength components of the first-order diffracted beams and emits the collimated beams along the optical axis AX3 (in the positive Z direction).

A relay optical system 40, which is a reducing optical system, and an imaging device 4 are disposed on the optical axis AX3 at the same positions as those according to the sixth embodiment. An interference pattern P3 of a quasi-two-dimensional spectrogram Sp and a reference beam is captured in the same manner as the sixth embodiment. In this embodiment, the angle γ of the normal of a reference cross-sectional plane FR to the optical axis AX3 is the same as the angle θ1 of the conjugate plane FC.

In the time-resolved spectroscopy unit 85, the two-dimensional lightwave conversion optical system 86 uses a reflective optical filter 97 to diffract the first-order diffracted beams. Therefore, the number of cylindrical lenses required is half of that required when a transmissive two-dimensional conversion device is used. Consequently, the production cost is reduced.

Furthermore, since the optical path of the first-order diffracted beam is reversed within the two-dimensional lightwave conversion optical system 86, the length of the optical path is about half the length of when a transmissive two-dimensional conversion device is used. Consequently, the overall length of the two-dimensional lightwave conversion optical system 86 can be reduced, and thus, the size of the time-resolved spectroscope unit 85 can be reduced.

Since the first diffraction grating 12 also functions as the second diffraction grating, production cost is low compared to when the first diffraction grating 12 and the second diffraction grating are provided separately.

The time-resolved spectroscopy unit 85 according to this embodiment is constituted by applying the above-described features to the time-resolved spectroscopy unit 83 according to the sixth embodiment. However, the time-resolved spectroscopy unit 85 according to this embodiment is not limited and may be constituted by applying the above-described features to, for example, the time-resolved spectroscopy unit 66 according to the seventh embodiment.

Figure 35:
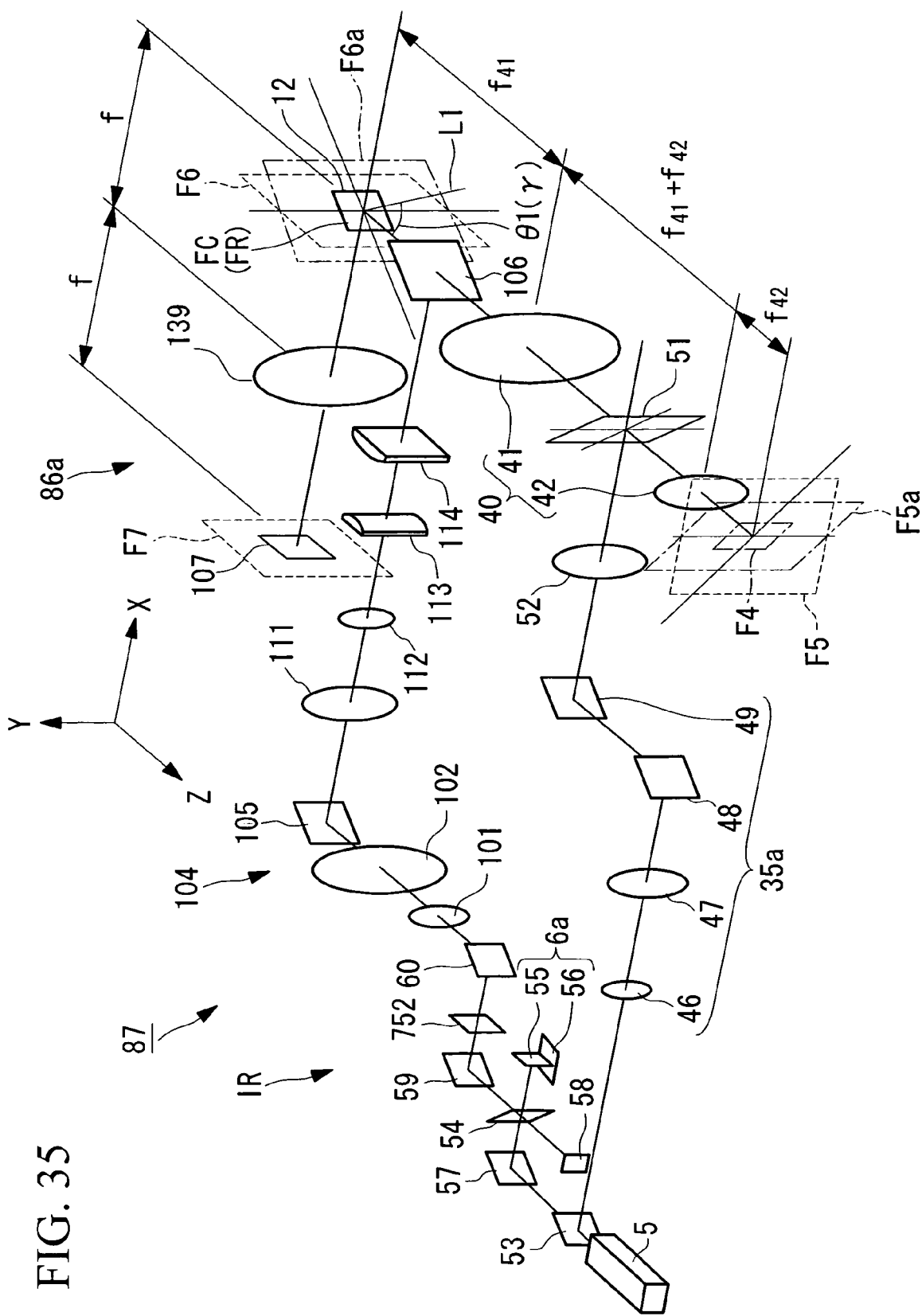
FIG. 35 is a perspective view of the overall structure of a variation of the time-resolved spectroscopy unit according to the eighth embodiment of the present.
Figure 36:
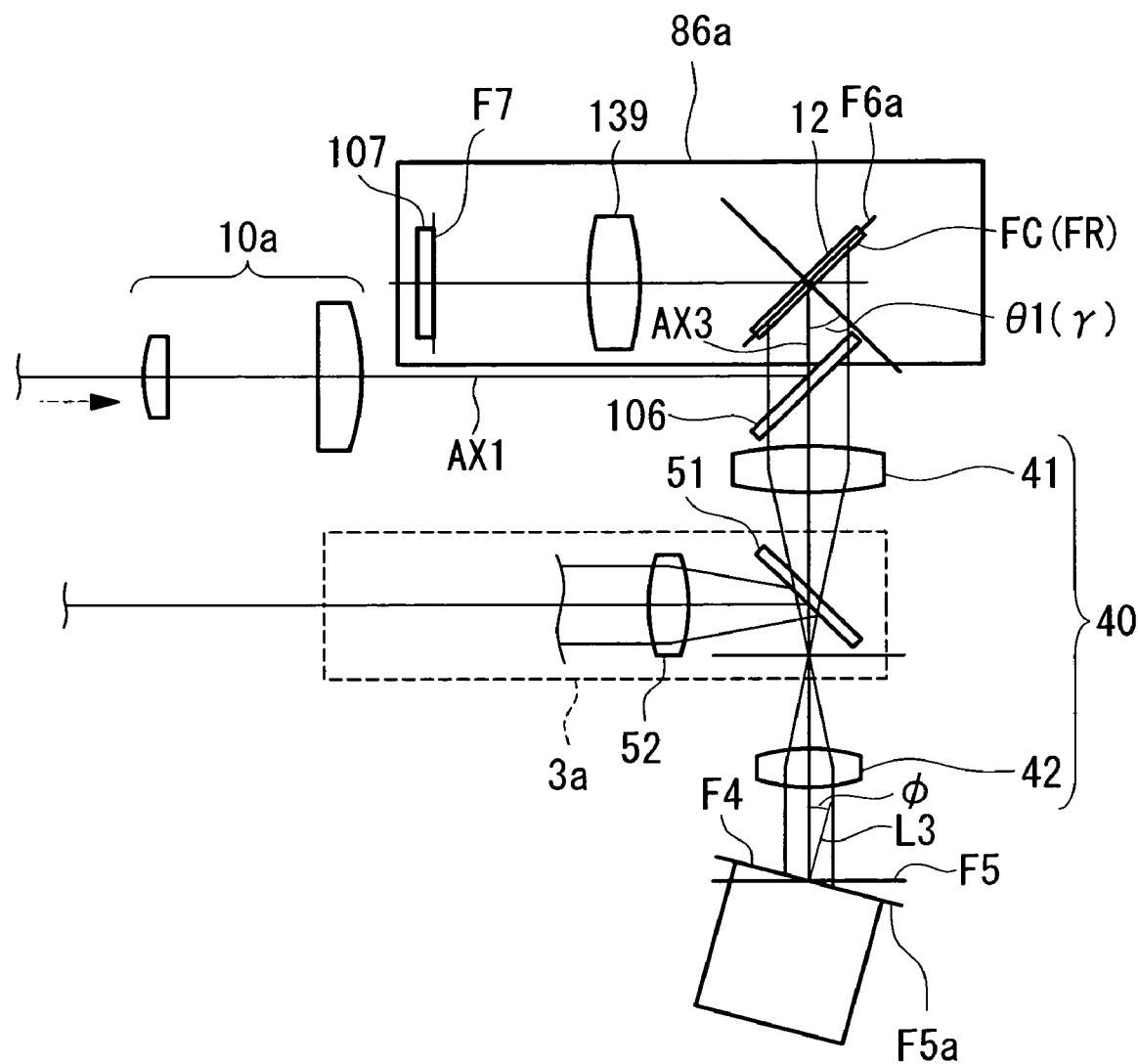
FIG. 36 is a perspective view of the overall structure of another variation of the time-resolved spectroscopy unit according to the eighth embodiment of the present.

Now, a time-resolved spectroscopy unit 87 constituted by applying the above-described technological ideas to the time-resolved spectroscopy unit 66 will be described with reference to FIGS. 35 and 36.

The structure of the time-resolved spectroscopy unit 87 is the same as that of the time-resolved spectroscopy unit 85 except that a first beam shaping optical system 104 and a two-dimensional lightwave conversion optical system 86a are used instead of the beam expander 10a and the two-dimensional lightwave conversion optical system 86, respectively.

A first beam shaping optical system 104 is constituted by replacing the lenses 103 and 104 of the beam expander 10a by the lenses 111 and 112 according to the seventh embodiment and cylindrical lenses 113 and 114. The lenses 111 and 112 and the cylindrical lenses 113 and 114 are disposed in this order along the propagating direction of a probe beam.

The two-dimensional lightwave conversion optical system 86a is constituted by replacing the cylindrical lens 96 and the reflective optical filter 97 by the spherical lens 139 according to the sixth embodiment and a reflective diffraction grating array (reflective two-dimensional lightwave conversion device) 107 of the two-dimensional lightwave conversion optical system 86.

The reflective diffraction grating array 107 is the same as the optical filter 135 according to the seventh embodiment except that it is a reflective diffraction grating array.

The time-resolved spectroscopy unit 87, similar to the time-resolved spectroscopy unit 84 according to the seventh embodiment, is capable of forming a quasi-two-dimensional spectrogram Sp using the entire probe beam without eliminating any portion of the probe beam with a filter. Hence, the probe beam is used efficiently and a clear interference pattern can be obtained even when the probe beam is weak.

Ninth Embodiment

Now the microscope apparatus according to a ninth embodiment will be described below with reference to FIG. 37.

Figure 37:
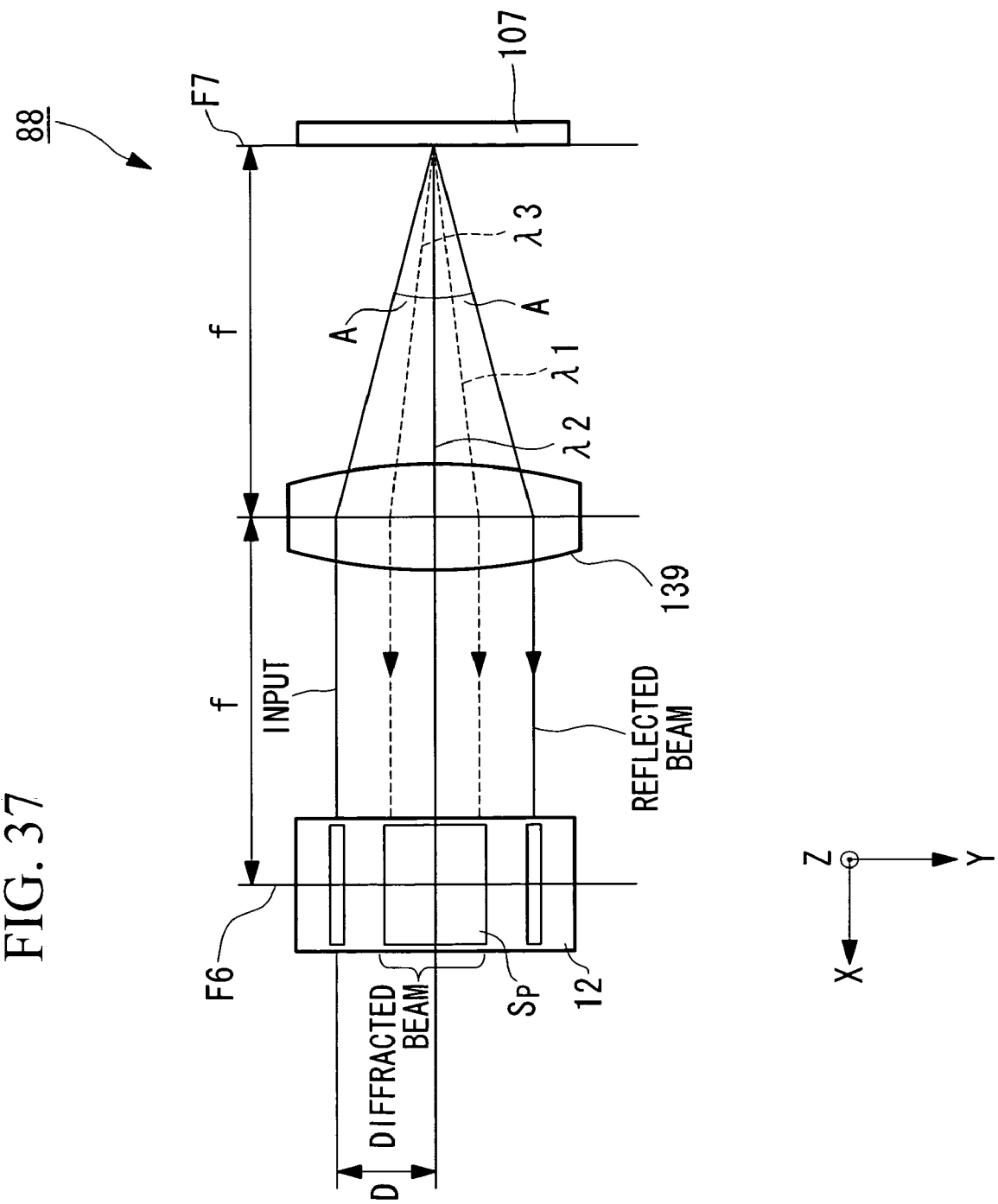
FIG. 37 is a plan view of the overall structure of a time-resolved spectroscopy unit according to a ninth embodiment of the present.

As illustrated in FIG. 37, a two-dimensional lightwave conversion optical system 88 according to this embodiment has the same structure as the time-resolved spectroscopy unit 87 according to the eighth embodiment except that first-order diffracted beams are incident on a spherical lens 139 of a two-dimensional lightwave conversion optical system 86a at a position decentered by a distance D from the optical axis AX2 along the direction in which diffraction is exhibited by a reflective diffraction grating array 107 (i.e., the Y direction) This configuration is obtained, for example, by adjusting the incident position of the probe beams on a first diffraction grating 12.

In the two-dimensional lightwave conversion optical system 88 having the structure described above, first-order diffracted beams are incident on the reflective diffraction grating array 107 at an angle. In other words, the first-order diffracted beams are incident on the reflective diffraction grating array 107 at a predetermined angle A.

In this way, among the first-order diffracted beams incident on the reflective diffraction grating array 107, the beams that are simply reflected by the reflective diffraction grating array 107 at a reflection angle A that is the same as the incident angle A reach an area on the first diffraction grating 12 that is displaced from the optical axis AX2 by a distance D.

The wavelength components (for example, λ1, λ2, and λ3 illustrated in FIG. 37) of the first-order diffracted beams that are diffracted by the reflective diffraction grating array 107 are diffracted at different diffraction angles that are not equal to the incident angle A. Then, the wavelength components are incident on the first diffraction grating 12 in areas different from the areas where the reflected beams are incident. Subsequently, the wavelength components are diffracted at the first diffraction grating 12 and are incident on an imaging plane F4 of an imaging device 4 through a relay optical system 40.

In other words, with the two-dimensional lightwave conversion optical system 88, the reflected beams and the diffracted beams reflected and diffracted, respectively, by the reflective diffraction grating array 107 are incident on the spherical lens 139 at different angles. The difference in the incident angles is caused not only by the angular difference due to the diffraction efficiency of the reflective diffraction grating array 107 but also by the difference in the diffraction angle and reflection angle.

Consequently, even if the diffraction efficiency of the reflective diffraction grating array 107 is low, the contrast of the obtained interference pattern P3 becomes high by separating the reflected beams and diffracted beams, and the analysis of the interference pattern P3 is simplified.

The time-resolved spectroscopy unit 88 according to this embodiment is constituted by applying the above-described features to the time-resolved spectroscopy unit 87 according to the eighth embodiment. However, the time-resolved spectroscopy unit 88 according to this embodiment is not limited and may be constituted by applying the above-described features to, for example, the time-resolved spectroscopy unit 85 having the reflective diffraction grating array 107 instead of the reflective optical filter 97.

Tenth Embodiment

Now, a microscope apparatus according to a tenth embodiment will be described with reference to FIGS. 38 to 40.

The components that are the same as those included in the above-described embodiments are represented by the same reference numerals and their descriptions are omitted.

The structure of the microscope apparatus according to this embodiment is the same as that of the microscope apparatus according to the third embodiment except that a time-resolved spectroscopy unit 89 is used instead of the time-resolved spectroscopy unit 80a. The components that are the same as those included in the third embodiment are represented by the same reference numerals and their descriptions are omitted.

Figure 38:
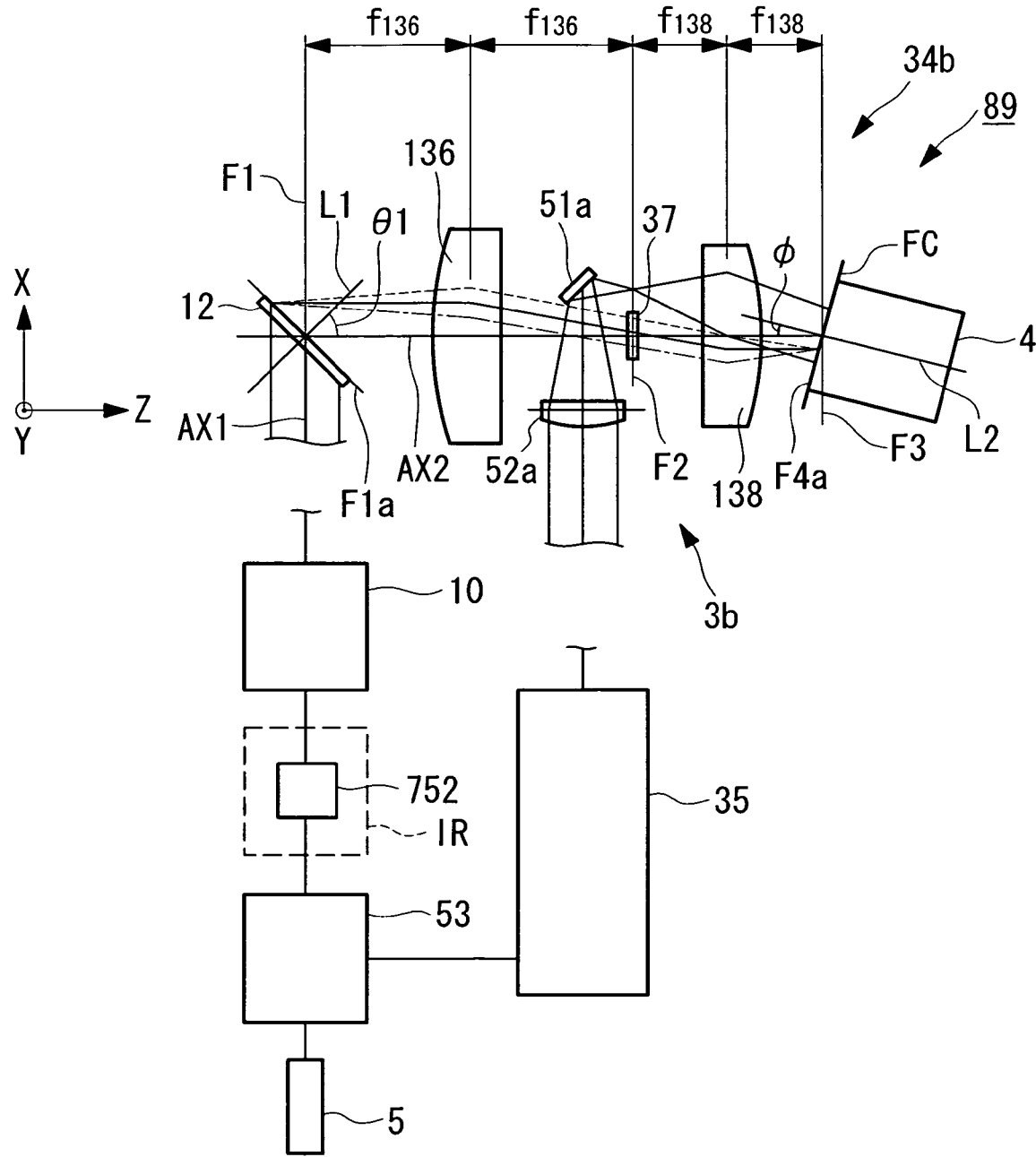
FIG. 38 is a block diagram of the overall structure of a time-resolved spectroscopy unit according to a tenth embodiment of the present.
Figure 39:
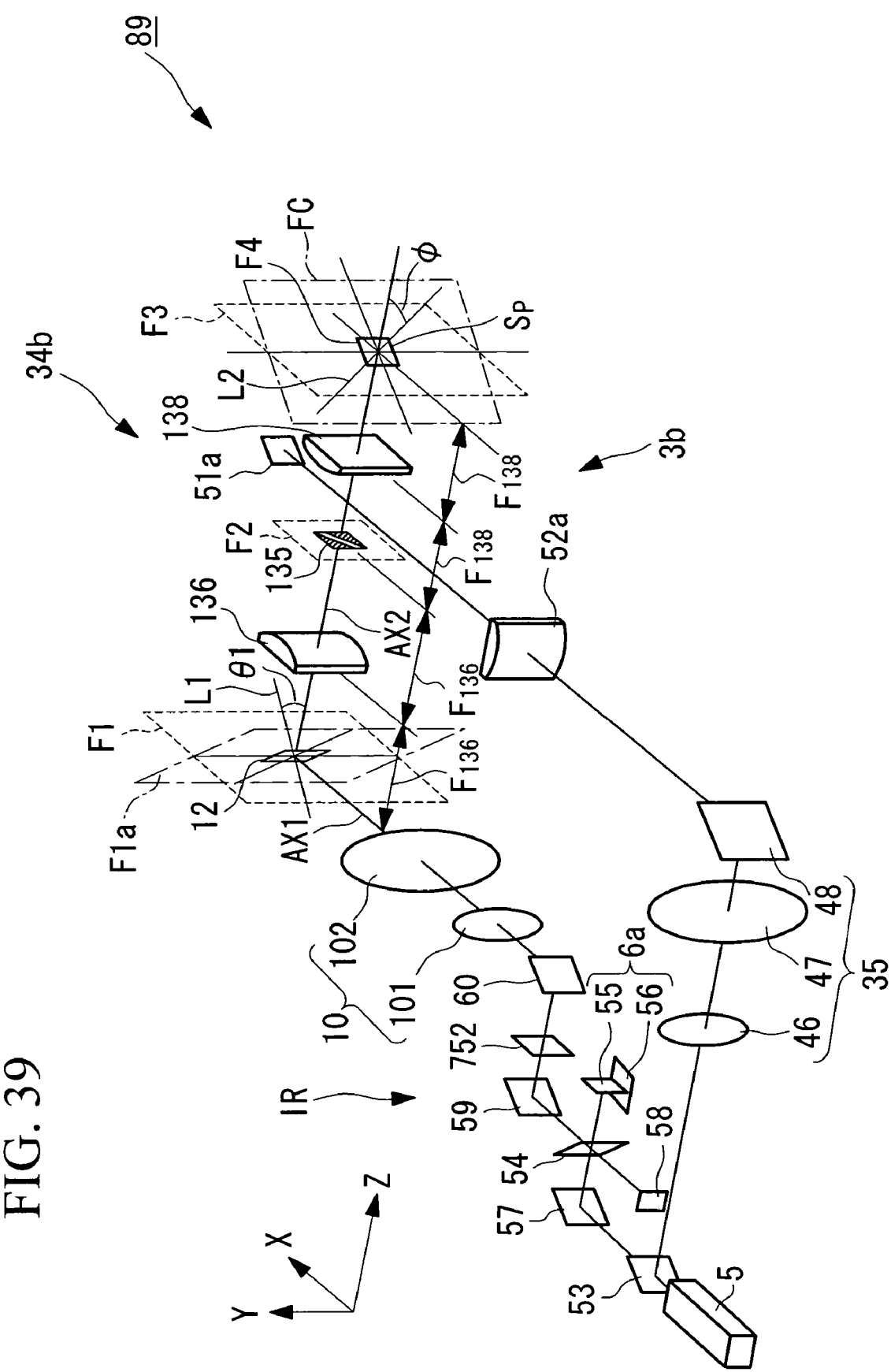
FIG. 39 is a perspective view of the overall structure of the time-resolved spectroscopy unit according to the tenth embodiment of the present.

As illustrated in FIGS. 38 and 39, the time-resolved spectroscopy unit 89 includes an ultrashort optical pulse source 5, an irradiating optical system IR, and a beam expander 10.

After the beam expander 10, a first diffraction grating 12, a two-dimensional lightwave conversion optical system 34b, and an imaging device 4 are provided. The two-dimensional lightwave conversion optical system 34b is capable of forming a quasi-two-dimensional spectrogram of a probe beam on a conjugate plane FC that is conjugate with the first diffraction grating 12 by converting first-order diffracted beams from the first diffraction grating 12 so that a spectral distribution is generated in a direction orthogonal to the original direction of the spectral distribution. The imaging device 4 has an imaging plane F4a disposed at the conjugate plane FC conjugate to the first diffraction grating 12. These components enable the imaging device 4 to capture the quasi-two-dimensional spectrogram formed on the conjugate plane FC.

A beam splitter 53 for splitting the ultrashort optical pulse generated at the ultrashort optical pulse source 5 so as to obtain a reference beam is interposed between the ultrashort optical pulse source 5 and the irradiating optical system IR.

After the beam splitter 53, a beam expander 35 for shaping the reference beam is disposed. After the beam expander 35, a multiplexer 3b for combining the shaped reference beam and the probe beam emitted from the two-dimensional lightwave conversion optical system 34b is disposed.

The first diffraction grating 12 is a flat transmissive Bragg diffraction grating. The first diffraction grating 12 is disposed so that the angle between its normal L1 and an optical axis AX2 is θ1 on a plane parallel to an optical axis AX1 of the irradiating optical system IR and an optical axis AX2 of the two-dimensional lightwave conversion optical system 34$b$. The first diffraction grating 12 has a plurality of grating grooves formed orthogonal to and aligned along the direction of inclination of the first diffraction grating 12.

In this embodiment, the optical axis AX1 of the irradiating optical system IR and the optical axis AX2 of the two-dimensional lightwave conversion optical system 34$b$ are orthogonal to each other. In the description below, an imaginary plane F1 is defined as a plane that includes the intersecting point of the optical axes AX1 and AX2 and that is orthogonal to the optical axis AX2. The X axis of the imaginary plane F1 extends in a direction parallel to the optical axis AX1, the Y axis extends in a direction orthogonal to the X axis, and the Z axis extends in a direction parallel to the optical axis AX2. The intersecting point of the optical axes AX1 and AX2 is set as the origin, and the propagating directions of the probe beam along the X and Z axes are defined as the positive X and Z directions.

In this embodiment, the first diffraction grating 12 is disposed on an imaginary plane F1$a$, which is obtained by rotating the imaginary plane F1 around the Y axis by 45°. In other words, the above-mentioned angle θ1 is 45°. The length of the first diffraction grating 12 in the X direction along the imaginary plane F1$a$ is about 14.14 mm and the length in the Y direction is about 10 mm. The grating constant is set to 1,767 lines per millimeter so that the diffraction direction of the central wavelength component of the probe beam emitted to the normal L1 from the irradiating optical system IR at an incident angle of 45° substantially aligns with the optical axis AX2. In this way, a probe beam from the beam expander 10 is incident on the first diffraction grating 12 at a 45° angle and is diffracted highly efficiently toward the two-dimensional lightwave conversion optical system 34$b$ (i.e., in the positive Z direction) on a plane parallel to the ZX plane.

The two-dimensional lightwave conversion optical system 34$b$ includes a first cylindrical lens 136 having a positive power in the X direction and having a front focal plane at the imaginary plane F1, a filter 37 disposed at the rear focal plane F2 of the first cylindrical lens 136, and a second cylindrical lens 138 having a positive power in the X direction and having a front focal plane at the filter 37.

The first and second cylindrical lenses 136 and 138 constitute a reducing optical system. In this embodiment, the focal lengths of the first and second cylindrical lenses 136 and 138 are $f_{136}$=100 mm and $f_{138}$=40 mm, respectively. In other words, the magnifying power of the two-dimensional lightwave conversion optical system 34$b$ is 0.4.

The first cylindrical lens 136 collimates the first-order diffracted beams, which are diffracted by the first diffraction grating 12 onto a plane parallel to the X axis, onto a plane parallel to the ZX plane and emits the first-order diffracted beams onto the filter 37 at the rear focal plane F2. In this embodiment, the first cylindrical lens 136 emits wavelength components in the wavelength bands of, for example, 805 nm, 800 nm, and 795 nm included in the first-order diffracted beams so that the wavelength components incident onto positions on the rear focal plane F2 wherein X equals −1.25 mm, 0 mm, and +1.24 mm, respectively, as illustrated in FIG. 40.

The second cylindrical lens 138 focuses the light flux cut out by the filter 37 in the X direction so that the light flux is converted into a beam having a linear cross-section extending in the Y direction and projects this beam onto the conjugate plane FC conjugate with the imaginary plane F1$a$ in the two-dimensional lightwave conversion optical system 34$b$.

As illustrated in FIG. 39, the conjugate plane FC is obtained by rotating the rear focal plane F3 of the second cylindrical lens 138 around the Y axis by an angle φ in a direction opposite to the rotational direction of the imaginary plane F1$a$ with respect to the imaginary plane F1. In other words, the normal L2 of the conjugate plane FC intersects with the optical axis AX2 at an angle φ on the ZX plane.

Since first-order diffracted beams are emitted from the first diffraction grating 12 with time delays in accordance with their incident positions along the X axis, each first-order diffracted beam is incident on the conjugate plane FC at different positions along the X axis at different instant. In this way, as illustrated in FIG. 20, a quasi-two-dimensional spectrogram Sp in which time is distributed in the X direction and wavelength is distributed in the Y direction is formed on the conjugate plane FC.

The imaging device 4, for example, is a CCD camera including a matrix of photoreceptors arranged on a plane and having the image plane F4$a$. The imaging device 4 is disposed so that the image plane F4$a$ is disposed at an imaginary plane F5$a$ conjugate with the conjugate plane FC.

The multiplexer 3$b$ includes a half mirror 51$a$ interposed between the two-dimensional lightwave conversion optical system 34$b$ and the imaging device 4. The half mirror 51$a$ is disposed in the optical path of the probe beam at an angle relative to the optical path.

The reference beam from the beam expander 35 is incident on the half mirror 51$a$ at an angle with respect to the optical path of the probe beam. More specifically, the half mirror 51$a$ allows the probe beam to pass through and reflects the reference beam in a direction parallel to the probe beam, i.e., in the positive direction along Z axis at the imaging device 4.

In this embodiment, the mirror 51$a$ is interposed between the first cylindrical lens 136 and the second cylindrical lens 138 of the two-dimensional lightwave conversion optical system 34$b$. A reference beam reflected at the mirror 51$a$ is incident on the imaging plane F4$a$ through the second cylindrical lens 138. A cylindrical condenser lens 52$a$ that constitutes a reducing optical system with the second cylindrical lens 138 is interposed between the mirror 51$a$ and a beam expander 35. The reference beam is reduced by the same amount as the probe beam and is incident on the imaging plane F4$a$. The cylindrical condenser lens 52$a$ has a positive power in the Z direction and reduces the reference beam in the Z direction.

In this way, the quasi-two-dimensional spectrogram Sp is projected at the imaginary plane F4$a$ and, as a result, an interference pattern of the quasi-two-dimensional spectrogram Sp and the reference beam is generated on the imaginary plane F4$a$. Accordingly, time-resolved spectroscopy of the probe beam can be carried out based on the region where the stripes constituting the interference pattern P1 are present and the period of these bands (i.e., the distance between the bands).

In the time-resolved spectroscopy unit 89, the two-dimensional lightwave conversion optical system 34$b$ and the image plane F4$a$ are disposed as described below so as to project the quasi-two-dimensional spectrogram Sp on the image plane F4$a$.

Figure 40:
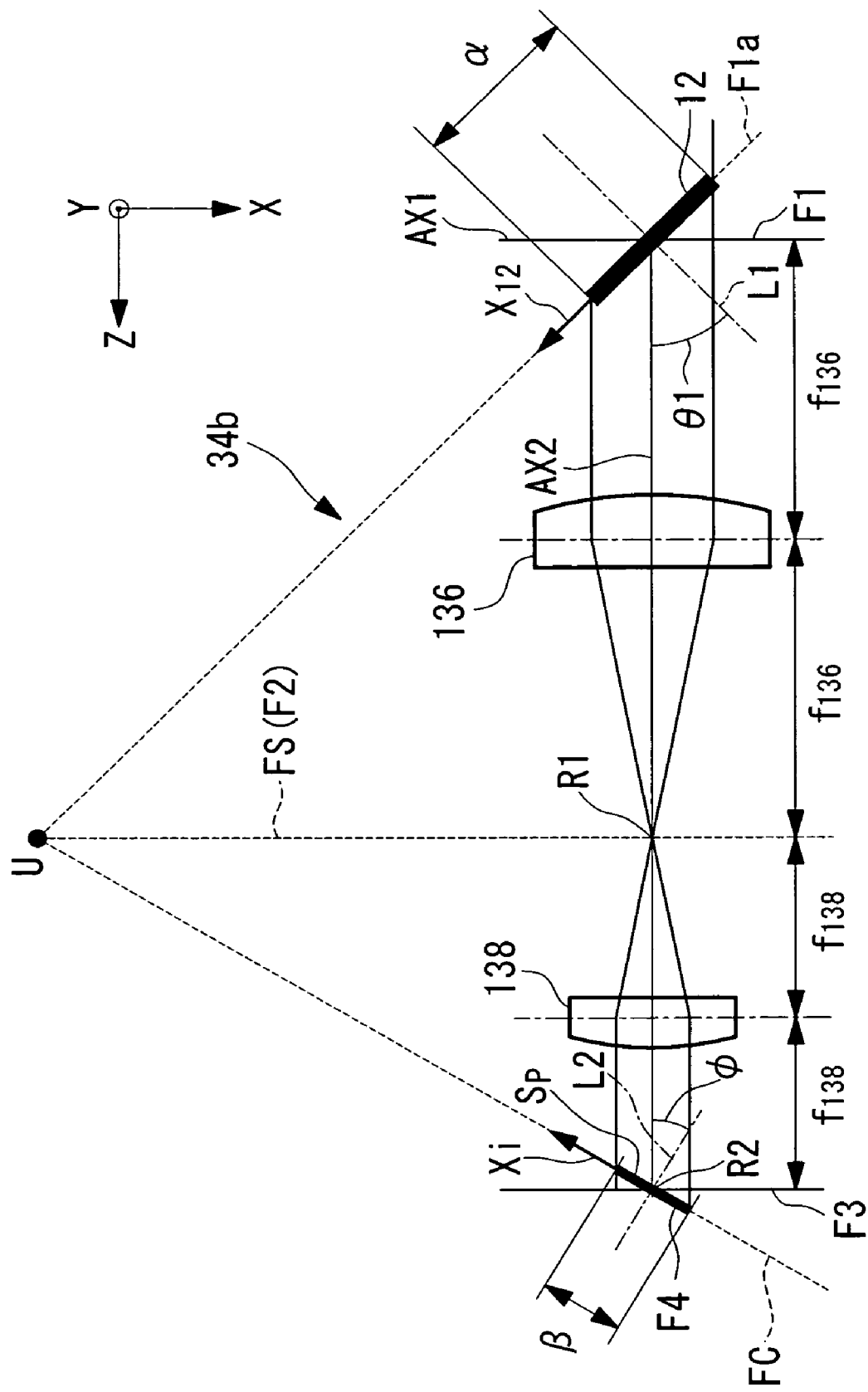
FIG. 40 is a plan view of the structure of a relay optical system of the time-resolved spectroscopy unit according to the tenth embodiment of the present.

As illustrated in FIG. 40, the first cylindrical lens 136 is disposed so that its front focal point is disposed at the first diffraction grating 12. The second cylindrical lens 138 is disposed so that its front focal point is disposed at the same point as the rear focal point R1 of the first cylindrical lens 136 and its rear focal point is disposed at the imaging plane F4a (conjugate plane FC).

Since, also in the time-resolved spectroscopy unit 89, the first diffraction grating 12 intersects with the optical axis AX2 at an angle, the conjugate plane FC of the first diffraction grating 12 is disposed so that the line of intersection U of the imaginary plane F1a including the first diffraction grating 12 and the conjugate plane FC is orthogonal to the optical axis AX2 and is disposed at a reference plane FS (rear focal plane F2) passing through the rear focal point R1 of the first cylindrical lens 136. In other words, the conjugate plane FC passes through the line of intersection U of the imaginary plane F1a including the first diffraction grating 12 and the reference plane FS and passes through the rear focal point R2 of the second cylindrical lens 138.

Consequently, the angle φ of the normal L2 of the image plane F4a to the optical axis AX2 depends not only on the angle θ1 of the first diffraction grating 12 but also on the position of the rear focal point R2 of the second cylindrical lens 138. The closer the rear focal point R2 of the second cylindrical lens 138 is to the rear focal point R1 of the first cylindrical lens 136, the smaller the angle φ of the normal L2 of the image plane F4a to the optical axis AX2 will be.

In other words, the smaller the magnifying power of the two-dimensional lightwave conversion optical system 34b is, the smaller the angle φ of the normal L2 of the image plane F4a to the optical axis AX2 will be.

Next, the relationship between the angle φ of the normal L2 of the image plane F4a to the optical axis AX2 and the magnifying power of the two-dimensional lightwave conversion optical system 34b is described mathematically.

The line of intersection U of the imaginary plane F1a including the first diffraction grating 12 and the conjugate plane FC is disposed on the ZX plane on a half line UR1 connecting the reference plane FS and the rear focal point R1 of the first cylindrical lens 136.

Accordingly, a relationship represented by the following Formula (7) is established:

$$2f_{136} \tan(\pi/2 - \theta 1) = 2f_{138} \tan(\pi/2 - \phi) \quad (7)$$

In Formula (7), $f_{136}$ represents the focal length of the first cylindrical lens 136 and $f_{138}$ represents the focal length of the second cylindrical lens 138.

From Formula (7), the following Formula (8) is derived:

$$\tan \phi = f_{138}/f_{136} \tan \theta 1 \quad (8)$$

Formula (8) can be transformed into the following Formula (9) based on the definition of the two-dimensional lightwave conversion optical system 34b having a magnifying power M ($M = f_{138}/f_{136}$):

$$\tan \phi = M \tan \theta 1 \quad (9)$$

Formula (9) indicates that the relationship between the magnitudes of the angle θ1 of the first diffraction grating 12 and the angle φ of the image plane F4a is determined based on the magnifying power M of the two-dimensional lightwave conversion optical system 34b. More specifically, when M is greater than one (M>1), φ is greater than θ1 (φ>θ1), and when M is smaller than one (M<1), φ is smaller than θ1 (φ<θ1).

Accordingly, when the two-dimensional lightwave conversion optical system 34b has a reducing power, the angle φ of the image plane F4a is small compared to the angle θ1 of the first diffraction grating 12.

In this embodiment, the magnifying power of the two-dimensional lightwave conversion optical system 34b is 0.4 and the angle θ1 of the first diffraction grating 12 is 45°. Thus, the angle φ of the image plane F4a is 21.8°.

Now, the magnifying power between the first diffraction grating 12 of the two-dimensional lightwave conversion optical system 34b and the image plane F4a will be described. As illustrated in FIG. 40, the coordinate axis $X_{12}$ is defined as a coordinate axis parallel to the ZX plane on the first diffraction grating 12. The coordinate axis $X_i$ is defined as a coordinate axis parallel to the ZX plane on the image plane F4a.

In the two-dimensional lightwave conversion optical system 34b, the magnifying power between the $X_{12}$ axis and the $X_i$ axis is defined as M cos θ1/cos φ (magnifying power in the Y direction is 1). Consequently, the length α of the light flux formed on the first diffraction grating 12 in the $X_{12}$ direction is 14.14 mm. The length β of the quasi-two-dimensional spectrogram Sp formed on the image plane F4a of the imaging device 4 in the $X_i$ direction is 4.31 mm.

As described above, in the time-resolved spectroscopy unit 89, the angle φ of the image plane F4a may be set smaller than the angle θ1 of the first diffraction grating 12. More specifically, the time-resolved spectroscopy unit 89 can maintain high diffraction efficiency without decreasing the angle of the first diffraction grating 12 with respect to the optical axis AX2 and is capable of emitting the light flux that has passed through the beam expander 11 at the image plane F4a at a small angle with respect to the normal L2 of the image plane F4a by reducing the angle φ of the normal L2 of the image plane F4a to the optical axis AX2.

When using a standard CCD camera, degradations, such as shading, can be sufficiently prevented by maintaining the incident angle of a beam at 25° or less. In this embodiment, as described above, although the angle θ1 of the first diffraction grating 12 is 45°, the angle φ of the image plane F4a is 21.8°, which is smaller than 25°. Hence, degradation, such as shading, of the imaging device 4 can be sufficiently prevented.

As described above, the time-resolved spectroscopy unit 89 can satisfactorily capture the interference pattern using the imaging device 4 and can carry out highly accurate time-resolved spectroscopy.

Eleventh Embodiment

Now, a microscope apparatus according to an eleventh embodiment will be described with reference to FIG. 41.

Figure 41:
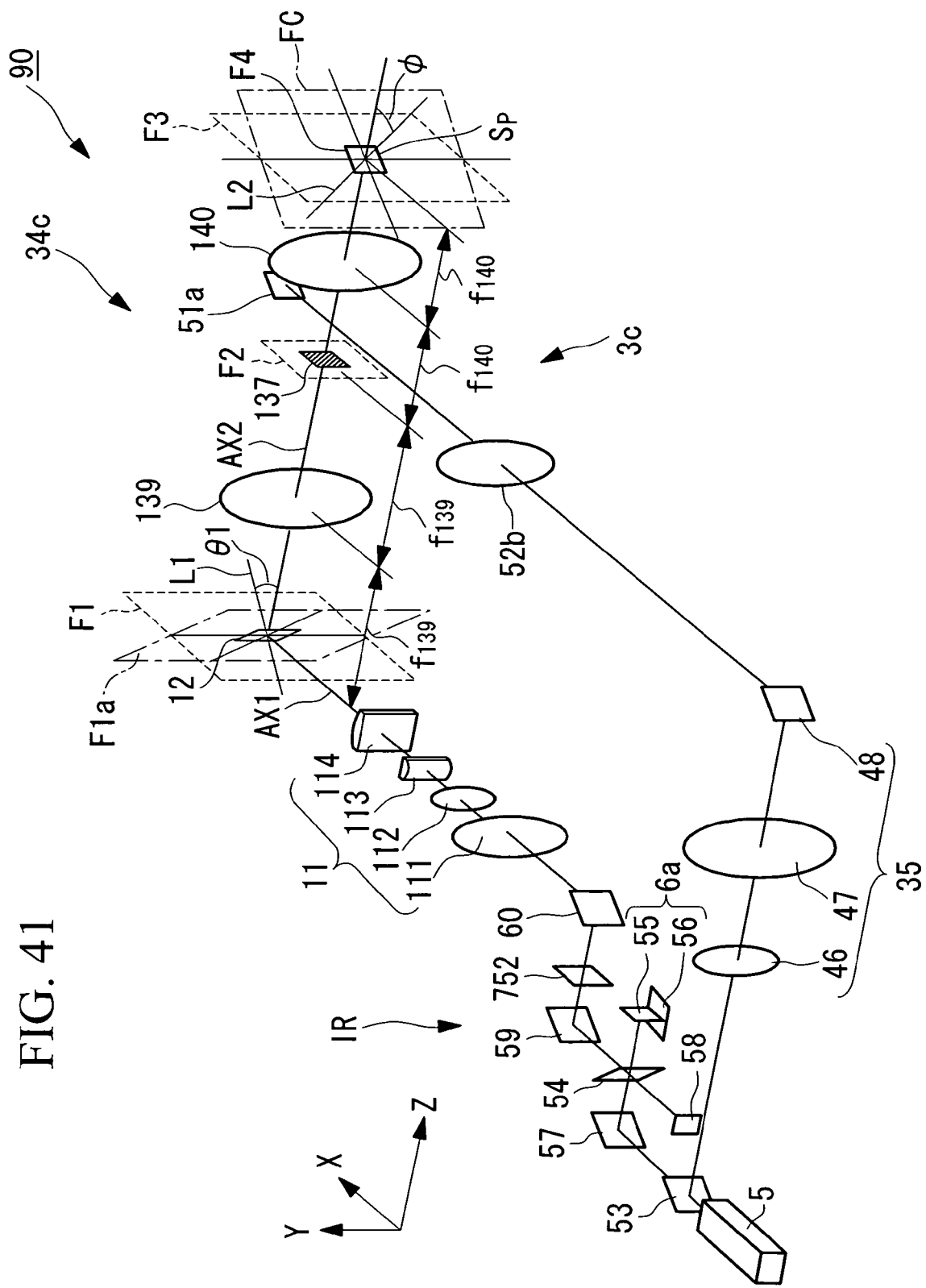
FIG. 41 is a perspective view of the overall structure of a time-resolved spectroscopy unit according to an eleventh embodiment of the present.

As illustrated in FIG. 41, the structure of a time-resolved spectroscopy unit 90 of the microscope apparatus according to this embodiment is the same as the time-resolved spectroscopy unit 89 of the microscope apparatus according to the tenth embodiment except that a beam expander 11 and a two-dimensional lightwave conversion optical system 34c are used instead of the beam expander 10 and the two-dimensional lightwave conversion optical system 34b. The components that are the same as those included in the tenth embodiment are represented by the same reference numerals and their descriptions are omitted.

More specifically, the beam expander 11 magnifies a probe beam that has been reduced by spherical lenses 111 and 112 by cylindrical lenses 113 and 114 only in the direction of inclination (Z direction) of a first diffraction grating 12. Accordingly, the probe beam will be magnified in the Z direction and have a smaller length in the Y direction compared to the length before entering the beam expander 11.

The probe beam shaped into a light flux having a cross-section extending in the inclination direction of the first diffraction grating 12 is diffracted by the first diffraction grating 12. The group of first-order diffracted beams has a linear cross-section extending in the direction in which a spectral distribution is formed (i.e., the X direction).

The structure of the two-dimensional lightwave conversion optical system 34c is the same as that of the two-dimensional lightwave conversion optical system 34b according to the tenth embodiment except that a spherical lens 139 having a focal length $f_{139}$, a diffraction grating array (two-dimensional conversion device) 137, and a spherical lens 140 having a focal length $f_{140}$ are provided instead of the first cylindrical lens 136, the filter 37, and the second cylindrical lens 138, respectively. The magnification of the two-dimensional lightwave conversion optical system 34b is $M=f_{140}/f_{139}<1$.

In this embodiment, a multiplexer 3c has the same structure as that of the multiplexer 3b except that a converging spherical lens 52b is provided instead of the converging cylindrical lens 52a.

The spherical lens 139 collimates first-order diffracted beams diffracted by the first diffraction grating 12 on a plane parallel to the X axis and emits these first-order diffracted beams at the diffraction grating array 137 on a rear focal plane F2.

The spherical lens 140 focuses the light flux diffracted by the diffraction grating array 137 while maintaining the shape of the cross-section and projects the light flux onto a conjugate plane FC conjugate with an imaginary plane F1a in the two-dimensional lightwave conversion optical system 34b. In this way, a quasi-two-dimensional spectrogram Sp is formed on the conjugate plane FC.

In this embodiment, the spherical lenses 139 and 140 both have a focal length of f=40 mm. The length in the Y direction of the quasi-two-dimensional spectrogram Sp formed on the conjugate plane FC is 14.14 mm and the length in a direction parallel to the ZX plane is 10 mm.

Since the time-resolved spectroscopy unit 90 having the above-described structure does not eliminate any portion of the probe beams with a filter, it is capable of forming a quasi-two-dimensional spectrogram Sp using the entire probe beam. Hence, the probe beam is used efficiently and a clear interference pattern can be obtained even when the probe beam is weak.

What is claimed is:

1. A microscope apparatus comprising:
   an optical microscope;
   a time-resolved spectroscopy unit;
   a first light-guiding unit interposed between the time-resolved spectroscopy unit and the optical microscope; and
   a second light-guiding unit interposed between the time-resolved spectroscopy unit and the optical microscope at a position different from the position of the first light-guiding unit,
   wherein the time-resolved spectroscopy unit includes:
      a light source for generating an ultrashort optical pulse;
      an imaging device;
      a light-splitting member interposed between the light source and the first light-guiding unit;
      a light-combining member interposed between the second light-guiding unit and the imaging device; and
      a two-dimensional lightwave conversion optical system interposed between the second light-guiding unit and the light-combining member.

2. The microscope apparatus according to claim 1, further comprising:
   a relay optical system,
   wherein the two-dimensional lightwave conversion optical system includes:
      a beam expander;
      a first diffraction grating;
      a first lens having a positive refractive power;
      an optical filter;
      a second lens having a positive refractive power; and
      a second diffraction grating,
   wherein the first diffraction grating is disposed at a front focal point of the first lens,
   wherein the optical filter is disposed at a rear focal point of the first lens and a front focal point of the second lens,
   wherein the second diffraction grating is disposed at a rear focal point of the second lens, and
   wherein the relay optical system is interposed between the second diffraction grating and the imaging device.

3. The microscope apparatus according to claim 2, wherein the relay optical system is a unit-magnification optical system.

4. The microscope apparatus according to claim 3, wherein the imaging device is disposed so that an image plane of the imaging device is orthogonal to an optical axis of the relay optical system.

5. The microscope apparatus according to claim 2,
   wherein the beam expander comprises a rotationally symmetric lens, and
   wherein the first lens and the second lens are cylindrical lenses.

6. The microscope apparatus according to claim 5,
   wherein the first diffraction grating and the second diffraction grating have a grating configuration capable of diffracting incident light only in a direction of an X axis,
   wherein the optical filter has a light-blocking region and a long and thin light-transmitting region,
   wherein the light-transmitting region is provided at an angle to the X axis and a Y axis, and
   wherein the X axis is an axis parallel to a direction in which the cylindrical lens has refractive power and the Y axis is an axis parallel to a direction in which the cylindrical lens does not have refractive power.

7. The microscope apparatus according to claim 2,
   wherein the beam expander comprises a cylindrical lens, and
   wherein the first lens and the second lens are rotationally symmetric lenses.

8. The microscope apparatus according to claim 7,
   wherein the first diffraction grating has a grating configuration capable of diffracting incident light only in a direction of an X axis,
   wherein the optical filter comprises a plurality of diffraction regions formed along the X axis,
   wherein each of the diffraction regions has a grating configuration capable of diffracting incident light at a different diffraction angle with respect to the Y axis,
   wherein the second diffraction grating has a grating configuration capable of diffracting incident light in a direction parallel to the optical axis of the relay optical system, and
   wherein the X axis is an axis parallel to a direction in which the cylindrical lens has refractive power and the Y axis is an axis parallel to a direction in which the cylindrical lens does not have refractive power.

9. The microscope apparatus according to claim 2, wherein at least one of the first diffraction grating and the second diffraction grating is disposed at an angle with respect to an optical axis of the two-dimensional lightwave conversion optical system.

10. The microscope apparatus according to claim 2, wherein the relay optical system is a reducing optical system.

11. The microscope apparatus according to claim 2, wherein the imaging device is disposed so that an image plane of the imaging device is disposed at an angle with respect to an optical axis of the relay optical system.

12. The microscope apparatus according to claim 1,
wherein the two-dimensional lightwave conversion optical system comprises:
a beam expander;
a half mirror;
a first diffraction grating;
a lens having a positive refractive power;
a reflective optical filter; and
a relay optical system,
wherein the half mirror is disposed on the light-emission side of the beam expander,
wherein the first diffraction grating, the lens having a positive refractive power, and the optical filter are disposed on the light-reflection side of the beam expander,
wherein the first grating is disposed at a front focal point of the lens having a positive refractive power,
wherein the optical filter is disposed at a rear focal point of the lens having a positive refractive power, and
wherein the relay optical system is interposed between the half mirror and the imaging device.

13. The microscope apparatus according to claim 1,
wherein the two-dimensional lightwave conversion optical system comprises:
a beam expander;
a diffraction grating;
a first lens having a positive refractive power;
an optical filter;
a second lens having a positive refractive power; and
a relay optical system,
wherein the diffraction grating is disposed at a front focal point of the first lens,
wherein in the optical filter is disposed at a rear focal point of the first lens and a front focal point of the second lens, and
wherein the imaging device is disposed at a rear focal point of the second lens.

* * * * *